(12) United States Patent
Kallakuri et al.

(10) Patent No.: US 11,303,853 B2
(45) Date of Patent: Apr. 12, 2022

(54) SYSTEMS AND METHODS FOR AUTOMATED DESIGN OF CAMERA PLACEMENT AND CAMERAS ARRANGEMENTS FOR AUTONOMOUS CHECKOUT

(71) Applicant: STANDARD COGNITION, CORP.

(72) Inventors: Nagasrikanth Kallakuri, San Francisco, CA (US); Akshay Malhotra, Fremont, CA (US); Luis Yoichi Morales Saiki, San Francisco, CA (US); Tushar Dadlani, Pleasanton, CA (US); Dhananjay Singh, San Francisco, CA (US)

(73) Assignee: STANDARD COGNITION, CORP., San Francisco, CA (US)

( * ) Notice: Subject to any disclaimer, the term of this patent is extended or adjusted under 35 U.S.C. 154(b) by 0 days.

(21) Appl. No.: 17/358,864

(22) Filed: Jun. 25, 2021

(65) Prior Publication Data
US 2021/0409648 A1 Dec. 30, 2021

Related U.S. Application Data

(60) Provisional application No. 63/044,971, filed on Jun. 26, 2020.

(51) Int. Cl.
*G06T 7/00* (2017.01)
*H04N 7/18* (2006.01)
(Continued)

(52) U.S. Cl.
CPC ............ *H04N 7/181* (2013.01); *A47F 10/02* (2013.01); *G06N 20/00* (2019.01); *G06Q 20/208* (2013.01);
(Continued)

(58) Field of Classification Search
CPC .......... H04N 7/181; H04N 7/188; H04N 7/18; H04N 5/247; H04N 5/232; H04N 17/002;
(Continued)

(56) References Cited

U.S. PATENT DOCUMENTS 6,154,559 A 11/2000 Beardsley
6,561,417 B1 5/2003 Gadd
(Continued)

FOREIGN PATENT DOCUMENTS

CN 104850846 A 8/2015
CN 105069413 A 11/2015
(Continued)

OTHER PUBLICATIONS

Gkioxar et al. "R-CNNs for Pose Estimation and Action Detection," Cornell University, Computer Science, Computer Vision and Pattern Recognition, arXiv.org > cs > arXiv:1406.5212, Jun. 19, 2014, 8 pages.
(Continued)

*Primary Examiner* — Jose L Couso
(74) *Attorney, Agent, or Firm* — Haynes Beffel & Wolfeld LLP; Andrew L. Dunlap; Paul A. Durdik

(57) ABSTRACT

Systems and techniques are provided for determining an improved camera coverage plan including a number, a placement, and a pose of cameras that are arranged to track puts and takes of items by subjects in a three-dimensional real space. The method includes receiving an initial camera coverage plan including a three-dimensional map of a real space, an initial number and initial pose of a plurality of cameras and a camera model including characteristics of the cameras. The method can iteratively apply a machine learning process to an objective function of number and poses of cameras, and subject to a set of constraints, obtain an improved camera coverage plan. The improved camera
(Continued)

coverage plan is provided to an installer to arrange cameras to track puts and takes of items by subjects in the three-dimensional real space.

21 Claims, 49 Drawing Sheets
(25 of 49 Drawing Sheet(s) Filed in Color)

(51) Int. Cl.
  *G06T 7/70* (2017.01)
  *A47F 10/02* (2006.01)
  *G06Q 20/20* (2012.01)
  *G06N 20/00* (2019.01)

(52) U.S. Cl.
  CPC .......... *G06T 7/70* (2017.01); *A47F 2010/025* (2013.01); *G06T 2207/20081* (2013.01); *G06T 2207/30232* (2013.01)

(58) Field of Classification Search
  CPC .... G06N 20/00; G06N 3/08–088; G06N 5/00; G06N 5/003; G06N 7/00; G06N 7/005; G06N 7/70; G06N 7/20; G06N 7/292; G06N 7/246; G06N 7/248; G06N 7/50; G06N 7/251; G06N 2207/20081; G06N 2207/30232; G06N 2207/30196; G06N 2207/10016; G06N 2207/20084; G06N 2207/10004; G06N 2207/30201; G06N 2207/30241; G06N 2207/20076; G06Q 20/208; G06Q 20/047; G06Q 20/18; G06Q 20/12; G06Q 20/20; G06Q 20/40; G06Q 10/087; G06Q 10/0833; G06Q 30/0635; G06Q 30/06; G06Q 30/0601; G06Q 30/0639; G06Q 30/0641; A47F 10/02; G07G 1/0036; G07G 5/00; G06K 9/00771; G06K 9/00375; G06K 9/00355; G06K 9/00382; G06K 9/00617; G06K 9/6262; G06K 9/00288; G06K 9/00369; G06K 9/00664; G06K 9/2054; G06K 9/46; G06K 9/6272; G06K 9/6273; G06K 9/00362; G06K 9/3241; G06K 2009/00738; G06K 2209/15; G06K 2209/21; G06K 2209/23
  See application file for complete search history.

(56) References Cited

U.S. PATENT DOCUMENTS

| | | |
|---|---|---|
| 6,768,102 B1 | 7/2004 | Skoll |
| 7,050,624 B2 | 5/2006 | Dialameh et al. |
| 7,050,652 B2 | 5/2006 | Stanek |
| 7,742,623 B1 | 6/2010 | Moon et al. |
| 8,009,863 B1 | 8/2011 | Sharma et al. |
| 8,219,438 B1 | 7/2012 | Moon et al. |
| 8,261,256 B1 | 9/2012 | Adler et al. |
| 8,279,325 B2 | 10/2012 | Pitts et al. |
| 8,577,705 B1 | 11/2013 | Baboo et al. |
| 8,624,725 B1 | 1/2014 | MacGregor |
| 8,749,630 B2 | 6/2014 | Alahi et al. |
| 9,036,028 B2 | 5/2015 | Buehler |
| 9,058,523 B2 | 6/2015 | Merkel et al. |
| 9,262,681 B1 | 2/2016 | Mishra |
| 9,269,012 B2 | 2/2016 | Fotland |
| 9,269,093 B2 | 2/2016 | Lee et al. |
| 9,294,873 B1 | 3/2016 | MacGregor |
| 9,449,233 B2 | 9/2016 | Taylor |
| 9,489,623 B1 | 11/2016 | Sinyavskiy et al. |
| 9,494,532 B2 | 11/2016 | Xie et al. |
| 9,536,177 B2 | 1/2017 | Chalasani et al. |
| 9,582,891 B2 | 2/2017 | Geiger et al. |
| 9,595,127 B2 | 3/2017 | Champion et al. |
| 9,652,751 B2 | 5/2017 | Aaron et al. |
| 9,846,810 B2 | 12/2017 | Partis |
| 9,881,221 B2 | 1/2018 | Bala et al. |
| 9,886,827 B2 | 2/2018 | Schoner |
| 9,911,290 B1 | 3/2018 | Zalewski et al. |
| 10,055,853 B1 | 8/2018 | Fisher et al. |
| 10,083,453 B2 | 9/2018 | Campbell |
| 10,127,438 B1 | 11/2018 | Fisher et al. |
| 10,133,933 B1 | 11/2018 | Fisher et al. |
| 10,165,194 B1 | 12/2018 | Baldwin |
| 10,169,677 B1 | 1/2019 | Ren et al. |
| 10,175,340 B1 | 1/2019 | Abari et al. |
| 10,176,452 B2 * | 1/2019 | Rizzolo ..................... G06T 7/73 |
| 10,192,408 B2 | 1/2019 | Schoner |
| 10,202,135 B2 | 2/2019 | Mian et al. |
| 10,210,603 B2 * | 2/2019 | Venable ................ G06T 3/0068 |
| 10,210,737 B2 | 2/2019 | Zhao |
| 10,277,120 B1 | 2/2019 | Shin et al. |
| 10,242,393 B1 | 3/2019 | Kumar et al. |
| 10,262,331 B1 | 4/2019 | Sharma et al. |
| 10,282,720 B1 * | 5/2019 | Buibas ............... G06K 9/00201 |
| 10,282,852 B1 * | 5/2019 | Buibas .................... G06T 7/277 |
| 10,332,089 B1 | 6/2019 | Asmi et al. |
| 10,354,262 B1 | 7/2019 | Hershey et al. |
| 10,373,322 B1 * | 8/2019 | Buibas ............... G06K 9/00201 |
| 10,387,896 B1 | 8/2019 | Hershey et al. |
| 10,438,277 B1 | 10/2019 | Jiang et al. |
| 10,445,694 B2 | 10/2019 | Fisher et al. |
| 10,474,877 B2 | 11/2019 | Huang et al. |
| 10,474,988 B2 | 11/2019 | Fisher et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,529,137 B1 | 1/2020 | Black et al. |
| 10,535,146 B1 * | 1/2020 | Buibas ................. G06Q 10/087 |
| 10,650,545 B2 | 5/2020 | Fisher et al. |
| 10,776,926 B2 | 9/2020 | Shrivastava |
| 10,810,539 B1 | 10/2020 | Mohanty et al. |
| 10,853,965 B2 | 12/2020 | Fisher et al. |
| 11,132,810 B2 * | 9/2021 | Kume ..................... G06T 7/292 |
| 2003/0078849 A1 | 4/2003 | Snyder |
| 2003/0107649 A1 | 6/2003 | Flickner et al. |
| 2004/0099736 A1 | 5/2004 | Neumark |
| 2004/0131254 A1 | 7/2004 | Liang et al. |
| 2005/0177446 A1 | 8/2005 | Hoblit |
| 2005/0201612 A1 | 9/2005 | Park et al. |
| 2006/0132491 A1 | 6/2006 | Riach et al. |
| 2006/0279630 A1 | 12/2006 | Aggarwal et al. |
| 2007/0021863 A1 | 1/2007 | Mountz et al. |
| 2007/0021864 A1 | 1/2007 | Mountz et al. |
| 2007/0182718 A1 | 8/2007 | Schoener et al. |
| 2007/0282665 A1 | 12/2007 | Buehler et al. |
| 2008/0001918 A1 | 1/2008 | Hsu et al. |
| 2008/0159634 A1 | 7/2008 | Sharma et al. |
| 2008/0170776 A1 | 7/2008 | Albertson et al. |
| 2008/0181507 A1 | 7/2008 | Gope et al. |
| 2008/0211915 A1 | 9/2008 | McCubbrey |
| 2008/0243614 A1 | 10/2008 | Tu et al. |
| 2009/0041297 A1 | 2/2009 | Zhang et al. |
| 2009/0057068 A1 | 3/2009 | Lin et al. |
| 2009/0083815 A1 | 3/2009 | McMaster et al. |
| 2009/0217315 A1 | 8/2009 | Malik et al. |
| 2009/0222313 A1 | 9/2009 | Kannan et al. |
| 2009/0307226 A1 | 12/2009 | Koster et al. |
| 2010/0021009 A1 | 1/2010 | Yao |
| 2010/0103104 A1 | 4/2010 | Son et al. |
| 2010/0208941 A1 | 8/2010 | Broaddus et al. |
| 2010/0283860 A1 | 11/2010 | Nader |
| 2011/0141011 A1 | 6/2011 | Lashina et al. |
| 2011/0209042 A1 | 8/2011 | Porter |
| 2011/0228976 A1 | 9/2011 | Fitzgibbon et al. |
| 2011/0317012 A1 | 12/2011 | Hammadou |
| 2011/0317016 A1 | 12/2011 | Saeki et al. |
| 2011/0320322 A1 | 12/2011 | Roslak et al. |
| 2012/0119879 A1 | 5/2012 | Estes et al. |
| 2012/0154604 A1 | 6/2012 | Chen et al. |
| 2012/0159290 A1 | 6/2012 | Pulsipher et al. |

(56) References Cited

U.S. PATENT DOCUMENTS

| | | |
|---|---|---|
| 2012/0209749 A1 | 8/2012 | Hammad et al. |
| 2012/0245974 A1 | 9/2012 | Bonner et al. |
| 2012/0271712 A1 | 10/2012 | Katzin et al. |
| 2012/0275686 A1 | 11/2012 | Wilson et al. |
| 2012/0290401 A1 | 11/2012 | Neven |
| 2013/0011007 A1 | 1/2013 | Muriello et al. |
| 2013/0011049 A1 | 1/2013 | Kimura |
| 2013/0076898 A1 | 3/2013 | Philippe et al. |
| 2013/0156260 A1 | 6/2013 | Craig |
| 2013/0182114 A1 | 7/2013 | Zhang et al. |
| 2013/0201339 A1 | 8/2013 | Venkatesh |
| 2014/0168477 A1 | 6/2014 | David |
| 2014/0188648 A1 | 7/2014 | Argue et al. |
| 2014/0207615 A1 | 7/2014 | Li et al. |
| 2014/0222501 A1 | 8/2014 | Hirakawa et al. |
| 2014/0282162 A1 | 9/2014 | Fein et al. |
| 2014/0300736 A1 | 10/2014 | Reitinger et al. |
| 2014/0304123 A1 | 10/2014 | Schwartz |
| 2015/0002675 A1 | 1/2015 | Kundu et al. |
| 2015/0009323 A1 | 1/2015 | Lei |
| 2015/0012396 A1 | 1/2015 | Puerini et al. |
| 2015/0019391 A1 | 1/2015 | Kumar et al. |
| 2015/0026010 A1 | 1/2015 | Ellison |
| 2015/0026646 A1 | 1/2015 | Ahn et al. |
| 2015/0039458 A1 | 2/2015 | Reid |
| 2015/0049914 A1 | 2/2015 | Alves |
| 2015/0124107 A1 | 5/2015 | Muriello et al. |
| 2015/0193761 A1 | 7/2015 | Svetal |
| 2015/0206188 A1 | 7/2015 | Tanigawa et al. |
| 2015/0208043 A1 | 7/2015 | Lee et al. |
| 2015/0213391 A1 | 7/2015 | Hasan |
| 2015/0221094 A1 | 8/2015 | Marcheselli et al. |
| 2015/0262116 A1 | 9/2015 | Katircioglu et al. |
| 2015/0269740 A1 | 9/2015 | Mazurenko et al. |
| 2015/0294397 A1 | 10/2015 | Croy et al. |
| 2015/0302593 A1 | 10/2015 | Mazurenko et al. |
| 2015/0310459 A1 | 10/2015 | Bernal et al. |
| 2015/0327794 A1 | 11/2015 | Rahman et al. |
| 2015/0332312 A1 | 11/2015 | Cosman |
| 2015/0363868 A1 | 12/2015 | Kleinhandler et al. |
| 2015/0379366 A1 | 12/2015 | Nomura et al. |
| 2016/0095511 A1 | 4/2016 | Taguchi et al. |
| 2016/0110760 A1 | 4/2016 | Herring et al. |
| 2016/0125245 A1 | 5/2016 | Saitwal et al. |
| 2016/0155011 A1 | 6/2016 | Sulc et al. |
| 2016/0171707 A1 | 6/2016 | Schwartz |
| 2016/0188962 A1 | 6/2016 | Taguchi |
| 2016/0189286 A1 | 6/2016 | Zohar et al. |
| 2016/0203525 A1 | 7/2016 | Hara et al. |
| 2016/0217157 A1 | 7/2016 | Shih et al. |
| 2016/0217417 A1 | 7/2016 | Ma et al. |
| 2016/0259994 A1 | 9/2016 | Ravindran et al. |
| 2016/0358145 A1 | 12/2016 | Montgomery |
| 2016/0371726 A1 | 12/2016 | Yamaji et al. |
| 2016/0381328 A1 | 12/2016 | Zhao |
| 2017/0024806 A1 | 1/2017 | High et al. |
| 2017/0032193 A1 | 2/2017 | Yang |
| 2017/0068861 A1 | 3/2017 | Miller et al. |
| 2017/0104979 A1 | 4/2017 | Shaw et al. |
| 2017/0116473 A1 | 4/2017 | Sashida et al. |
| 2017/0124096 A1 | 5/2017 | Hsi et al. |
| 2017/0148005 A1 | 5/2017 | Murn |
| 2017/0154212 A1 | 6/2017 | Feris et al. |
| 2017/0161555 A1 | 6/2017 | Kumar et al. |
| 2017/0168586 A1 | 6/2017 | Sinha et al. |
| 2017/0178226 A1 | 6/2017 | Graham et al. |
| 2017/0206664 A1 | 7/2017 | Shen |
| 2017/0206669 A1 | 7/2017 | Saleemi et al. |
| 2017/0249339 A1 | 8/2017 | Lester |
| 2017/0255990 A1 | 9/2017 | Ramamurthy et al. |
| 2017/0278255 A1 | 9/2017 | Shingu et al. |
| 2017/0308911 A1 | 10/2017 | Barham et al. |
| 2017/0309136 A1 | 10/2017 | Schoner |
| 2017/0323376 A1 | 11/2017 | Glaser et al. |
| 2018/0003315 A1 | 1/2018 | Reed |
| 2018/0012072 A1 | 1/2018 | Glaser et al. |
| 2018/0012080 A1 | 1/2018 | Glaser et al. |
| 2018/0014382 A1 | 1/2018 | Glaser et al. |
| 2018/0025175 A1 | 1/2018 | Kato |
| 2018/0032799 A1 | 2/2018 | Marcheselli et al. |
| 2018/0033015 A1 | 2/2018 | Opalka et al. |
| 2018/0033151 A1 | 2/2018 | Matsumoto et al. |
| 2018/0068431 A1 | 3/2018 | Takeda et al. |
| 2018/0070056 A1 | 3/2018 | DeAngelis et al. |
| 2018/0088900 A1 | 3/2018 | Glaser et al. |
| 2018/0150788 A1 | 5/2018 | Vepakomma et al. |
| 2018/0165728 A1 | 6/2018 | McDonald et al. |
| 2018/0181995 A1 | 6/2018 | Burry et al. |
| 2018/0189600 A1 | 7/2018 | Astrom et al. |
| 2018/0217223 A1 | 8/2018 | Kumar et al. |
| 2018/0225625 A1 | 8/2018 | DiFatta et al. |
| 2018/0232796 A1 | 8/2018 | Glaser et al. |
| 2018/0240180 A1 | 8/2018 | Glaser et al. |
| 2018/0295424 A1 | 10/2018 | Taylor et al. |
| 2018/0322616 A1 | 11/2018 | Guigues |
| 2018/0329762 A1 | 11/2018 | Li et al. |
| 2018/0332235 A1 | 11/2018 | Glaser |
| 2018/0332236 A1 | 11/2018 | Glaser et al. |
| 2018/0343417 A1 | 11/2018 | Davey |
| 2018/0365481 A1* | 12/2018 | Tolbert .............. G06K 9/00288 |
| 2018/0365755 A1 | 12/2018 | Bekbolatov et al. |
| 2018/0373928 A1 | 12/2018 | Glaser et al. |
| 2019/0005479 A1 | 1/2019 | Glaser et al. |
| 2019/0019309 A1 | 1/2019 | Herrli et al. |
| 2019/0034735 A1 | 1/2019 | Cuban et al. |
| 2019/0043003 A1 | 2/2019 | Fisher et al. |
| 2019/0057435 A1 | 2/2019 | Chomley et al. |
| 2019/0147709 A1 | 5/2019 | Schoner |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0158813 A1 | 5/2019 | Rowell et al. |
| 2019/0188876 A1 | 6/2019 | Song et al. |
| 2019/0244386 A1 | 8/2019 | Fisher et al. |
| 2019/0244500 A1 | 8/2019 | Fisher et al. |
| 2019/0251340 A1 | 8/2019 | Brown et al. |
| 2019/0347611 A1 | 11/2019 | Fisher et al. |
| 2019/0377957 A1 | 12/2019 | Johnston et al. |
| 2019/0378205 A1 | 12/2019 | Glaser et al. |
| 2019/0392318 A1 | 12/2019 | Ghafoor et al. |
| 2020/0034988 A1 | 1/2020 | Zhou |
| 2020/0074165 A1 | 3/2020 | Ghafoor et al. |
| 2020/0074393 A1 | 3/2020 | Fisher et al. |
| 2020/0074394 A1 | 3/2020 | Fisher et al. |
| 2020/0074432 A1 | 3/2020 | Valdman et al. |
| 2020/0118400 A1 | 4/2020 | Zalewski et al. |
| 2020/0125824 A1 | 4/2020 | Mabyalaht et al. |
| 2020/0134588 A1 | 4/2020 | Nelms et al. |
| 2020/0151692 A1 | 5/2020 | Gao et al. |
| 2020/0193507 A1 | 6/2020 | Glaser et al. |
| 2020/0234463 A1 | 7/2020 | Fisher et al. |
| 2020/0258241 A1 | 8/2020 | Liu et al. |
| 2020/0293992 A1* | 9/2020 | Bogolea .............. G05D 1/0088 |
| 2020/0334834 A1 | 10/2020 | Fisher |
| 2020/0334835 A1* | 10/2020 | Buibas .................. G06T 7/248 |
| 2020/0410713 A1 | 12/2020 | Auer et al. |
| 2021/0067744 A1* | 3/2021 | Buibas ................ G06N 3/0454 |
| 2021/0158430 A1 | 5/2021 | Buibas et al. |
| 2021/0201253 A1 | 7/2021 | Fisher et al. |
| 2021/0295081 A1* | 9/2021 | Berry ................ G06K 9/00369 |

FOREIGN PATENT DOCUMENTS

| | | |
|---|---|---|
| CN | 104778690 B | 6/2017 |
| EP | 1574986 B1 | 7/2008 |
| EP | 2555162 A1 | 2/2013 |
| EP | 3002710 A1 | 4/2016 |
| GB | 2560387 A | 9/2018 |
| GB | 2566762 A | 3/2019 |
| JP | 2011253344 A | 12/2011 |
| JP | 2013196199 A | 9/2013 |

(56) References Cited

FOREIGN PATENT DOCUMENTS

| | | | |
|---|---|---|---|
| JP | 201489626 A | 5/2014 | |
| JP | 2016206782 A | 12/2016 | |
| JP | 2017157216 A | 9/2017 | |
| JP | 2018099317 A | 6/2018 | |
| KR | 10-2018-0032400 A | 3/2018 | |
| KR | 10-2019-0093733 A | 8/2019 | |
| KR | 102223570 B1 | 3/2021 | |
| WO | 0021021 A1 | 4/2000 | |
| WO | 0243352 A2 | 5/2002 | |
| WO | 02059836 A3 | 5/2003 | |
| WO | 2008029159 A1 | 3/2008 | |
| WO | 2013041444 A1 | 3/2013 | |
| WO | 2013-103912 A1 | 7/2013 | |
| WO | 2014133779 A1 | 9/2014 | |
| WO | 2015133699 A1 | 9/2015 | |
| WO | 2016136144 A1 | 9/2016 | |
| WO | 2016166508 A1 | 10/2016 | |
| WO | 2017015390 A1 | 1/2017 | |
| WO | 2017151241 A2 | 9/2017 | |
| WO | 2017196822 A1 | 11/2017 | |
| WO | 2018013438 A1 | 1/2018 | |
| WO | 2018013439 A1 | 1/2018 | |
| WO | 2018148613 A1 | 8/2018 | |
| WO | 2018162929 A1 | 9/2018 | |
| WO | 2018209156 A1 | 11/2018 | |
| WO | 2018237210 A1 | 12/2018 | |
| WO | 2019032304 A1 | 2/2019 | |
| WO | 2019032305 A2 | 2/2019 | |
| WO | 2019032306 A1 | 2/2019 | |
| WO | 2019032307 A1 | 2/2019 | |
| WO | 2020023795 | 1/2020 | |
| WO | 2020023796 | 1/2020 | |
| WO | 2020023798 | 1/2020 | |
| WO | 2020023799 | 1/2020 | |
| WO | 2020023801 | 1/2020 | |
| WO | 2020023926 | 1/2020 | |
| WO | 2020023930 | 1/2020 | |
| WO | 2020047555 A1 | 3/2020 | |
| WO | 2020214775 A1 | 10/2020 | |
| WO | 2020225562 A1 | 11/2020 | |

OTHER PUBLICATIONS

Jayabalan, et al., "Dynamic Action Recognition: A convolutional neural network model for temporally organized joint location data," Cornell University, Computer Science, Dec. 20, 2016, 11 pages.
U.S. Office Action from U.S. Appl. No. 16/679,035 dated Jul. 19, 2021, 16 pages.
Yusoff et al. "Optimal Camera Placement for 3D Environment," ICSECS 2011: Software Engineering and Computer Systems, Jun. 27-29, 2011, 448-459.
Erdem et al. "Automated camera layout to satisfy task-specific and floor plan-specific coverage requirements," Computer Vision and Image Undertanding 103, Aug. 1, 2006, 156-169.
Longuet-Higgens, "A computer algorithm for reconstructing a scene from two projections," Nature 293, Sep. 10, 1981, pp. 133-135.
Harville, "Stereo person tracking with adaptive plan-view templates of height and occupancy statistics," Image and Vision Computing, vol. 22, Issue 2, Feb. 1, 2004, pp. 127-142.
Huang, et al. "Driver's view and vehicle surround estimation using omnidirectional video stream," IEEE IV2003 Intelligent Vehicles Symposium. Proceedings (Cat. No.03TH8683), Jun. 9-11, 2003, pp. 444-449.
Rossi et al., "Tracking and Counting Moving People," IEEE Int'l Conf. on Image Processing, ICIP-94, Nov. 13-16, 1994, 5 pages.
Vincze, "Robust tracking of ellipses at frame rate," Pattern Recognition, vol. 34, Issue 2, Feb. 2001, pp. 487-498.
Black et al., "Multi View Image Surveillance and Tracking," IEEE Proceedings of the Workshop on Motion and Video Computing, 2002, pp. 1-6. cited byapplicant.
Zhang "A Flexible New Technique for Camera Calibration," IEEE Transactions on Pattern Analysis and Machine Intelligence, vol. 22, No. 11, Nov. 2000, 22pages.

U.S. Appl. No. 15/847,796—Notice of Allowance dated May 10, 2018, 8 pages.
Grinciunaite et al. "Human Pose Estimation in Space and Time Using 3D CNN," ECCV Workshop on Brave new ideas for motion representations in videos, Oct. 2016, 7 pages.
He et al. "Identity mappings in deep residual networks" (published at https://arxiv.org/pdf/1603.05027.pdf), Jul. 25, 2016, 15 pages.
Redmon et al., "YOLO9000: Better, Faster, Stronger," (available at https://arxiv.org/pdf/1612.08242.pdf), Dec. 25, 2016, 9 pages.
Toshev et al. "DeepPose: Human Pose Estimation via Deep Neural Networks," IEEE Conf. on Computer Vision and Pattern Recognition, Aug. 2014, 8 pages.
U.S. Appl. No. 15/945,466—Office Action dated Jul. 20, 2018, 12 pages.
U.S. Appl. No. 15/945,466—Response to Office Action dated Jul. 20, 2018 filed on on Jul. 25, 2018, 12 pages.
U.S. Appl. No. 15/907,112—Office Action dated Jun. 26, 2018, 11 pages.
U.S. Appl. No. 15/907,112—Response to Office Action dated Jun. 26, 2018, as filed Jul. 25, 2018, 12 pages.
U.S. Appl. No. 15/907,112—Notice of Allowance dated Sep. 18, 2018, 7 pages.
PCT/US2018/043937—International Search Report and Written Opinion dated Oct. 31, 2018, 17 pages.
PCT/US2018/043937—International Preliminary Report on Patentability dated Feb. 20, 2020, 14 pages.
U.S. Appl. No. 16/255,573—Office Action dated Mar. 18, 2019, 27 pages.
U.S. Appl. No. 15/945,473—Office Action dated Jan. 24, 2019, 8 pages.
U.S. Appl. No. 15/945,473—Response to OA dated Jan. 24, 2019, 17 pages.
U.S. Appl. No. 15/945,473—Response to Office Action, dated Oct. 2, 2018, 23 pages.
U.S. Appl. No. 16/256,361—Office Action dated Apr. 4, 2019, 25 pages.
U.S. Appl. No. 16/256,936—Office Action dated May 16, 2019, 11 pages.
U.S. Appl. No. 15/945,473—Office Action dated Aug. 8, 2018, 17 pages.
U.S. Appl. No. 16/256,904—Office Action dated Mar. 19, 2019, 15 pages.
U.S. Appl. No. 16/256,904—Response to Office Action dated Mar. 19, 2019, as filed May 22, 2019, 16 pages.
Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136, XP028804219, ISSN: 1047-3203, DOI: 10.1016/J.JVCIR.2013.03.009.
Ceballos, Scikit-Learn Decision Trees Explained, https://towardsdatascience.com/scikit-learn-decision-trees-explained-803f3812290d, Feb. 22, 2019, 13 pages.
EP 18843163.9—Extended European Search Report dated Nov. 27, 2020, 8 pages.
EP 18843486.4—Extended European Search Report dated Dec. 8, 2020, 8 pages.
EP 18844509.2—Extended European Search Report dated Dec. 8, 2020, 8 pages.
EP-18844384.0—European Extended Search Report dated Dec. 2, 2020, 7 pages.
PCT/US2018/043939—International Preliminary Report on Patentability dated Feb. 20, 2020, 14 pages.
PCT/US2019-043520—International Search Report and Written Opinion dated May 8, 2020, 10 pages.
PCT/US2019/043519—International Preliminary Report on Patentability dated Feb. 4, 2021, 7 pages.
PCT/US2019/043519—International Search Report and Written Opinion dated Oct. 31, 2019, 10 pages.
PCT/US2019/043522—International Search Report and Written Opinion dated Nov. 15, 2019, 11 pages.
PCT/US2019/043523—International Preliminary Report on Patentability dated Feb. 4, 2021, 15 pages.

(56) References Cited

OTHER PUBLICATIONS

PCT/US2019/043523—International Search Report and Written Opinion dated Nov. 20, 2019, 18 pages.
U.S. Office Action from U.S. Appl. No. 16/256,936 dated Jun. 1, 2020 21 pages.
U.S. Appl. No. 16/256,936—Response to Final Office Action dated Nov. 29, 2019, as filed Mar. 2, 2020, 19 pages.
U.S. Appl. No. 16/256,936—Office Action dated Jun. 1, 2020, 21 pages.
U.S. Appl. No. 16/255,573—Response to Final Office Action dated Sep. 17, 2019, as filed Nov. 15, 2019, 16 pages.
U.S. Appl. No. 16/255,573—Notice of Allowance dated Jan. 14, 2020, 11 pages.
U.S. Appl. No. 16/388,772—Office Action dated May 15, 2020, 12 pages.
PCT/US2019-043520—International Preliminary Report and Written Opinion dated Feb. 4, 2021, 7 pages.
U.S. Appl. No. 15/945,473—Response to Final Office Action dated Apr. 23, 2019, as filed Jun. 24, 2019, 13 pages.
U.S. Appl. No. 15/945,473—Response to OA dated Jan. 24, 2019, as filed Feb. 8, 2019, 17 pages.
U.S. Appl. No. 15/945,473—Response to Office Action dated Aug. 8, 2018, as filed Oct. 2, 2018, 23 pages.
U.S. Appl. No. 16/255,573—Response to Office Action dated Mar. 18, 2019, as filed Jun. 17, 2019, 15 pages.
U.S. Appl. No. 16/256,355—Notice of Allowance dated Jul. 26, 2019, 12 pages.
U.S. Appl. No. 16/256,355—Response to Office Action dated Apr. 4, 2019 filed Jul. 3, 2019, 13 pages.
U.S. Appl. No. 16/256,361—Notice of Allowance dated Aug. 26, 2019, 17 pages.
U.S. Appl. No. 16/256,361—Response to Office Action dated Apr. 4, 2019, as filed Jul. 2, 2019, 14 pages.
U.S. Appl. No. 16/256,936—Response to Office Action dated May 16, 2019, as filed Aug. 16, 2019, 18 pages.
PCT/US2019/043526—International Preliminary Report on Patentability dated Feb. 4, 2021, 6 pages.
PCT/US2018/043934—International Preliminary Report on Patentability dated Feb. 20, 2020, 12 pages.
PCT/US2019/043523—Interational Search Report and Written Opinion dated Nov. 20, 2019, 18 pages.
PCT/US2019/043770—International Search Report and Written Opinion dated Nov. 13, 2019, 13 pages.
U.S. Office Action from U.S. Appl. No. 17/195,495 dated May 21, 2021, 11 pages.
DeTone et al, SuperPoint: Self-Supervised Interest Point Detection and Description, Apr. 19, 2018, arXiv:1712.07629v4 [cs.CV] Apr. 19, 2018.
PCT/US2019/043775—International Preliminary Report on Patentability dated Feb. 4, 2021, 7 pages.
PCT/US2021/031173—International Search Report and Written Opinion dated Aug. 20, 2021, 9 pages.
U.S. Office Action in U.S. Appl. No. 16/559,415 dated Sep. 9, 2021, 14 pages.
PCT/US2020/028454—International Preliminary Report on Patentability dated Oct. 28, 2021, 9 pages.
U.S. Appl. No. 17/195,495—Notice of Allowance dated Jul. 8, 2021, 12 pages.
U.S. Appl. No. 17/195,495—Notice of Allowance dated Oct. 26, 2021, 18 pages.
U.S. Appl. No. 16/679,027—Notice of Allowance dated Jul. 2, 2021, 15 pages.
U.S. Appl. No. 16/679,027—Notice of Allowance dated Oct. 4, 2021, 19 pages.
U.S. Appl. No. 16/519,660—Notice of Allowance dated Jul. 16, 2021, 16 pages.
U.S. Appl. No. 16/388,765—Notice of Allowance dated Jul. 26, 2021, 18 pages.
U.S. Appl. No. 16/842,382—Notice of Allowance dated Aug. 5, 2021, 24 pages.

Gkioxari et al., "R-CNN's for Pose Estimation and Action Detection", <https://arxiv.org/pdf/1406.5212.pdf>, Jun. 19, 2014.
U.S. Appl. No. 16/492,781—Non-Final Office Action dated Feb. 2, 2021, 18 pages.
GB 1703914.0—Office Action dated Jul. 14, 2021, 5 pages.
GB 1703914.0—Search Report dated Jan. 18, 2018, 1 pages.
EP 18709743.1—Office Action dated Mar. 11, 2021, 5 pages.
U.S. Appl. No. 16/388,765—Notice of Allowance Sep. 15, 2021, 23 pages.
Yuanzhouhan, Cao et al, "Leveraging Convolutional Pose Machines for Fast and Accurate Head Pose Estimation", 2018 IEEE/RSJ International Conference On Intelligent Robots and Systems (IROS), IEEE, Oct. 1, 2018 (Oct. 1, 2018), pp. 1089-1094, XP033491495, DOI: 10.1109/IROS.2018.8594223 [retrieved on Dec. 27, 2018].
Wei, Shih-En et al, "Convolutional Pose Machine", 2016 IEEE Conference On Computer Vision and Pattern Recognition (CVPR), IEEE, Jun. 27, 2016 (Jun. 27, 2016), pp. 4724-4732, XP033021664, DOI: 10.1109/CVPR.2016.511 [retrieved on Dec. 9, 2016].
PCT/GB2020/051120—International Search Report and Written Opinion dated Jul. 27, 2020, 12 pages.
PCT/US2019/043526—International Search Report and Written Opinion dated Nov. 18, 2019, 9 pages.
PCT/US2019/043770—International Search Report and Written Opinion dated Nov. 13, 2019, 15 pages.
PCT/US2019/043775—International Search Report and Written Opinion dated Nov. 13, 2019, 10 pages.
PCT/US2019/049388—International Search Report and Wirtten Opinion dated Dec. 20, 2019, 11 pages.
PCT/US2020/028454—International Search Report and Written Opinion dated Jul. 27, 2020, 12 pages.
Symons, "Data Fusion Methods for Netted Sensors with Limited Communication Bandwidth", QinetiQ Ltd and University College London, 2004.
U.S. Appl. No. 15/945,473—Notice of Allowance dated Jul. 9, 2019, 7 pages.
U.S. Appl. No. 15/945,473—Response to Final Office Action, dated Jun. 24, 2019, 13 pages.
U.S. Appl. No. 16/255,573—Final Office Action dated Sep. 17, 2019, 29 pages.
U.S. Appl. No. 16/255,573 Response to NFOA, Jun. 17, 2019, 15 pages.
U.S. Appl. No. 16/256,358—Notice of Allowance dated Jul. 22, 2019, 12 pages.
U.S. Appl. No. 16/256,358—Response to Office Action, dated Jun. 25, 2019, 16 pages.
U.S. Appl. No. 16/256,904—Notice of Allowance dated Jun. 12, 2019, 28 pages.
U.S. Appl. No. 16/519,660—Office Action dated Aug. 20, 2020, 18 pages.
U.S. Office Action from U.S. Appl. No. 16/679,035 dated Feb. 3, 2021, 12 pages.
U.S. Office Action from U.S. Appl. No. 16/842,382 dated Mar. 4, 2021, 20 pages.
U.S. Office Action in U.S. Appl. No. 16/388,765 dated Feb. 4, 2021, 9 pages.
U.S. Office Action in U.S. Appl. No. 16/388,772 dated May 15, 2020, 12 pages.
U.S. Office Action in U.S. Appl. No. 16/389,109 dated Jan. 28, 2021, 11 pages.
U.S. Office Action in U.S. Appl. No. 16/519,660 dated Dec. 23, 2020, 21 pages.
U.S. Office Action in U.S. Appl. No. 16/679,027 dated Jan. 6, 2021, 12 pages.
Office Action in U.S. Appl. No. 16/256,936 dated May 16, 2019, 11 pages.
PCT/US2018/043933—International Search Report and Written Opinion dated Nov. 7, 2018, 12 pages.
PCT/US2018/043934—International Search Report and Written Opinion dated Feb. 1, 2019, 13 pages.
PCT/US2018/043939—International Search Report and Written Opinion dated Jan. 2, 2019, 17 pages.
PCT/US2019/049388—International Preliminary Report on Patentability dated Mar. 11, 2021, 7 pages.

(56) References Cited

OTHER PUBLICATIONS

Redmon et al., "You Only Look Once: Unified, Real-Time Object Detection," University of Washington, Allen Institute for AIy, Facebook AI Research, May 9, 2016, 10 pages.
U.S. Appl. No. 15/907,112—Notice of Allowance dated Sep. 18, 2018, 12 pages.
U.S. Appl. No. 15/945,466—Notice of Allowance dated Aug. 31, 2018, 7 pages.
U.S. Appl. No. 15/945,473—Final Office Action dated Apr. 23, 2019, 9 pages.
U.S. Appl. No. 15/945,473—Office Action dated Jan. 24, 2019, 17 pages.
U.S. Appl. No. 15/945,473—Response to Final Office Action dated Apr. 23, 2019, 13 pages.
U.S. Appl. No. 16/255,573—Office Action dated Mar. 18, 2019, 29 pages.
U.S. Appl. No. 16/255,573—Response to Office Action dated Mar. 18, 2019, 15 pages.
U.S. Appl. No. 16/256,355—Office Action dated Apr. 4, 2019, 29 pages.
U.S. Appl. No. 16/256,358—Office Action dated Mar. 28, 2019, 7 pages.
U.S. Appl. No. 16/256,904—Office Action dated Mar. 19, 2019, 16 pages.
U.S. Appl. No. 16/256,904—Response to Office Action dated Mar. 19, 2019, 16 pages.
U.S. Appl. No. 16/256,936—Office Action dated May 16, 2019, 27 pages.
U.S. Notice of Allowance in U.S. Appl. No. 15/847,796 dated May 10, 2018, 8 pages.
U.S. Notice of Allowance in U.S. Appl. No. 15/907,112 dated Sep. 18, 2018, 7 pages.
U.S. Office Action in U.S. Appl. No. 15/907,112 dated Jun. 26, 2018, 11 pages.
U.S. Office Action in U.S. Appl. No. 15/945,466 dated Jul. 20, 2018, 12 pages.
U.S. Office Action in U.S. Appl. No. 15/945,473 dated Aug. 8, 2018, 17 pages.
U.S. Office Action in U.S. Appl. No. 16/255,573, dated Mar. 18, 2019, 27 pages.
U.S. Office Action in U.S. Appl. No. 16/256,904, dated Mar. 19, 2019, 15 pages.
U.S. Response to NFOA in U.S. Appl. No. 15/907,112 dated Jul. 25, 2018, 12 pages.
U.S. Response to NFOA in U.S. Appl. No. 15/945,466 dated Jul. 25, 2018, 12 pages.
U.S. Appl. No. 16/256,936—Final Office Action dated Nov. 29, 2019, 23 pages.
U.S. Appl. No. 16/389,109—Office Action dated Jul. 9, 2020, 9 pages.

* cited by examiner

Perspective View of Shelf Unit B in Aisle 116a

```
Joint = {
    (x, y) position of joint,
    joint number (one of 19 possibilities, e.g., 1 = left-ankle, 2 = right-ankle),
    confidence number (describing how confident CNN is in its prediction),
    unique integer-ID for the joint
}
```

Joints data structure 460

FIG. 4B

Multi-camera Environment in An Area of Real Space (e.g., Shopping Store)

```
Subject = { Key  = frame_id
            Value = { Key  = camera_id
                      Value = Assigned joints to subject
                      [
                        [x of joint1, y of joint1, z of joint1],
                        [x of joint2, y of joint2, z of joint2],
                        ........
                        ........
                        [x of joint18, y of joint18, z of joint18],
                      ]
                    }
          }
```

Subject Data Structure 1200

FIG. 12

```
Log of Items = { Key   = Identifier (store_id / shelf_id / subject_id)
                 Value = { Key   = SKU
                           Value = integer (quantity) + frame number
                         }
               }
```

Inventory/Log Data Structure 1620

FIG. 17

SYSTEMS AND METHODS FOR AUTOMATED DESIGN OF CAMERA PLACEMENT AND CAMERAS ARRANGEMENTS FOR AUTONOMOUS CHECKOUT

PRIORITY APPLICATION

This application claims the benefit of U.S. Provisional Patent Application No. 63/044,971 filed 26 Jun. 2020, which application is incorporated herein by reference.

BACKGROUND

Field

The present invention relates to systems that identify and track puts and takes of items by subjects in real space.

Description of Related Art

Technologies have been developed to apply image processing to identify and track the actions of subjects in real space. For example, so-called cashier-less shopping systems are being developed to identify inventory items that have been picked up by the shoppers, and automatically accumulate shopping lists that can be used to bill the shoppers.

Tracking subjects or shoppers using images from the cameras of sensors positioned in an area of real space such as a shopping store presents many technical challenges. For example, consider such an image processing system deployed in a shopping store with multiple shoppers moving in aisles between the shelves and open spaces within the shopping store. Shopper interactions can include taking items from shelves (i.e. a fixed inventory cache) and placing them in their respective shopping carts or baskets (i.e. a moving inventory cache). Shoppers may also put items back on the shelf in an exchange from a moving inventory cache to a fixed inventory cache, if they do not want the item. The shoppers can also transfer items in their hands to the hands of other shoppers who may then put these items in their shopping carts or baskets in an exchange between two moving inventory caches. The shoppers can also simply touch inventory items, without an exchange of the inventory items.

Multiple cameras with overlapping fields of view can capture shoppers and interactions of shoppers as described above. The cameras or sensors can have overlapping fields of view to detect shoppers and their interactions even when parts of shoppers may be occluded due to the presence of other shoppers or objects in the shopping store. The cameras need to be placed in the shopping store to provide a good coverage of the area. However, the cost of installation and operation of cameras can increase as the number of cameras is increased. Therefore, an opportunity arises to develop systems and methods to automatically determine placement of cameras to increase the coverage of the area while reducing the cost.

It is desirable to provide a technology that solves technological challenges involved in effectively and automatically determining placement of cameras in the area of real space to detect shoppers and their interactions with inventory items, including puts, takes and transfers, in large spaces.

SUMMARY

A system, and method for operating a system, are provided for determining an improved camera coverage plan. The camera coverage plan can include a number, a placement, and a pose of cameras that are arranged to track puts and takes of items by subjects in a three-dimensional real space. The computer-implemented method can include receiving an initial camera coverage plan including a three-dimensional map of a three-dimensional real space, an initial number and initial pose of a plurality of cameras and a camera model including characteristics of the cameras. The computer-implemented method can include beginning with the initial camera coverage plan received, iteratively applying a machine learning process to an objective function of number and poses of cameras, and subject to a set of constraints, to obtain from the initial camera coverage plan as received, an improved camera coverage plan. The improved camera coverage plan can be obtained using one or more of: (i) a changed number of cameras, and (ii) a changed number of camera poses, and having an improved coverage score and concurrently using a same or reduced number of cameras. The computer-implemented method includes providing the improved camera coverage plan to an installer to arrange cameras to track puts and takes of items by subjects in the three-dimensional real space.

Applying a machine learning process to an objective function of number and poses of cameras, and subject to a set of constraints to obtain the improved camera coverage plan can include a plurality of processes; some exemplary ones are described here. The method can include determining a set of camera coverage maps per camera including one of a first set of occupied voxels representing positions on a shelf in field of view. The computer-implemented method can include aggregating camera coverage maps to obtain a first aggregate coverage map for the shelf based upon the first set of occupied voxels.

In one embodiment, the computer-implemented method can include applying a machine learning process to an objective function of number and poses of cameras, and subject to a set of constraints to obtain the improved camera coverage plan. The computer-implemented method can include applying a first coverage threshold to the first aggregate coverage map covering a number of cameras having voxels representing positions on a shelf in field of view.

In one embodiment, the computer-implemented method can include applying a first coverage threshold to coverage map covering a number of cameras having voxels representing positions on a shelf in field of view. The first coverage threshold can comprise at least 3 cameras having voxels representing positions on a shelf in field of view.

In one embodiment, the computer-implemented method can include applying a machine learning process to an objective function of number and poses of cameras, and subject to a set of constraints to obtain the improved camera coverage plan. The process of obtaining the improved coverage plan can include the following process steps. The process can include determining a set of camera coverage maps per camera including one of a second set of occupied voxels representing positions of simulated subjects on a plane at some height above a floor of the three-dimensional real space through which simulated subjects would move through. The process can include aggregating camera coverage maps to obtain a second aggregate coverage map based upon the second set of occupied voxels.

In one embodiment, the computer-implemented method can include applying a machine learning process to an objective function of number and poses of cameras, and subject to a set of constraints to obtain the improved camera coverage plan. The method can include applying a second coverage threshold to the second aggregate coverage map covering select portions of a plane at some height above a floor of the three-dimensional real space through which simulated subjects would move.

In one embodiment, computer-implemented method can include applying a second coverage threshold to second aggregate coverage map covering select portions of a plane at some height above a floor of the three-dimensional real space through which simulated subjects would move. The second coverage threshold can comprise a range of 80% or greater of a plane at some height above a floor of the three-dimensional real space through which simulated subjects would move through.

In one embodiment, the computer-implemented method of applying a machine learning process to an objective function of number and poses of cameras, and subject to a set of constraints to obtain the improved camera coverage plan can include the following processing steps. The process can include applying to the second aggregate coverage map, a third coverage threshold comprising at least 2 cameras with at least 60 degrees angle of incidence covering select portions of a plane at some height above a floor of the three-dimensional real space through which simulated subjects would move through.

The initial camera coverage plan can be one selected from (i) a random initialized coverage plan comprising an initial number of cameras randomly distributed in the three-dimensional real space and (ii) a proto-coverage plan comprising a received input of an initial number of cameras approximately positioned in the three-dimensional real space.

One example of a camera model for a camera includes a camera intrinsic matrix and distortion values of a lens used on the camera.

The set of constraints can include physical constraints and coverage constraints. The physical constraints can be detected from images of the three-dimensional real space by a machine learning algorithm.

The physical constraints can include a presence of a fixture, a presence of a speaker, a presence of a heating, ventilation, air conditioning (HVAC) vent, combinations thereof, and others. It is understood that the system can consider other types of physical constraints when determining the improved camera coverage plan.

The coverage constraints can include a number of cameras having a voxel in a structure or display holding inventory within view, a number of cameras having a voxel in a tracking zone of volume in which subjects are tracked within view, a difference in angles of incidence between cameras having a voxel within view, and an overall coverage of the three-dimensional real space.

In an exemplary implementation, the machine learning process can include a mixed integer programming algorithm.

In an alternative implementation, the machine learning process can include a gradient descent algorithm.

In one embodiment, the computer-implemented method can include providing a plurality of improved coverage plans meeting or exceeding constraints and receiving a selection from the plurality as provided to use in tracking puts and takes.

The technology disclosed provides a tool in an automated design environment for configuring an autonomous store. The tool can comprise one or more processors coupled to a storage medium storing instructions for determining an improved camera coverage plan including a number, a placement, and a pose of cameras that are arranged to track puts and takes of items by subjects in a three-dimensional real space of the autonomous store. The instructions when executed by the one or more processors can implement the method described above.

The technology disclosed can be deployed in a physical store having a volume of real space encompassed by a building. The volume of real space including cameras placed using one or more processors can implement the method described above.

A system including one or more processors and memory accessible by the processors is also described. The memory can be loaded with computer instructions which can be executed on the processors. The computer instructions when executed on the processors can implement the method for determining an improved camera coverage plan including a number, a placement, and a pose of cameras that are arranged to track puts and takes of items by subjects in a three-dimensional real space. The puts and takes of items by subjects can include exchange of items between inventory caches which can act as at least one of sources and sinks of inventory items in exchanges of inventory items. Computer program products which can be executed by computer systems are also described herein.

Systems and method are disclosed for an automated check-out system. The automated check-out system can comprise a classification engine including one or more processors executing stored instructions that when executed by the one or more processors implement tracking of puts and takes by subjects. The system can comprise a plurality of cameras sending sequences of images to the classification engine, placed using one or more processors that implement a method including the following processing steps. The method includes receiving an initial camera coverage plan including a three-dimensional map of a three-dimensional real space, an initial number and initial pose of a plurality of cameras and a camera model including characteristics of the cameras. The method includes beginning with the initial camera coverage plan received, iteratively applying a machine learning process to an objective function of number and poses of cameras, and subject to a set of constraints, to obtain from the initial camera coverage plan as received, an improved camera coverage plan. The improved camera coverage plan can be obtained using one or more of: (i) a changed number of cameras, and (ii) a changed number of camera poses, and having an improved coverage score and concurrently using a same or reduced number of cameras. The method includes providing the improved camera coverage plan to an installer to arrange cameras to track puts and takes of items by subjects in a three-dimensional real space. Computer program products which can be executed by computer systems are also described herein.

Other aspects and advantages of the present invention can be seen on review of the drawings, the detailed description and the claims, which follow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4B is an example data structure for storing joint information.

FIG. 12 presents an example data structure for storing a subject including the information of associated joints.

FIG. 17 is an example data structure including locations of inventory caches for storing inventory items.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

A system and various implementations of the subject technology are described with reference to FIGS. 1-23. The system and processes are described with reference to FIG. 1, an architectural level schematic of a system in accordance with an implementation. Because FIG. 1 is an architectural diagram, certain details are omitted to improve the clarity of the description.

Figure 1:
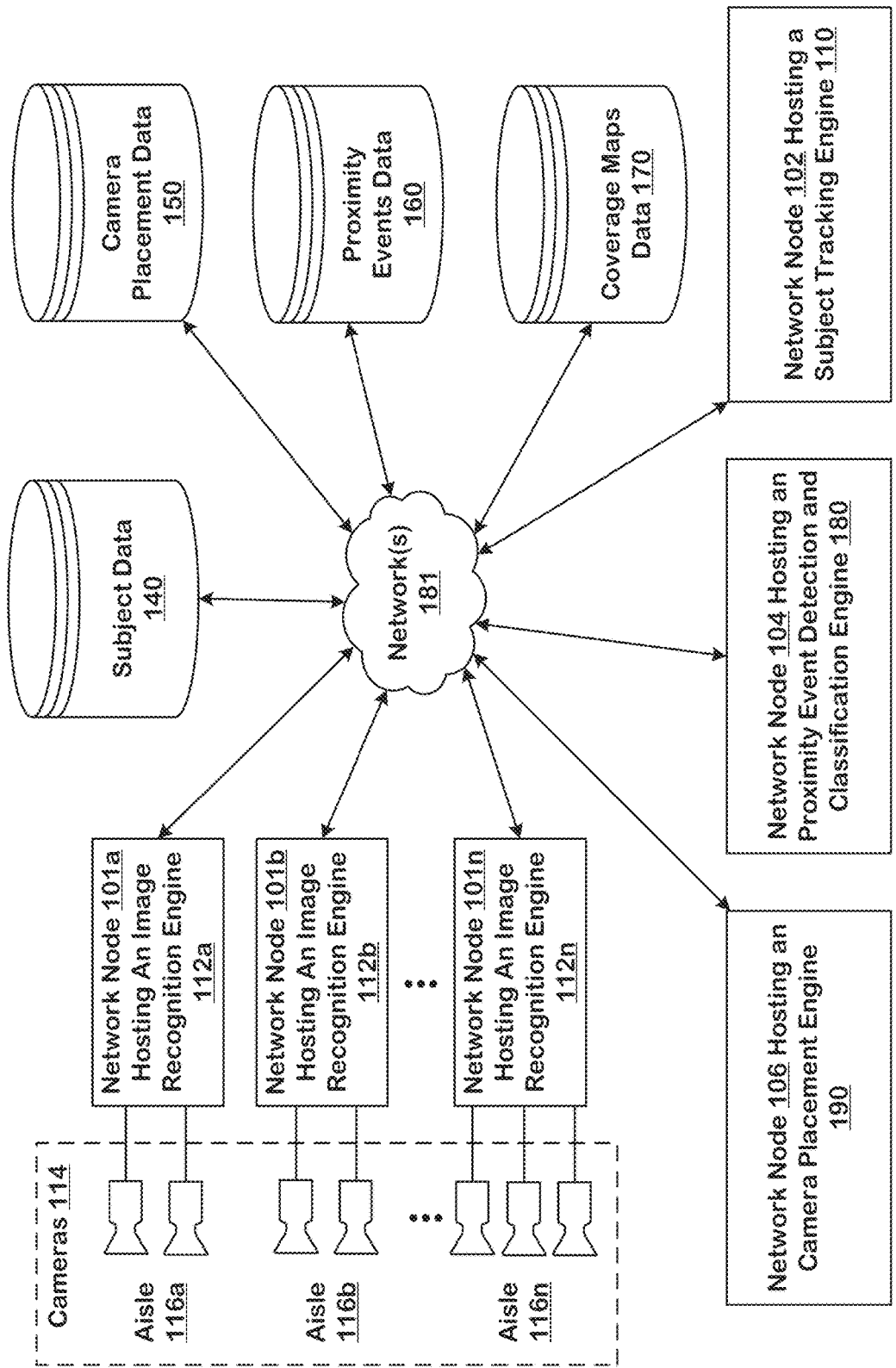
FIG. 1 illustrates an architectural level schematic of a system in which a camera placement engine can periodically calibrate cameras in an area of real space.

The discussion of FIG. 1 is organized as follows. First, the elements of the system are described, followed by their interconnections. Then, the use of the elements in the system is described in greater detail.

FIG. 1 provides a block diagram level illustration of a system 100. The system 100 includes cameras 114, network nodes hosting image recognition engines 112a, 112b, and 112n, a subject tracking engine 110 deployed in a network node 102 (or nodes) on the network, a subject database 140, a camera placement database 150, a proximity (or location) events database 160, a coverage maps database 170, a proximity event detection and classification engine 180 deployed in a network node 104 (or nodes), a camera placement engine 190 deployed in a network node (or nodes) 106 and a communication network or networks 181. The network nodes can host only one image recognition engine, or several image recognition engines as described herein. The system can also include an inventory database, a joints heuristics database and other supporting data.

As used herein, a network node is an addressable hardware device or virtual device that is attached to a network, and is capable of sending, receiving, or forwarding information over a communications channel to or from other network nodes, including channels using TCP/IP sockets for example. Examples of electronic devices which can be deployed as hardware network nodes having media access layer addresses, and supporting one or more network layer addresses, include all varieties of computers, workstations, laptop computers, handheld computers, and smartphones. Network nodes can be implemented in a cloud-based server system. More than one virtual device configured as a network node can be implemented using a single physical device.

For the sake of clarity, only three network nodes hosting image recognition engines are shown in the system 100. However, any number of network nodes hosting image recognition engines can be connected to the tracking engine 110 through the network(s) 181. Also, the image recognition engine, the tracking engine, the proximity event detection engine and other processing engines described herein can execute using more than one network node in a distributed architecture.

The interconnection of the elements of system 100 will now be described. The network(s) 181 couples the network nodes 101a, 101b, and 101n, respectively, hosting image recognition engines 112a, 112b, and 112n, the network node 102 hosting the tracking engine 110, the subject database 140, the camera placement database 150, the proximity events database 160, the coverage maps database 170, the network node 104 hosting the proximity event detection engine 180, and the network node 106 hosting the camera placement engine 190. Cameras 114 are connected to the tracking engine 110 through network nodes hosting image recognition engines 112a, 112b, and 112n. In one embodiment, the cameras 114 are installed in a shopping store (such as a supermarket) such that sets of cameras 114 (two or more) with overlapping fields of view are positioned over each aisle to capture images of real space in the store. In FIG. 1, two cameras are arranged over aisle 116a, two cameras are arranged over aisle 116b, and three cameras are arranged over aisle 116n. The cameras 114 are installed over aisles with overlapping fields of view. In such an embodiment, the cameras are configured with the goal that customers moving in the aisles of the shopping store are present in the field of view of two or more cameras at any moment in time.

Cameras 114 can be synchronized in time with each other, so that images are captured at the same time, or close in time, and at the same image capture rate. The cameras 114 can send respective continuous streams of images at a predetermined rate to network nodes hosting image recognition engines 112a-112n. Images captured in all the cameras covering an area of real space at the same time, or close in time, are synchronized in the sense that the synchronized images can be identified in the processing engines as representing different views of subjects having fixed positions in the real space. For example, in one embodiment, the cameras send image frames at the rate of 30 frames per second (fps) to respective network nodes hosting image recognition engines 112a-112n. Each frame has a timestamp, identity of the camera (abbreviated as "camera_id"), and a frame identity (abbreviated as "frame_id") along with the image data. Other embodiments of the technology disclosed can use different types of sensors such as infrared image sensors, RF image sensors, ultrasound sensors, thermal sensors, Lidars, etc., to generate this data. Multiple types of sensors can be used, including for example ultrasound or RF sensors in addition to the cameras 114 that generate RGB color output. Multiple sensors can be synchronized in time with each other, so that frames are captured by the sensors at the same time, or close in time, and at the same frame capture rate. In all of the embodiments described herein, sensors other than cameras, or sensors of multiple types, can be used to produce the sequences of images utilized. The images output by the sensors have a native resolution, where the resolution is defined by a number of pixels per row and a number of pixels per column, and by a quantization of the data of each pixel. For example, an image can have a resolution of 1280 columns by 720 rows of pixels over the full field of view, where each pixel includes one byte of data representing each of red, green and blue RGB colors.

Cameras installed over an aisle are connected to respective image recognition engines. For example, in FIG. 1, the two cameras installed over the aisle 116a are connected to the network node 101a hosting an image recognition engine 112a. Likewise, the two cameras installed over the aisle 116b are connected to the network node 101b hosting an image recognition engine 112b. Each image recognition engine 112a-112n hosted in a network node or nodes 101a-101n, separately processes the image frames received from one camera each in the illustrated example.

The technology disclosed is related to autonomous checkout systems or cashier-less stores in which customers (also referred to as subjects, or shoppers) can enter the store, walk in the aisles or open spaces in the store, take items from item display structures and leave the store. The system includes the logic to track the subjects while they are present in the store and associate items to respective subjects who take the items from the display structures. The technology disclosed can then automatically complete the checkout process as the subjects leave the store and charge the subjects for their respective items.

Designing an environment for an autonomous checkout system in an area of real space presents numerous technical challenges. For example, the autonomous checkout systems that use images from sensors or cameras to track subjects in the area of real space and process checkout of subjects require multiple sensors or cameras in the area of real space to generate streams or sequences of images. Reliable tracking of subjects in the area of space and detection of takes and puts of items requires placement of cameras in the area of real space such that a subject is in the field of view of more than one camera at any position in the area of real space. The cameras also need to be oriented such that they can capture front view of display structures (such as shelves). There can be additional constraints that need to be considered when determining the number of cameras, their positions and orientations in the area of real space. For example, there are certain areas where cameras cannot be positioned, e.g., lights or other fixtures on the ceiling, speakers or air conditioning vents, pipes, etc.

Designing an autonomous environment poses unique and new challenges that are not addressed in existing techniques for camera placement. For example, some of the existing techniques use two-dimensional regions when determining camera placement. Some other techniques that use three-dimensional positions of cameras when determining placement of cameras do not include constraints such as at least two cameras with overlapping fields of view to track subjects. Additionally, the existing techniques determine a camera placement for an area such that it is optimized for one objective function. The technical problem addressed by the technology disclosed addresses two separate problems:

tracking subjects, and detecting puts and take of items by subjects. An autonomous checkout system needs to reliably solve both these problems for operations of a cashier-less store.

Technology disclosed provides a camera placement and coverage analysis tool that can automatically determine the number of cameras, their positions and orientation for use in a given area of real space, such that the subjects in the area of subjects are reliably tracked and items taken by the subjects are associated with them for checkout. The camera placement and coverage analysis tool can determine the number of cameras, their positions and orientations for an area of real space (such as a shopping store).

The technology disclosed provides a computer-implemented method for determining an improved camera coverage plan including a number, a placement, and a pose of cameras that are arranged to track puts and takes of items by subjects in a three-dimensional real space. The computer-implemented method can receive an initial camera coverage plan including a three-dimensional map of a three-dimensional real space. The computer-implemented method can also receive an initial number and initial pose of a plurality of cameras and a camera model including characteristics of the cameras. The camera characteristics can be defined in extrinsic and intrinsic calibration parameters as described herein. The computer-implemented method can begin with the initial camera coverage plan received and iteratively apply a machine learning process to an objective function of number and poses of cameras subject to a set of constraints. The machine learning process can include a mixed integer programming algorithm. The machine learning process includes a gradient descent algorithm. Other types of machine learning processes can be used by the technology disclosed.

The technology disclosed can be applied to placement or positioning of mobile robots or mobile sensing devices equipped with sensors with the task of covering a three-dimensional area of real space given certain constraints. The method can compute position and orientation of robots and sensors in such implementations. With a different sensor modality, the method can be used with cameras with Pan-Title-Zoom capabilities. By adding different zoom, pan, and tilt values to the search space, the method can find optimal positions, orientations and zoom values for each camera given certain constraints. In the above example implementations, the method disclosed can handle dynamic environments where sensor re-configuration is required as the sensors would be able to re-configure themselves to cope with the new environmental physical constraints.

The computer-implemented method obtains from the initial camera coverage plan as received, an improved camera coverage plan using one or more of: (i) a changed number of cameras, and (ii) a changed number of camera poses. The improved camera coverage plan has an improved camera coverage score and concurrently uses a same or reduced number of cameras than the initial camera coverage plan or the camera coverage plan in a previous iteration. The computer-implemented method can provide the improved camera coverage plan to an installer to arrange cameras to track puts and takes of items by subjects in the three-dimensional real space. The improved coverage plans meeting or exceeding constraints can be used for tracking movement of subjects and puts, takes and touch events of subjects in the area of real space.

Referring back to FIG. 1, in one embodiment, each image recognition engine 112*a*, 112*b*, and 112*n* is implemented as a deep learning algorithm such as a convolutional neural network (abbreviated CNN). In such an embodiment, the CNN is trained using a training database. In an embodiment described herein, image recognition of subjects in the real space is based on identifying and grouping joints recognizable in the images, where the groups of joints can be attributed to an individual subject. For this joints-based analysis, the training database has a large collection of images for each of the different types of joints for subjects. In the example embodiment of a shopping store, the subjects are the customers moving in the aisles between the shelves. In an example embodiment, during training of the CNN, the system 100 is referred to as a "training system". After training the CNN using the training database, the CNN is switched to production mode to process images of customers in the shopping store in real time. In an example embodiment, during production, the system 100 is referred to as a runtime system (also referred to as an inference system). The CNN in each image recognition engine produces arrays of joints data structures for images in its respective stream of images. In an embodiment as described herein, an array of joints data structures is produced for each processed image, so that each image recognition engine 112*a*-112*n* produces an output stream of arrays of joints data structures. These arrays of joints data structures from cameras having overlapping fields of view are further processed to form groups of joints, and to identify such groups of joints as subjects.

The cameras 114 are calibrated before switching the CNN to production mode. The technology disclosed can include a calibrator that includes a logic to calibrate the cameras and stores the calibration data in a calibration database.

The tracking engine 110, hosted on the network node 102, receives continuous streams of arrays of joints data structures for the subjects from image recognition engines 112*a*-112*n*. The tracking engine 110 processes the arrays of joints data structures and translates the coordinates of the elements in the arrays of joints data structures corresponding to images in different sequences into candidate joints having coordinates in the real space. For each set of synchronized images, the combination of candidate joints identified throughout the real space can be considered, for the purposes of analogy, to be like a galaxy of candidate joints. For each succeeding point in time, movement of the candidate joints is recorded so that the galaxy changes over time. The output of the tracking engine 110 is stored in the subject database 140.

The tracking engine 110 uses logic to identify groups or sets of candidate joints having coordinates in real space as subjects in the real space. For the purposes of analogy, each set of candidate joints is like a constellation of candidate joints at each point in time. The constellations of candidate joints can move over time.

The logic to identify sets of candidate joints comprises heuristic functions based on physical relationships amongst joints of subjects in real space. These heuristic functions are used to identify sets of candidate joints as subjects. The heuristic functions are stored in a heuristics database. The output of the subject tracking engine 110 is stored in the subject database 140. Thus, the sets of candidate joints comprise individual candidate joints that have relationships according to the heuristic parameters with other individual candidate joints and subsets of candidate joints in a given set that has been identified, or can be identified, as an individual subject.

We now present an example environment of a cashier-less store for which the camera placement and orientation is determined. In the example of a shopping store, shoppers (also referred to as customers or subjects) move in the aisles and in open spaces. The shoppers can take items from shelves in inventory display structures. In one example of inventory display structures, shelves are arranged at different levels (or heights) from the floor and inventory items are stocked on the shelves. The shelves can be fixed to a wall or placed as freestanding shelves forming aisles in the shopping store. Other examples of inventory display structures include pegboard shelves, magazine shelves, lazy susan shelves, warehouse shelves, and refrigerated shelving units. The inventory items can also be stocked in other types of inventory display structures such as stacking wire baskets, dump bins, etc. The customers can also put items back on the same shelves from where they were taken or on another shelf. The system can include a maps database in which locations of inventory caches on inventory display structures in the area of real space are stored. In one embodiment, three-dimensional maps of inventory display structures are stored that include the width, height, and depth information of display structures along with their positions in the area of real space. In one embodiment, the system can include or have access to memory storing a planogram identifying inventory locations in the area of real space and inventory items to be positioned on inventory locations. The planogram can also include information about portions of inventory locations designated for particular inventory items. The planogram can be produced based on a plan for the arrangement of inventory items on the inventory locations in the area of real space.

As the shoppers (or subjects) move in the shopping store, they can exchange items with other shoppers in the store. For example, a first shopper can hand-off an item to a second shopper in the shopping store. The second shopper who takes the item from the first shopper can then in turn put that item in her shopping basket or shopping cart, or simply keep the item in her hand. The second shopper can also put the item back on a shelf. The technology disclosed can detect a "proximity event" in which a moving inventory cache is positioned close to another inventory cache which can be moving or fixed, such that a distance between them is less than a threshold (e.g., 10 cm). Different values of the threshold can be used greater than or less than 10 cm. In one embodiment, the technology disclosed uses locations of joints to locate inventory caches linked to shoppers to detect the proximity event. For example, the system can detect a proximity event when a left or a right hand joint of a shopper is positioned closer than the threshold to a left or right hand joint of another shopper or a shelf location. The system can also use positions of other joints such as elbow joints, or shoulder joints of a subject to detect proximity events. The proximity event detection and classification engine 180 includes the logic to detect proximity events in the area of real space. The system can store the proximity events in the proximity events database 160.

The technology disclosed can process the proximity events to detect puts and takes of inventory items. For example, when an item is handed-off from the first shopper to the second shopper, the technology disclosed can detect the proximity event. Following this, the technology disclosed can detect the type of the proximity event, e.g., a put, take or touch type event. When an item is exchanged between two shoppers, the technology disclosed detects a put type event for the source shopper (or source subject) and a take type event for the sink shopper (or sink subject). The system can then process the put and take events to determine the item exchanged in the proximity event. This information is then used by the system to update the log data structures (or shopping cart data structures) of the source and sink shoppers. For example, the item exchanged is removed from the log data structure of the source shopper and added to the log data structure of the sink shopper. The system can apply the same processing logic when shoppers take items from shelves and put items back on the shelves. In this case, the exchange of items takes place between a shopper and a shelf. The system determines the item taken from the shelf or put on the shelf in the proximity event. The system then updates the log data structures of the shopper and the shelf accordingly.

The technology disclosed includes logic to detect a same event in the area of real space using multiple parallel image processing pipelines or subsystems or procedures. These redundant event detection subsystems provide robust event detection and increase the confidence detection of puts and takes by matching events in multiple event streams. The system can then fuse events from multiple event streams using a weighted combination of items classified in event streams. In case one image processing pipeline cannot detect an event, the system can use the results from other image processing pipelines to update the log data structure of the shoppers. We refer to these events of puts and takes in the area of real space as "inventory events". An inventory event can include information about the source and sink, classification of the item, a timestamp, a frame identifier, and a location in three dimensions in the area of real space. The multiple streams of inventory events can include a stream of location based-events, a stream of region proposals-based events, and a stream of semantic diffing-based events. We provide the details of the system architecture, including the machine learning models, system components, and processing steps in the three image processing pipelines, respectively producing the three event streams. We also provide logic to fuse the events in a plurality of event streams.

The technology disclosed can include logic to perform the recalibration process and the subject tracking and event detection processes substantially contemporaneously, thereby enabling cameras to be calibrated without clearing subjects from the real space or interrupting tracking puts and takes of items by subjects.

The actual communication path through the network 181 can be point-to-point over public and/or private networks. The communications can occur over a variety of networks 181, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as a LAN (local area network), WAN (wide area network), telephone network (Public Switched Telephone Network (PSTN), Session Initiation Protocol (SIP), wireless network, point-to-point network, star network, token ring network, hub network, and Internet, inclusive of the mobile Internet, via protocols such as EDGE, 3 G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The technology disclosed herein can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation, or a NoSQL™ non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™ Truviso™, Amazon Elasticsearch Service™, Amazon Web Services™ (AWS), IBM Info-Sphere™, Borealis™, and Yahoo! S4™. We now present camera arrangement in a multi-camera environment to track subjects and detect proximity events.

Camera Arrangement

The cameras 114 are arranged to track multi-joint entities (or subjects) in a three-dimensional (abbreviated as 3D) real space. In the example embodiment of the shopping store, the real space can include the area of the shopping store where items for sale are stacked in shelves. A point in the real space can be represented by an (x, y, z) coordinate system. Each point in the area of real space for which the system is deployed is covered by the fields of view of two or more cameras 114.

Figure 2A:
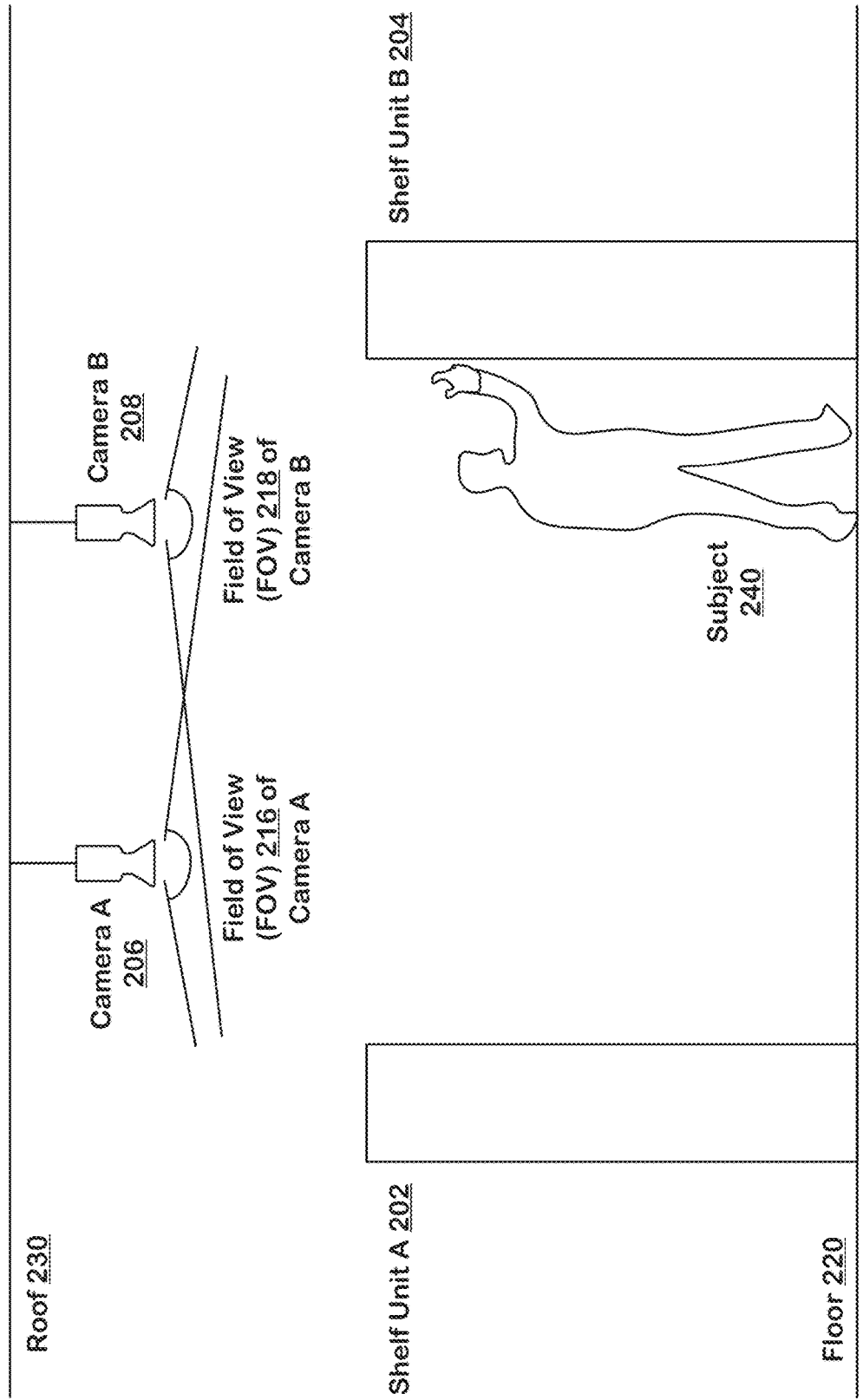
FIG. 2A is a side view of an aisle in a shopping store illustrating a camera arrangement.

In a shopping store, the shelves and other inventory display structures can be arranged in a variety of manners, such as along the walls of the shopping store, or in rows forming aisles or a combination of the two arrangements. FIG. 2A shows an arrangement of shelves, forming an aisle 116a, viewed from one end of the aisle 116a. Two cameras, camera A 206 and camera B 208, are positioned over the aisle 116a at a predetermined distance from a roof 230 and a floor 220 of the shopping store above the inventory display structures such as shelves. The cameras 114 comprise cameras disposed over and having fields of view encompassing respective parts of the inventory display structures and floor area in the real space. If we view the arrangement of cameras from the top, the camera A 206 is positioned at a predetermined distance from the shelf A 202 and the camera B 208 is positioned at a predetermined distance from the shelf B 204. In another embodiment, in which more than two cameras are positioned over an aisle, the cameras are positioned at equal distances from each other. In such an embodiment, two cameras are positioned close to the opposite ends and a third camera is positioned in the middle of the aisle. It is understood that a number of different camera arrangements are possible.

The coordinates in real space of members of a set of candidate joints, identified as a subject, identify locations in the floor area of the subject. In the example embodiment of the shopping store, the real space can include all of the floor 220 in the shopping store from which inventory can be accessed. Cameras 114 are placed and oriented such that areas of the floor 220 and shelves can be seen by at least two cameras. The cameras 114 also cover at least part of the shelves 202 and 204 and floor space in front of the shelves 202 and 204. Camera angles are selected to have both steep perspectives, straight down, and angled perspectives that give more full body images of the customers. In one example embodiment, the cameras 114 are configured at an eight (8) foot height or higher throughout the shopping store. FIG. 13 presents an illustration of such an embodiment.

In FIG. 2A, the cameras 206 and 208 have overlapping fields of view, covering the space between a shelf A 202 and a shelf B 204 with overlapping fields of view 216 and 218, respectively. A location in the real space is represented as an (x, y, z) point of the real space coordinate system. "x" and "y" represent positions on a two-dimensional (2D) plane which can be the floor 220 of the shopping store. The value "z" is the height of the point above the 2D plane at the floor 220 in one configuration.

Figure 2B:
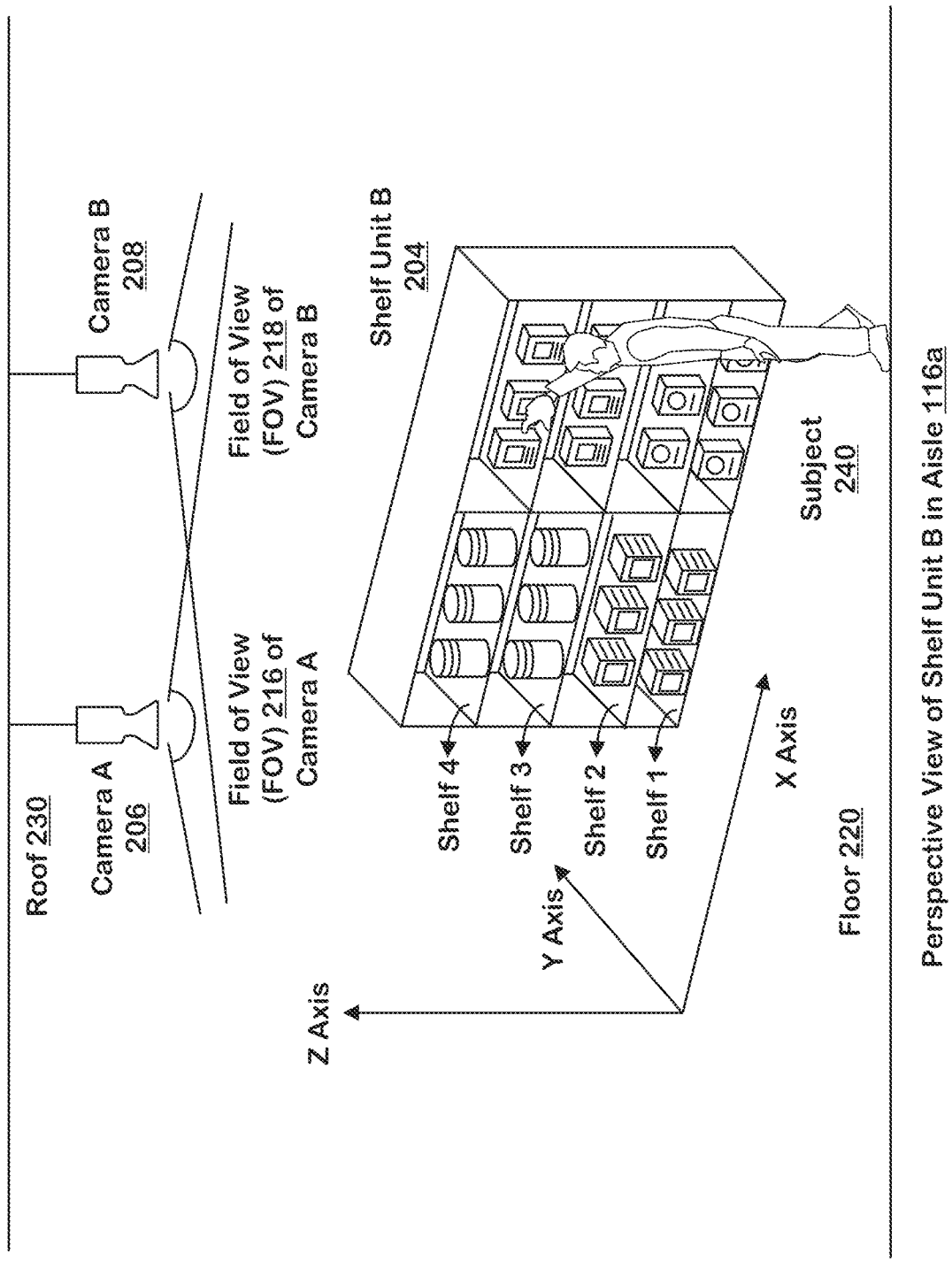
FIG. 2B is a perspective view of a subject interacting with items on shelves in an inventory display structure in the area of real space.

FIG. 2B is a perspective view of the shelf unit B 204 with four shelves, shelf 1, shelf 2, shelf 3, and shelf 4, positioned at different levels from the floor. The inventory items are stocked on the shelves. A subject 240 is reaching out to take an item from the right-hand side portion of the shelf 4. A location in the real space is represented as an (x, y, z) point of the real space coordinate system. "x" and "y" represent positions on a two-dimensional (2D) plane which can be the floor 220 of the shopping store. The value "z" is the height of the point above the 2D plane at floor 220 in one configuration.

Camera Calibration

The system can perform two types of calibrations: internal and external. In internal calibration, the internal parameters of the cameras 114 are calibrated. Examples of internal camera parameters include focal length, principal point, skew, fisheye coefficients, etc. A variety of techniques for internal camera calibration can be used. One such technique is presented by Zhang in "A flexible new technique for camera calibration" published in IEEE Transactions on Pattern Analysis and Machine Intelligence, Volume 22, No. 11, November 2000.

In external calibration, the external camera parameters are calibrated in order to generate mapping parameters for translating the 2D image data into 3D coordinates in real space. In one embodiment, one subject, such as a person, is introduced into the real space. The subject moves through the real space on a path that passes through the field of view of each of the cameras 114. At any given point in the real space, the subject is present in the fields of view of at least two cameras forming a 3D scene. The two cameras, however, have a different view of the same 3D scene in their respective two-dimensional (2D) image planes. A feature in the 3D scene such as a left-wrist of the subject is viewed by two cameras at different positions in their respective 2D image planes.

A point correspondence is established between every pair of cameras with overlapping fields of view for a given scene. Since each camera has a different view of the same 3D scene, a point correspondence is two pixel locations (one location from each camera with an overlapping field of view) that represent the projection of the same point in the 3D scene. Many point correspondences are identified for each 3D scene using the results of the image recognition engines 112a-112n for the purposes of the external calibration. The image recognition engines identify the position of a joint as (x, y) coordinates, such as row and column numbers, of pixels in the 2D image planes of the respective cameras 114. In one embodiment, a joint is one of 19 different types of joints of the subject. As the subject moves through the fields of view of different cameras, the tracking engine 110 receives (x, y) coordinates of each of the 19 different types of joints of the subject per image from the cameras 114 used for the calibration.

For example, consider an image from a camera A and an image from a camera B both taken at the same moment in time and with overlapping fields of view. There are pixels in an image from camera A that correspond to pixels in a synchronized image from camera B. Consider that there is a specific point of some object or surface in view of both camera A and camera B and that point is captured in a pixel of both image frames. In external camera calibration, a multitude of such points are identified and referred to as corresponding points. Since there is one subject in the field of view of camera A and camera B during calibration, key joints of this subject are identified, for example, the center of the left wrist. If these key joints are visible in image frames from both camera A and camera B then it is assumed that these represent corresponding points. This process is repeated for many image frames to build up a large collection of corresponding points for all pairs of cameras with overlapping fields of view. In one embodiment, images are streamed off of all cameras at a rate of 30 FPS (frames per second) or more and a resolution of 1280 by 720 pixels in full RGB (red, green, and blue) color. These images are in the form of one-dimensional arrays (also referred to as flat arrays).

In some embodiments, the resolution of the images is reduced before applying the images to the inference engines used to detect the joints in the images, such as by dropping every other pixel in a row, reducing the size of the data for each pixel, or otherwise, so the input images at the inference engine have smaller amounts of data, and so the inference engines can operate faster.

The large number of images collected above for a subject can be used to determine corresponding points between cameras with overlapping fields of view. Consider two cameras A and B with overlapping fields of view. The plane passing through the camera centers of cameras A and B and the joint location (also referred to as the feature point) in the 3D scene is called the "epipolar plane". The intersection of the epipolar plane with the 2D image planes of the cameras A and B defines the "epipolar line". Given these corresponding points, a transformation is determined that can accurately map a corresponding point from camera A to an epipolar line in camera B's field of view that is guaranteed to intersect the corresponding point in the image frame of camera B. Using the image frames collected above for a subject, the transformation is generated. It is known in the art that this transformation is non-linear. The general form is furthermore known to require compensation for the radial distortion of each camera's lens, as well as the non-linear coordinate transformation moving to and from the projected space. In external camera calibration, an approximation to the ideal non-linear transformation is determined by solving a non-linear optimization problem. This non-linear optimization function is used by the tracking engine 110 to identify the same joints in outputs (arrays of joints data structures) of different image recognition engines 112a-112n, processing images of the cameras 114 with overlapping fields of view. The results of the internal and external camera calibration are stored in the calibration database.

A variety of techniques for determining the relative positions of the points in images of cameras 114 in the real space can be used. For example, Longuet-Higgins published, "A computer algorithm for reconstructing a scene from two projections" in Nature, Volume 293, 10 Sep. 1981. This paper presents computing a three-dimensional structure of a scene from a correlated pair of perspective projections when the spatial relationship between the two projections is unknown. The Longuet-Higgins paper presents a technique to determine the position of each camera in the real space with respect to other cameras. Additionally, their technique allows the triangulation of a subject in the real space, identifying the value of the z-coordinate (height from the floor) using images from cameras 114 with overlapping fields of view. An arbitrary point in the real space, for example, the end of a shelf in one corner of the real space, is designated as a (0, 0, 0) point on the (x, y, z) coordinate system of the real space.

In an embodiment of the technology, the parameters of the external calibration are stored in two data structures. The first data structure stores intrinsic parameters. The intrinsic parameters represent a projective transformation from the 3D coordinates into 2D image coordinates. The first data structure contains intrinsic parameters per camera as shown below. The data values are all numeric floating point numbers. This data structure stores a 3×3 intrinsic matrix, represented as "K" and distortion coefficients. The distortion coefficients include six radial distortion coefficients and two tangential distortion coefficients. Radial distortion occurs when light rays bend more near the edges of a lens than they do at its optical center. Tangential distortion occurs when the lens and the image plane are not parallel. The following data structure shows values for the first camera only. Similar data is stored for all the cameras 114.
{
 1: {
  K: [[x, x, x], [x, x, x], [x, x, x]],
  distortion_coefficients: [x, x, x, x, x, x, x, x]
 }
 . . .
}

The second data structure stores per pair of cameras: a 3×3 fundamental matrix (F), a 3×3 essential matrix (E), a 3×4 projection matrix (P), a 3×3 rotation matrix (R) and a 3×1 translation vector (t). This data is used to convert points in one camera's reference frame to another camera's reference frame. For each pair of cameras, eight homography coefficients are also stored to map the plane of the floor 220 from one camera to another. A fundamental matrix is a relationship between two images of the same scene that constrains where the projection of points from the scene can occur in both images. An essential matrix is also a relationship between two images of the same scene with the condition that the cameras are calibrated. The projection matrix gives a vector space projection from the 3D real space to a subspace. The rotation matrix is used to perform a rotation in Euclidean space. The translation vector "t" represents a geometric transformation that moves every point of a Fig. or a space by the same distance in a given direction. The homography_floor_coefficients are used to combine images of features of subjects on the floor 220 viewed by cameras with overlapping fields of views. The second data structure is shown below. Similar data is stored for all pairs of cameras. As indicated previously, the x's represents numeric floating point numbers.
{
 1: {
 2: {
   F: [[x, x, x], [x, x, x], [x, x, x]],
   E: [[x, x, x], [x, x, x], [x, x, x]],
   P: [[x, x, x, x], [x, x, x, x], [x, x, x, x]],
   R: [[x, x, x], [x, x, x], [x, x, x]],
   t: [x, x, x],
   homography_floor_coefficients: [x, x, x, x, x, x, x, x]
  }
 },
 . . .
}

The system can also use Fiducial markers for initial calibration of cameras in the area of real space. We present examples of calibrating cameras using Fiducial markers and the process to perform recalibration of cameras in FIGS. 5 to 11C.

Two-Dimensional and Three-Dimensional Maps

Figure 3:
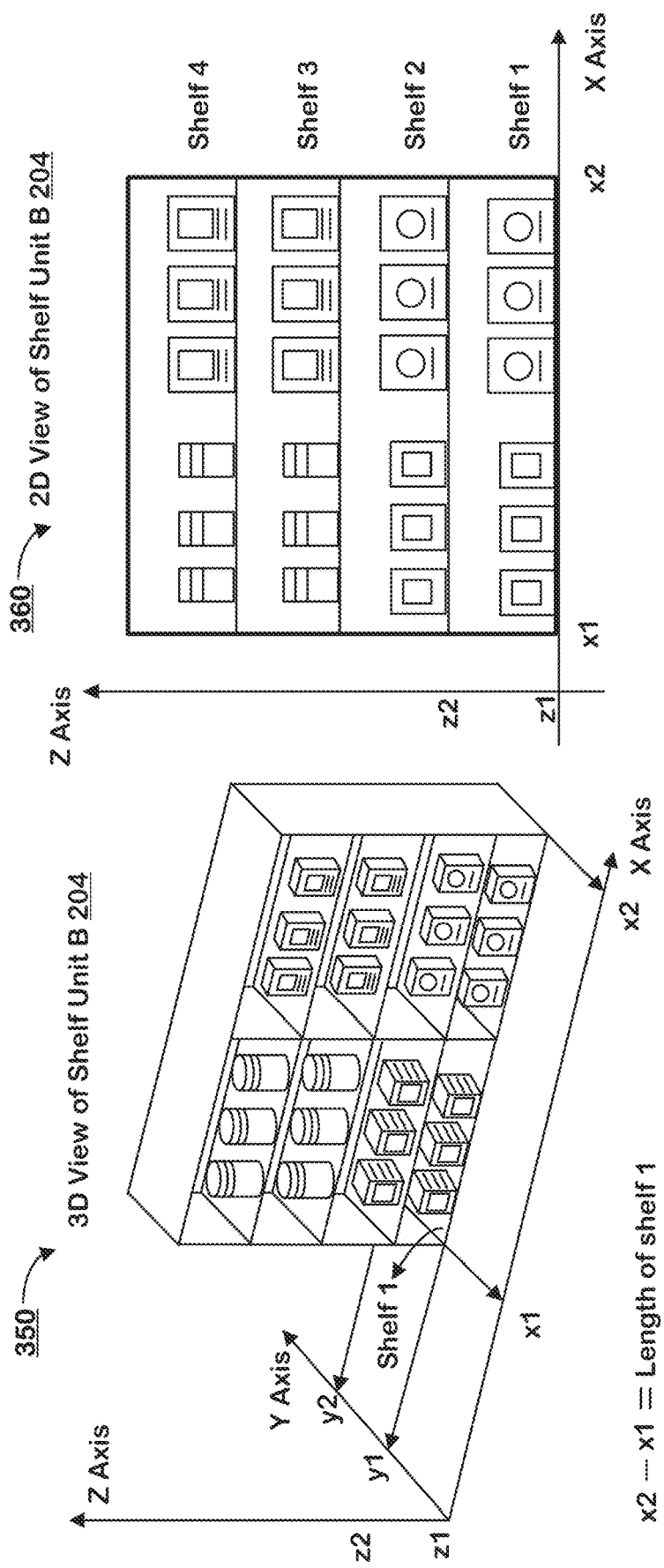
FIG. 3 illustrates a three-dimensional and a two-dimensional view of an inventory display structure (or a shelf unit).

FIG. 3 presents creation of two-dimensional (2D) and three-dimensional (3D) maps. An inventory cache, such as a location on a shelf, in a shopping store can be identified by a unique identifier in a map database (e.g., shelf_id). Similarly, a shopping store can also be identified by a unique identifier (e.g., store_id) in a map database. The two-dimensional (2D) and camera placement database 150 identifies locations of inventory caches in the area of real space along the respective coordinates. For example, in a 2D map, the locations in the maps define two dimensional regions on the plane formed perpendicular to the floor 220 i.e., the XZ plane as shown in illustration 360 in FIG. 3. The map defines an area for inventory locations or shelves where inventory items are positioned. In FIG. 3, a 2D location of the shelf unit shows an area formed by four coordinate positions (x1, y1), (x1, y2), (x2, y2), and (x2, y1). These coordinate positions define a 2D region on the floor 220 where the shelf is located. Similar 2D areas are defined for all inventory display structure locations, entrances, exits, and designated unmonitored locations in the shopping store. This information is stored in the maps database.

In a 3D map, the locations in the map define three dimensional regions in the 3D real space defined by X, Y, and Z coordinates. The map defines a volume for inventory locations where inventory items are positioned. In illustration 350 in FIG. 3, a 3D view 350 of shelf 1, at the bottom of shelf unit B 204, shows a volume formed by eight coordinate positions (x1, y1, z1), (x1, y1, z2), (x1, y2, z1), (x1, y2, z2), (x2, y1, z1), (x2, y1, z2), (x2, y2, z1), (x2, y2, z2) defining a 3D region in which inventory items are positioned on the shelf 1. Similar 3D regions are defined for inventory locations in all shelf units in the shopping store and stored as a 3D map of the real space (shopping store) in the maps database. The coordinate positions along the three axes can be used to calculate length, depth and height of the inventory locations as shown in FIG. 3.

In one embodiment, the map identifies a configuration of units of volume which correlate with portions of inventory locations on the inventory display structures in the area of real space. Each portion is defined by starting and ending positions along the three axes of the real space. Like 2D maps, the 3D maps can also store locations of all inventory display structure locations, entrances, exits and designated unmonitored locations in the shopping store.

The items in a shopping store are arranged in some embodiments according to a planogram which identifies the inventory locations (such as shelves) on which a particular item is planned to be placed. For example, as shown in an illustration 350 in FIG. 3, the left half portions of shelf 3 and shelf 4 are designated for an item (which is stocked in the form of cans). The system can include pre-defined planograms for the shopping store which include positions of items on the shelves in the store. The planograms can be stored in the maps database. In one embodiment, the system can include logic to update the positions of items on shelves in real time or near real time.

Convolutional Neural Network

The image recognition engines in the processing platforms receive a continuous stream of images at a predetermined rate. In one embodiment, the image recognition engines comprise convolutional neural networks (abbreviated CNN).

Figure 4A:
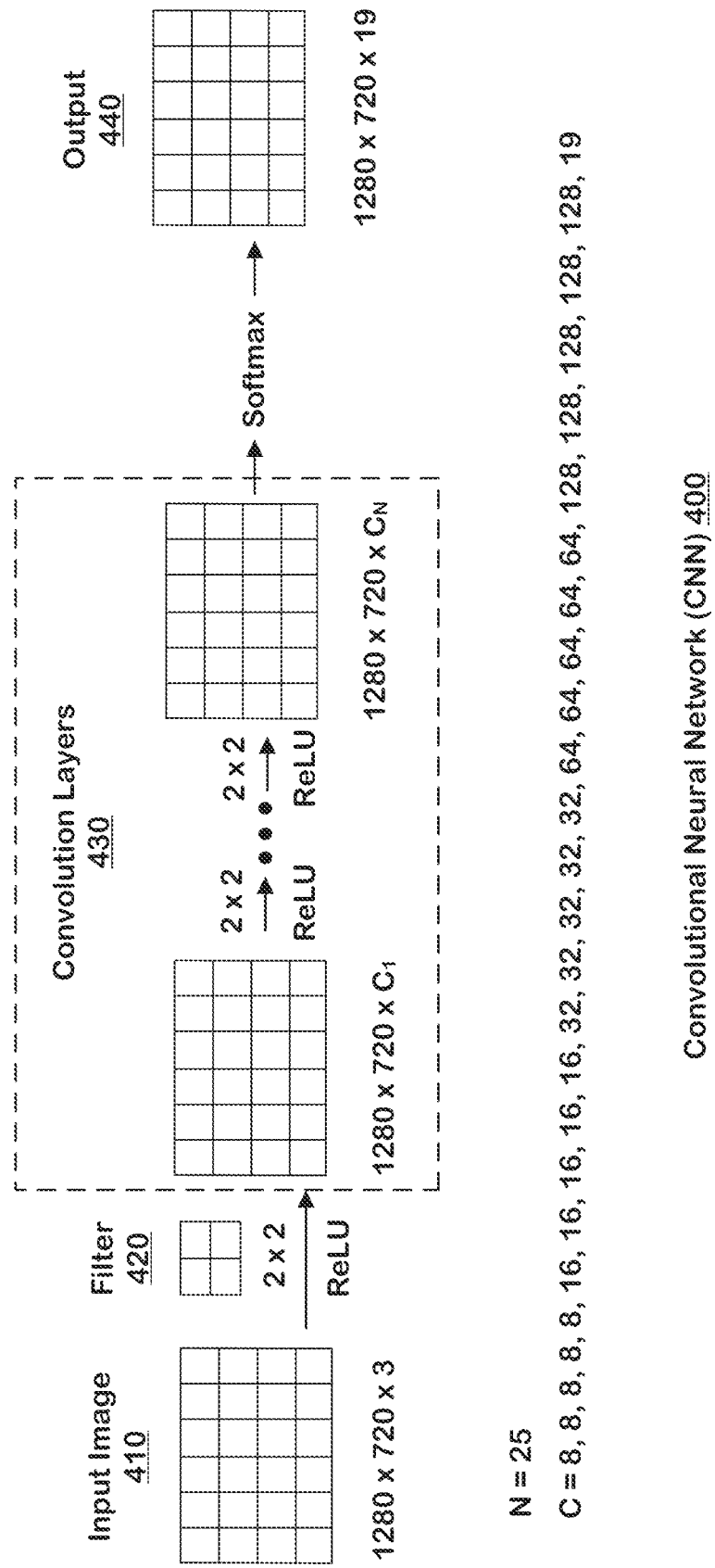
FIG. 4A illustrates input, output and convolution layers in an example convolutional neural network to classify joints of subjects in sequences of images.

FIG. 4A illustrates the processing of image frames by an example CNN referred to by a numeral 400. The input image 410 is a matrix consisting of image pixels arranged in rows and columns. In one embodiment, the input image 410 has a width of 1280 pixels, a height of 720 pixels and 3 channels, red, blue, and green also referred to as RGB. The channels can be imagined as three 1280×720 two-dimensional images stacked over one another. Therefore, the input image has dimensions of 1280×720×3 as shown in FIG. 4A. As mentioned above, in some embodiments, the images are filtered to provide images with reduced resolution for input to the CNN.

A 2×2 filter 420 is convolved with the input image 410. In this embodiment, no padding is applied when the filter is convolved with the input. Following this, a nonlinearity function is applied to the convolved image. In the present embodiment, rectified linear unit (ReLU) activations are used. Other examples of nonlinear functions include sigmoid, hyperbolic tangent (tanh) and variations of ReLU such as leaky ReLU. A search is performed to find hyper-parameter values. The hyper-parameters are $C_1, C_2, \ldots, C_N$ where $C_N$ means the number of channels for convolution layer "N". Typical values of N and C are shown in FIG. 4A. There are twenty-five (25) layers in the CNN as represented by N equals 25. The values of C are the number of channels in each convolution layer for layers 1 to 25. In other embodiments, additional features are added to the CNN 400 such as residual connections, squeeze-excitation modules, and multiple resolutions.

In typical CNNs used for image classification, the size of the image (width and height dimensions) is reduced as the image is processed through convolution layers. That is helpful in feature identification as the goal is to predict a class for the input image. However, in the illustrated embodiment, the size of the input image (i.e. image width and height dimensions) is not reduced, as the goal is not only to identify a joint (also referred to as a feature) in the image frame, but also to identify its location in the image so it can be mapped to coordinates in the real space. Therefore, as shown FIG. 5, the width and height dimensions of the image remain unchanged relative to the input images (with full or reduced resolution) as the processing proceeds through convolution layers of the CNN, in this example.

In one embodiment, the CNN 400 identifies one of the 19 possible joints of the subjects at each element of the image. The possible joints can be grouped in two categories: foot joints and non-foot joints. The 19th type of joint classification is for all non-joint features of the subject (i.e. elements of the image not classified as a joint).

Foot Joints:
Ankle joint (left and right)
Non-foot Joints:
Neck
Nose
Eyes (left and right)
Ears (left and right)
Shoulders (left and right)
Elbows (left and right)
Wrists (left and right)
Hips (left and right)
Knees (left and right)
Not a joint As can be seen, a "joint" for the purposes of this description is a trackable feature of a subject in the real space. A joint may correspond to physiological joints on the subjects, or other features such as the eyes, or nose.

The first set of analyses on the stream of input images identifies trackable features of subjects in real space. In one embodiment, this is referred to as a "joints analysis". In such an embodiment, the CNN used for joints analysis is referred to as a "joints CNN". In one embodiment, the joints analysis is performed thirty times per second over the thirty frames per second received from the corresponding camera. The analysis is synchronized in time i.e., at $1/30^{th}$ of a second, images from all cameras 114 are analyzed in the corresponding joints CNNs to identify joints of all subjects in the real space. The results of this analysis of the images from a single moment in time from plural cameras are stored as a "snapshot".

A snapshot can be in the form of a dictionary containing arrays of joints data structures from images of all cameras 114 at a moment in time, representing a constellation of candidate joints within the area of real space covered by the system. In one embodiment, the snapshot is stored in the subject database 140.

In this example CNN, a softmax function is applied to every element of the image in the final layer of convolution layers 430. The softmax function transforms a K-dimensional vector of arbitrary real values to a K-dimensional vector of real values in the range [0, 1] that add up to 1. In one embodiment, an element of an image is a single pixel. The softmax function converts the 19-dimensional array (also referred to a 19-dimensional vector) of arbitrary real values for each pixel to a 19-dimensional confidence array of real values in the range [0, 1] that add up to 1. The 19 dimensions of a pixel in the image frame correspond to the 19 channels in the final layer of the CNN which further correspond to the 19 types of joints of the subjects.

A large number of picture elements can be classified as one of each of the 19 types of joints in one image depending on the number of subjects in the field of view of the source camera for that image.

The image recognition engines 112a-112n process images to generate confidence arrays for elements of the image. A confidence array for a particular element of an image includes confidence values for a plurality of joint types for the particular element. Each one of the image recognition engines 112a-112n, respectively, generates an output matrix 440 of confidence arrays per image. Finally, each image recognition engine generates arrays of joints data structures corresponding to each output matrix 440 of confidence arrays per image. The arrays of joints data structures corresponding to particular images classify elements of the particular images by joint type, time of the particular image, and coordinates of the element in the particular image. A joint type for the joints data structure of the particular elements in each image is selected based on the values of the confidence array.

Each joint of the subjects can be considered to be distributed in the output matrix 440 as a heat map. The heat map can be resolved to show image elements having the highest values (peak) for each joint type. Ideally, for a given picture element having high values of a particular joint type, surrounding picture elements outside a range from the given picture element will have lower values for that joint type, so that a location for a particular joint having that joint type can be identified in the image space coordinates. Correspondingly, the confidence array for that image element will have the highest confidence value for that joint and lower confidence values for the remaining 18 types of joints.

In one embodiment, batches of images from each camera 114 are processed by respective image recognition engines. For example, six contiguously timestamped images are processed sequentially in a batch to take advantage of cache coherence. The parameters for one layer of the CNN 400 are loaded in memory and applied to the batch of six image frames. Then the parameters for the next layer are loaded in memory and applied to the batch of six images. This is repeated for all convolution layers 430 in the CNN 400. The cache coherence reduces processing time and improves the performance of the image recognition engines.

In one such embodiment, referred to as three-dimensional (3D) convolution, a further improvement in performance of the CNN 400 is achieved by sharing information across image frames in the batch. This helps in more precise identification of joints and reduces false positives. For examples, features in the image frames for which pixel values do not change across the multiple image frames in a given batch are likely static objects such as a shelf. The change of values for the same pixel across image frames in a given batch indicates that this pixel is likely a joint. Therefore, the CNN 400 can focus more on processing that pixel to accurately identify the joint identified by that pixel.

Joints Data Structure

The output of the CNN 400 is a matrix of confidence arrays for each image per camera. The matrix of confidence arrays is transformed into an array of joints data structures. A joints data structure 460 as shown in FIG. 4B is used to store the information of each joint. The joints data structure 460 identifies x and y positions of the element in the particular image in the 2D image space of the camera from which the image is received. A joint number identifies the type of joint identified. For example, in one embodiment, the values range from 1 to 19. A value of 1 indicates that the joint is a left-ankle, a value of 2 indicates the joint is a right-ankle and so on. The type of joint is selected using the confidence array for that element in the output matrix 440. For example, in one embodiment, if the value corresponding to the left-ankle joint is highest in the confidence array for that image element, then the value of the joint number is "1".

A confidence number indicates the degree of confidence of the CNN 400 in predicting that joint. If the value of the confidence number is high, it means the CNN is confident in its prediction. An integer-Id is assigned to the joints data structure to uniquely identify it. Following the above mapping, the output matrix 440 of confidence arrays per image is converted into an array of joints data structures for each image.

The image recognition engines 112a-112n receive the sequences of images from the cameras 114 and process the images to generate corresponding arrays of joints data structures as described above. An array of joints data structures for a particular image classifies elements of the particular image by joint type, time of the particular image, and the coordinates of the elements in the particular image. In one embodiment, the image recognition engines 112a-112n are convolutional neural networks CNN 400, the joint type is one of the 19 types of joints of the subjects, the time of the particular image is the timestamp of the image generated by the source camera 114 for the particular image, and the coordinates (x, y) identify the position of the element on a 2D image plane.

In one embodiment, the joints analysis includes performing a combination of k-nearest neighbors, mixture of Gaussians, various image morphology transformations, and joints CNN on each input image. The result comprises arrays of joints data structures which can be stored in the form of a bit mask in a ring buffer that maps image numbers to bit masks at each moment in time. We now present the process to track subjects in the area of real space using the tracking engine.

Tracking Engine

The technology disclosed can use the calibrated cameras to perform the operations of an autonomous checkout environment such as a shopping store. The system can include logic to process sequences of images of the plurality of sequences of images, to track puts and takes of items by subjects within respective fields of view in the real space. The technology disclosed can include logic to perform the recalibration process and the subject tracking and event detection processes substantially contemporaneously, thereby enabling cameras to be calibrated without clearing subjects from the real space or interrupting tracking puts and takes of items by subjects.

The subject tracking engine 110 is configured to receive arrays of joints data structures generated by the image recognition engines 112a-112n corresponding to images in sequences of images from cameras having overlapping fields of view. The arrays of joints data structures per image are sent by image recognition engines 112a-112n to the tracking engine 110 via the network(s) 181 as shown in FIG. 1. The tracking engine 110 translates the coordinates of the elements in the arrays of joints data structures corresponding to images in different sequences into candidate joints having coordinates in the real space. The tracking engine 110 comprises logic to identify sets of candidate joints having coordinates in real space (constellations of joints) as subjects in the real space. In one embodiment, the tracking engine 110 accumulates arrays of joints data structures from the image recognition engines for all the cameras at a given moment in time and stores this information as a dictionary in the subject database 140, to be used for identifying a constellation of candidate joints. The dictionary can be arranged in the form of key-value pairs, where keys are camera ids and values are arrays of joints data structures from the camera. In such an embodiment, this dictionary is used in heuristics-based analysis to determine candidate joints and for the assignment of joints to subjects. In such an embodiment, a high-level input, processing and output of the tracking engine 110 is illustrated in table 1.

TABLE 1

Inputs, processing and outputs from the subject tracking engine 110 in an example embodiment.

| Inputs | Processing | Output |
| --- | --- | --- |
| Arrays of joints data structures per image and for each joints data structure Unique ID Confidence number Joint number (x, y) position in image space | Create joints dictionary Re-project joint positions in the fields of view of cameras with overlapping fields of view to candidate joints | List of subjects in the real space at a moment in time |

Grouping Candidate Joints

The subject tracking engine 110 receives arrays of joints data structures along two dimensions: time and space. Along the time dimension, the tracking engine receives sequentially timestamped arrays of joints data structures processed by the image recognition engines 112a-112n per camera. The joints data structures include multiple instances of the same joint of the same subject over a period of time in images from cameras having overlapping fields of view. The (x, y) coordinates of the element in the particular image will usually be different in sequentially timestamped arrays of joints data structures because of the movement of the subject to which the particular joint belongs. For example, twenty picture elements classified as left-wrist joints can appear in many sequentially timestamped images from a particular camera, each left-wrist joint having a position in real space that can be changing or unchanging from image to image. As a result, twenty left-wrist joints data structures 460 in many sequentially timestamped arrays of joints data structures can represent the same twenty joints in real space over time.

Because multiple cameras having overlapping fields of view cover each location in the real space, at any given moment in time, the same joint can appear in images of more than one of the cameras 114. The cameras 114 are synchronized in time, therefore, the tracking engine 110 receives joints data structures for a particular joint from multiple cameras having overlapping fields of view, at any given moment in time. This is the space dimension, the second of the two dimensions: time and space, along which the subject tracking engine 110 receives data in arrays of joints data structures.

The subject tracking engine 110 uses an initial set of heuristics stored in a heuristics database to identify candidate joints data structures from the arrays of joints data structures. The goal is to minimize a global metric over a period of time. A global metric calculator can calculate the global metric. The global metric is a summation of multiple values described below. Intuitively, the value of the global metric is at a minimum when the joints in arrays of joints data structures received by the subject tracking engine 110 along the time and space dimensions are correctly assigned to their respective subjects. For example, consider the embodiment of the shopping store with customers moving in the aisles. If the left-wrist of a customer A is incorrectly assigned to a customer B, then the value of the global metric will increase. Therefore, minimizing the global metric for each joint for each customer is an optimization problem. One option to solve this problem is to try all possible connections of joints. However, this can become intractable as the number of customers increases.

A second approach to solve this problem is to use heuristics to reduce possible combinations of joints identified as members of a set of candidate joints for a single subject. For example, a left-wrist joint cannot belong to a subject far apart in space from other joints of the subject because of known physiological characteristics of the relative positions of joints. Similarly, a left-wrist joint having a small change in position from image to image is less likely to belong to a subject having the same joint at the same position from an image far apart in time, because the subjects are not expected to move at a very high speed. These initial heuristics are used to build boundaries in time and space for constellations of candidate joints that can be classified as a particular subject. The joints in the joints data structures within a particular time and space boundary are considered as "candidate joints" for assignment to sets of candidate joints as subjects present in the real space. These candidate joints include joints identified in arrays of joints data structures from multiple images from a same camera over a period of time (time dimension) and across different cameras with overlapping fields of view (space dimension).

Foot Joints

The joints can be divided for the purposes of a procedure for grouping the joints into constellations, into foot and non-foot joints as shown above in the list of joints. The left and right-ankle joint types in the current example are considered foot joints for the purpose of this procedure. The subject tracking engine 110 can start the identification of sets of candidate joints of particular subjects using foot joints. In the embodiment of the shopping store, the feet of the customers are on the floor 220 as shown in FIG. 2A. The distance of the cameras 114 to the floor 220 is known. Therefore, when combining the joints data structures of foot joints from arrays of joints data structures corresponding to images of cameras with overlapping fields of view, the subject tracking engine 110 can assume a known depth (distance along z axis). The value depth for foot joints is zero i.e. (x, y, 0) in the (x, y, z) coordinate system of the real space. Using this information, the subject tracking engine 110 applies homographic mapping to combine joints data structures of foot joints from cameras with overlapping fields of view to identify the candidate foot joint. Using this mapping, the location of the joint in (x, y) coordinates in the image space is converted to the location in the (x, y, z) coordinates in the real space, resulting in a candidate foot-joint. This process is performed separately to identify candidate left and right foot joints using respective joints data structures.

Following this, the subject tracking engine 110 can combine a candidate left foot joint and a candidate right foot joint (assign them to a set of candidate joints) to create a subject. Other joints from the galaxy of candidate joints can be linked to the subject to build a constellation of some or all of the joint types for the created subject.

If there is only one left candidate foot joint and one right candidate foot joint then it means there is only one subject in the particular space at the particular time. The tracking engine 110 creates a new subject having the left and the right candidate foot joints belonging to its set of joints. The subject is saved in the subject database 140. If there are multiple candidate left and right foot joints, then the global metric calculator attempts to combine each candidate left foot joint to each candidate right foot joint to create subjects such that the value of the global metric is minimized.

Non-Foot Joints

To identify candidate non-foot joints from arrays of joints data structures within a particular time and space boundary, the subject tracking engine 110 uses the non-linear transformation (also referred to as a fundamental matrix) from any given camera A to its neighboring camera B with overlapping fields of view. The non-linear transformations are calculated using a single multi-joint subject and stored in a calibration database as described above. For example, for two cameras A and B with overlapping fields of view, the candidate non-foot joints are identified as follows. The non-foot joints in arrays of joints data structures corresponding to elements in image frames from camera A are mapped to epipolar lines in synchronized image frames from camera B. A joint (also referred to as a feature in machine vision literature) identified by a joints data structure in an array of joints data structures of a particular image of camera A will appear on a corresponding epipolar line if it appears in the image of camera B. For example, if the joint in the joints data structure from camera A is a left-wrist joint, then a left-wrist joint on the epipolar line in the image of camera B represents the same left-wrist joint from the perspective of camera B. These two points in the images of cameras A and B are projections of the same point in the 3D scene in real space and are referred to as a "conjugate pair".

Machine vision techniques such as the technique by Longuet-Higgins published in the paper, titled, "A computer algorithm for reconstructing a scene from two projections" in Nature, Volume 293, 10 Sep. 1981, are applied to conjugate pairs of corresponding points to determine the heights of joints from the floor 220 in the real space. Application of the above method requires predetermined mapping between cameras with overlapping fields of view. That data can be stored in a calibration database as non-linear functions determined during the calibration of the cameras 114 described above.

The subject tracking engine 110 receives the arrays of joints data structures corresponding to images in sequences of images from cameras having overlapping fields of view, and translates the coordinates of the elements in the arrays of joints data structures corresponding to images in different sequences into candidate non-foot joints having coordinates in the real space. The identified candidate non-foot joints are grouped into sets of subjects having coordinates in real space using a global metric calculator. The global metric calculator can calculate the global metric value and attempt to minimize the value by checking different combinations of non-foot joints. In one embodiment, the global metric is a sum of heuristics organized in four categories. The logic to identify sets of candidate joints comprises heuristic functions based on physical relationships among the joints of subjects in real space to identify sets of candidate joints as subjects. Examples of physical relationships among joints are considered in the heuristics as described below.

First Category of Heuristics

The first category of heuristics includes metrics to ascertain the similarity between two proposed subject-joint locations in the same camera view at the same or different moments in time. In one embodiment, these metrics are floating point values, where higher values mean two lists of joints are likely to belong to the same subject. Consider the example embodiment of the shopping store; the metrics determine the distance between a customer's same joints in one camera from one image to the next image along the time dimension. Given a customer A in the field of view of the camera, the first set of metrics determines the distance between each of person A's joints from one image from the camera to the next image from the same camera. The metrics are applied to joints data structures 460 in arrays of joints data structures per image from the cameras 114.

In one embodiment, two example metrics in the first category of heuristics are listed below:
1. The inverse of the Euclidean 2D coordinate distance (using x, y coordinate values for a particular image from a particular camera) between the left ankle joint of two subjects on the floor and the right ankle-joint of the two subjects on the floor summed together.
2. The sum of the inverse of the Euclidean 2D coordinate distance between every pair of non-foot joints of subjects in the image frame.

Second Category of Heuristics

The second category of heuristics includes metrics to the ascertain similarity between two proposed subject-joint locations from the fields of view of multiple cameras at the same moment in time. In one embodiment, these metrics are floating point values, where higher values mean two lists of joints are likely to belong to the same subject. Consider the example embodiment of the shopping store, the second set of metrics determines the distance between a customer's same joints in image frames from two or more cameras (with overlapping fields of view) at the same moment in time.

In one embodiment, two example metrics in the second category of heuristics are listed below:
1. The inverse of the Euclidean 2D coordinate distance (using x, y coordinate values for a particular image from a particular camera) between the left ankle joint of two subjects on the floor and the right ankle-joint of the two subjects on the floor summed together. The first subject's ankle-joint locations are projected to the camera in which the second subject is visible through homographic mapping.

2. The sum of all pairs of joints of the inverse of the Euclidean 2D coordinate distance between a line and a point, where the line is the epipolar line of a joint of an image from a first camera having a first subject in its field of view to a second camera with a second subject in its field of view and the point is the joint of the second subject in the image from the second camera.

Third Category of Heuristics

The third category of heuristics includes metrics to ascertain the similarity between all joints of a proposed subject-joint location in the same camera view at the same moment in time. Consider the example embodiment of the shopping store; this category of metrics determines the distance between joints of a customer in one frame from one camera.

Fourth Category of Heuristics

The fourth category of heuristics includes metrics to ascertain the dissimilarity between proposed subject-joint locations. In one embodiment, these metrics are floating point values. Higher values mean two lists of joints are more likely to not be the same subject. In one embodiment, two example metrics in this category include:

1. The distance between neck joints of two proposed subjects.
2. The sum of the distance between pairs of joints between two subjects.

In one embodiment, various thresholds which can be determined empirically are applied to the above listed metrics as described below:

1. Thresholds to decide when metric values are small enough to consider that a joint belongs to a known subject.
2. Thresholds to determine when there are too many potential candidate subjects that a joint can belong to with too good of a metric similarity score.
3. Thresholds to determine when collections of joints over time have high enough metric similarity to be considered a new subject, previously not present in the real space.
4. Thresholds to determine when a subject is no longer in the real space.
5. Thresholds to determine when the tracking engine 110 has made a mistake and has confused two subjects.

The subject tracking engine 110 includes logic to store the sets of joints identified as subjects. The logic to identify sets of candidate joints includes logic to determine whether a candidate joint identified in images taken at a particular time corresponds with a member of one of the sets of candidate joints identified as subjects in preceding images. In one embodiment, the subject tracking engine 110 compares the current joint-locations of a subject with previously recorded joint-locations of the same subject at regular intervals. This comparison allows the tracking engine 110 to update the joint locations of subjects in the real space. Additionally, using this, the subject tracking engine 110 identifies false positives (i.e., falsely identified subjects) and removes subjects no longer present in the real space.

Consider the example of the shopping store embodiment, in which the subject tracking engine 110 created a customer (subject) at an earlier moment in time, however, after some time, the subject tracking engine 110 does not have current joint-locations for that particular customer. It means that the customer was incorrectly created. The subject tracking engine 110 deletes incorrectly generated subjects from the subject database 140. In one embodiment, the subject tracking engine 110 also removes positively identified subjects from the real space using the above described process. Consider in the example of the shopping store, when a customer leaves the shopping store, the subject tracking engine 110 deletes the corresponding customer record from the subject database 140. In one such embodiment, the subject tracking engine 110 updates this customer's record in the subject database 140 to indicate that "the customer has left the store".

In one embodiment, the subject tracking engine 110 attempts to identify subjects by applying the foot and non-foot heuristics simultaneously. This results in "islands" of connected joints of the subjects. As the subject tracking engine 110 processes further arrays of joints data structures along the time and space dimensions, the size of the islands increases. Eventually, the islands of joints merge to other islands of joints forming subjects which are then stored in the subject database 140. In one embodiment, the subject tracking engine 110 maintains a record of unassigned joints for a predetermined period of time. During this time, the tracking engine attempts to assign the unassigned joints to existing subjects or create new multi joint entities from these unassigned joints. The tracking engine 110 discards the unassigned joints after a predetermined period of time. It is understood that, in other embodiments, different heuristics than the ones listed above are used to identify and track subjects.

In one embodiment, a user interface output device connected to the node 102 hosting the subject tracking engine 110 displays the position of each subject in the real spaces. In one such embodiment, the display of the output device is refreshed with new locations of the subjects at regular intervals.

Detecting Proximity Events

The technology disclosed can detect proximity events when the distance between a source and a sink is below a threshold. A proximity event can be detected when the distance between a source and a sink falls below the threshold distance. Note that for a second proximity event to be detected for the same source and the same sink, the distance between the source and sink needs to increase above the threshold distance. A source and a sink can be an inventory cache linked to a subject (such as a shopper) in the area of real space or an inventory cache having a location on a shelf in an inventory display structure. Therefore, the technology disclosed can not only detect item puts and takes from shelves on inventory display structures but also item hand-offs or item exchanges between shoppers in the store.

In one embodiment, the technology disclosed uses the positions of hand joints of subjects and positions of shelves to detect proximity events. For example, the system can calculate the distance of left hand and right hand joints, or joints corresponding to hands, of every subject to left hand and right hand joints of every other subject in the area of real space or to shelf locations at every time interval. The system can calculate these distances at every second or at a less than one second time interval. In one embodiment, the system can calculate the distances between hand joints of subjects and shelves per aisle or per portion of the area of real space to improve computational efficiency as the subjects can hand off items to other subjects that are positioned close to each other. The system can also use other joints of subjects to detect proximity events; for example, if one or both hand joints of a subject are occluded, the system can use the left and right elbow joints of this subject when calculating the distance to hand joints of other subjects and shelves. If the elbow joints of the subject are also occluded, then the system can use the left and right shoulder joints of the subject to calculate their distance from other subjects and shelves. The system can use the positions of shelves and other static objects such as bins, etc. from the location data stored in the maps database.

The technology disclosed includes logic that can indicate the type of the proximity event. A first type of proximity event can be a "put" event in which the item is handed off from a source to a sink. For example, a subject (source) who is holding the item prior to the proximity event can give the item to another subject (sink) or place it on a shelf (sink) following the proximity event. A second type of proximity event can be a "take" event in which a subject (sink) who is not holding the item prior to the proximity event can take an item from another subject (source) or a shelf (source) following the event. A third type of proximity event is a "touch" event in which there is no exchange of items between a source and a sink. Example of touch events can include a subject holding the item on a shelf for a moment and then putting the item back on the shelf and moving away from the shelf. Another example of a touch event can occur when the hands of two subjects move closer to each other such that the distance between the hands of the two subjects is less than the threshold distance. However, there is no exchange of items from the source (the subject who is holding the item prior to the proximity event) to the sink (the subject who is not holding the item prior to the proximity event).

We now present further details of the camera placement tool for the multi-camera environment.

Multi-Camera Environment

The first step and the prerequisite for the process of defining the optimal camera placement is a 3D geometric map of the environment. Some of the ways of creating such maps include: Photogrammetry-based approaches using images taken from multiple viewpoints, Simultaneous Localization and Mapping (SLAM) based methods by using the Lidar sensor data in the environment or just using a rendering of the space using a three-dimensional designer computer-aided design (CAD) tool. The map can be consumed as a mesh file or a point cloud file. Once the map is created, the map is used to extract the viewpoints of the cameras and the region of the maps seen by the cameras.

Figure 5A:
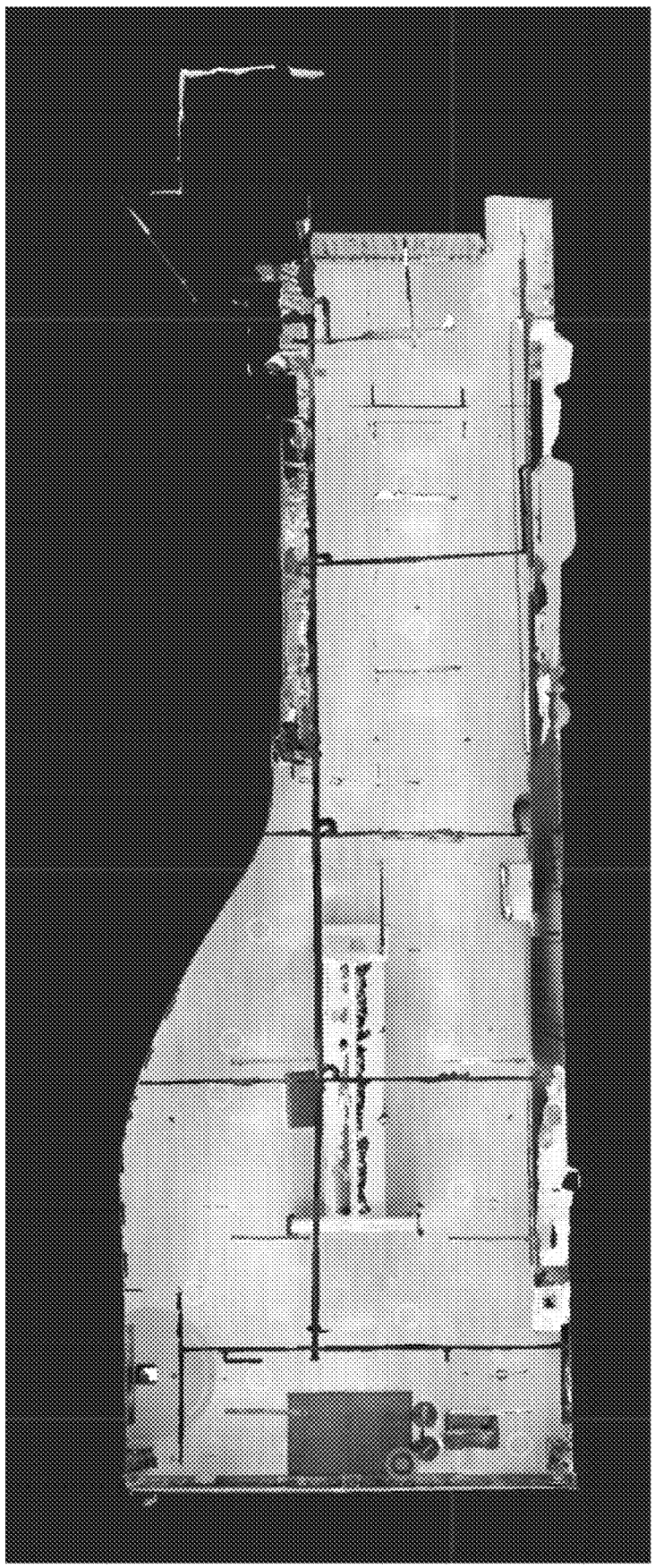
FIGS. 5A, 5B, 5C, and 5D present examples of three-dimensional map of an area of real space.
Figure 5B:
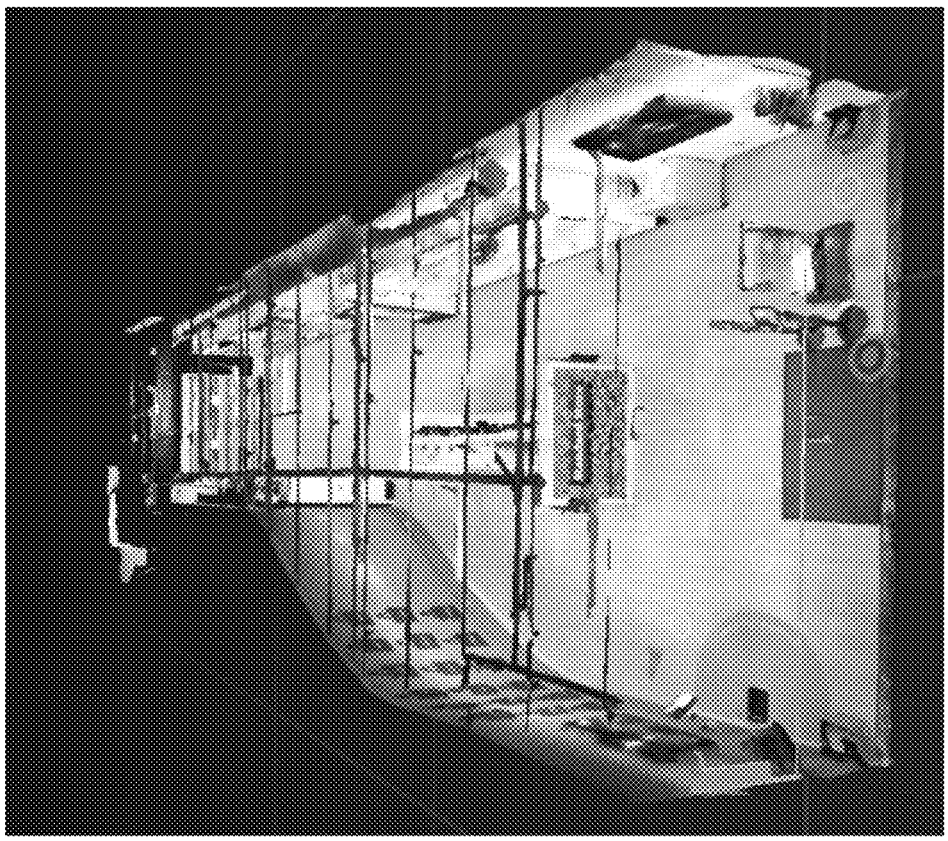
Figure 5C:
Figure 5D:
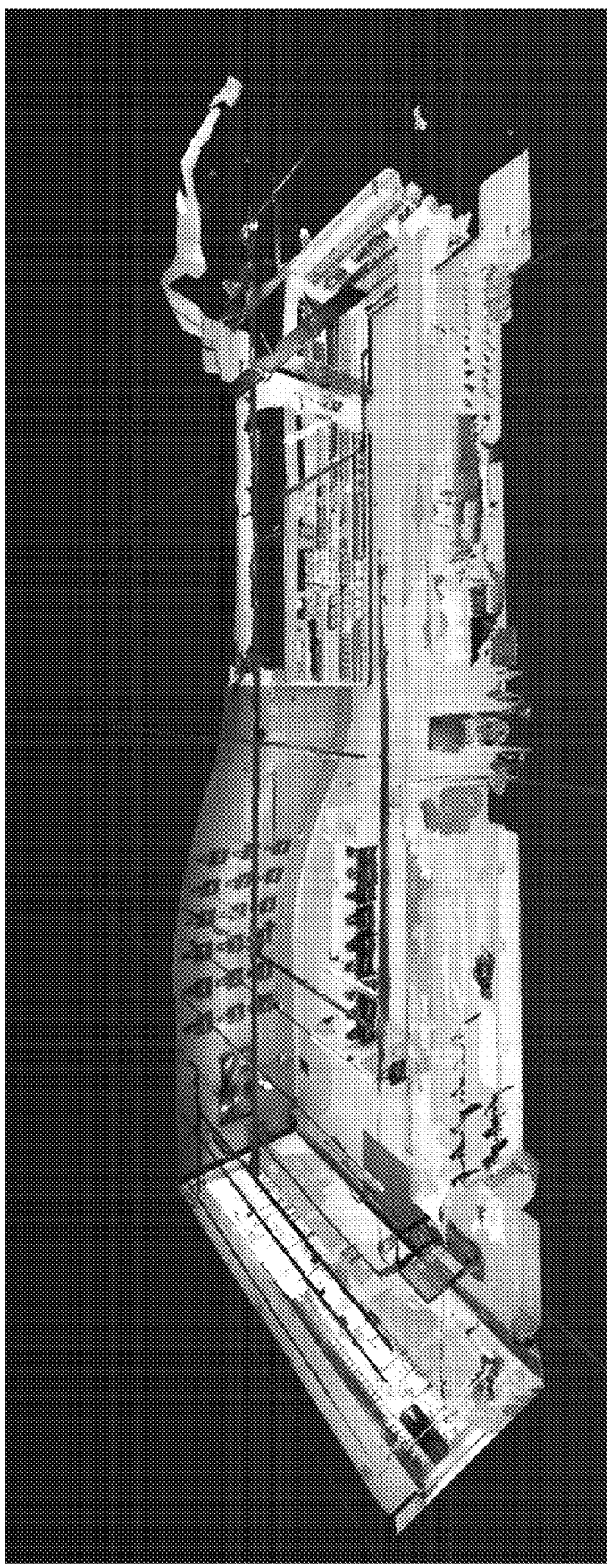

An example of such a three dimensional map of an area of real space built using a SLAM and photogrammetry-based approach is shown in FIGS. 5A, 5B, 5C, and 5D. FIG. 5A shows a top view of the area, FIGS. 5B and 5C show views of the area of real space from one end at different orientations. FIG. 5D shows a view of the area of real space from one side.

Figure 6:
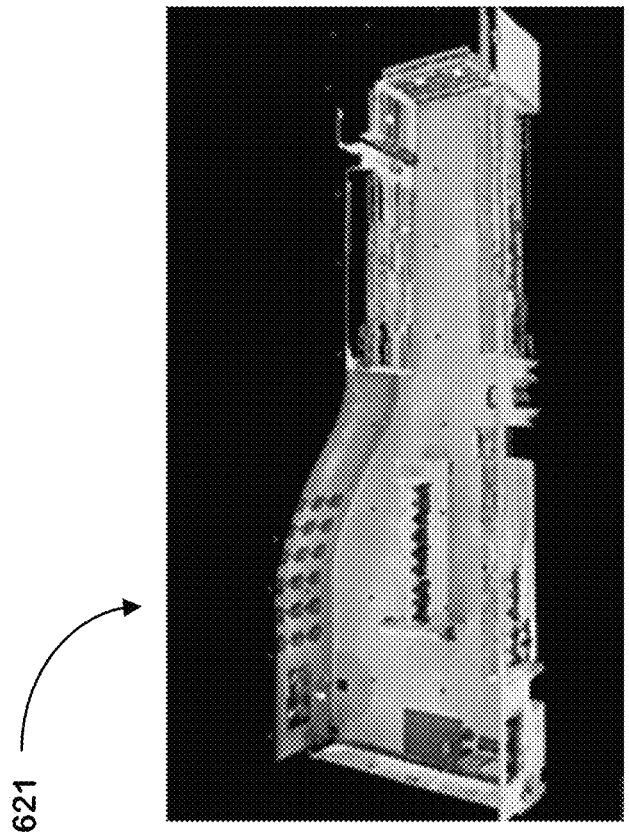
FIG. 6 presents an example placement of cameras in an area of real space.
Figure 6:
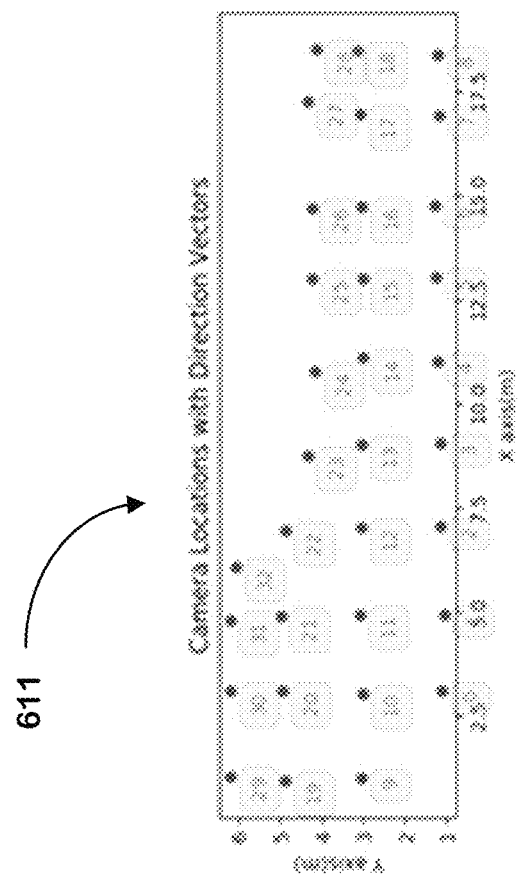

FIG. 6 presents an example placement 611 of cameras in the area of real space. The illustration 611 shows placement of cameras on a top view of the area of real space. Cameras can be placed on the ceiling, looking downwards at different orientations. The illustration 611 can also include direction vectors indicating orientation of cameras. The system can also use other types of markers (such as rectangles, pointers, etc.) and overlays to indicate the positions and orientations of cameras in the area of real space. In the example illustration 611, each camera is identified by a camera identifier in a box. The illustration 621 shows camera placement of 611 mapped (overlayed) to the three-dimensional map of the area of real space. The initial camera poses can be calculated in various ways. For example, a first method to determine camera poses is using human assisted approximate positions. A second method is to generate a random initialization i.e., placing cameras at random positions in the area of real space subject to constraints. Other techniques can be applied to generate an initial placement of cameras. The initial constraints for the camera placement are taken into consideration in the initialization step. For example if the cameras are to be placed in the ceiling, the initial positions of the cameras are placed approximately at the ceiling height. Additional constraints can also be provided as input for initial camera placement. We describe these constraints in the following sections.

Camera Model

The camera model consists of the camera intrinsic matrix and the distortion values of the lens used on the camera. These values are required to understand the camera field-of-view. The distortion parameters are used to rectify and undistort the image frames obtained from the respective camera. Further details of the intrinsic and extrinsic camera parameters are described earlier in camera calibration related discussion.

Camera Coverage Map

After the camera model and the initial camera poses are defined, the coverage for each camera can be calculated using the following high-level process steps:
1. Calculating the line of sight vectors for each pixel on the image plane.
2. Ray casting from each of these pixels in the three-dimensional (3D) geometric map and obtaining the first occupied voxel hit by the ray. A voxel represents each of an array of elements of volume in a three-dimensional space.
3. Creation of a point cloud/voxel set that are within the view of the camera.

After the camera coverage for individual cameras is calculated, the system aggregates the coverage of all these cameras to obtain the overall coverage of all the cameras within the 3D map. This can be performed using the following high-level process steps.
1. A voxel grid of a predetermined voxel size is initiated from the given 3D geometric map of the environment.
2. Each voxel within the grid is initialized with a feature vector which can contain the following fields:
    a. Occupancy of the voxel
    b. Voxel category—shelf vs wall vs exit vs other
    c. Number of cameras that have the voxel in the view
    d. List of cameras that have the voxels within view
    e. Angle of incidence from each of the cameras
    f. Distance between each of the cameras and the center of the voxel
3. All the voxels are updated with the coverage metrics to create the coverage map.

Occupancy of the voxel can indicate whether this voxel is positioned on or in a physical object such as a display structure, a table, a counter, or other types of physical objects in the area of real space etc. If the voxel is not positioned on (or in) a physical object in the area of real space then it can be classified as a non-occupied voxel representing a volume of empty space.

Figure 7A:
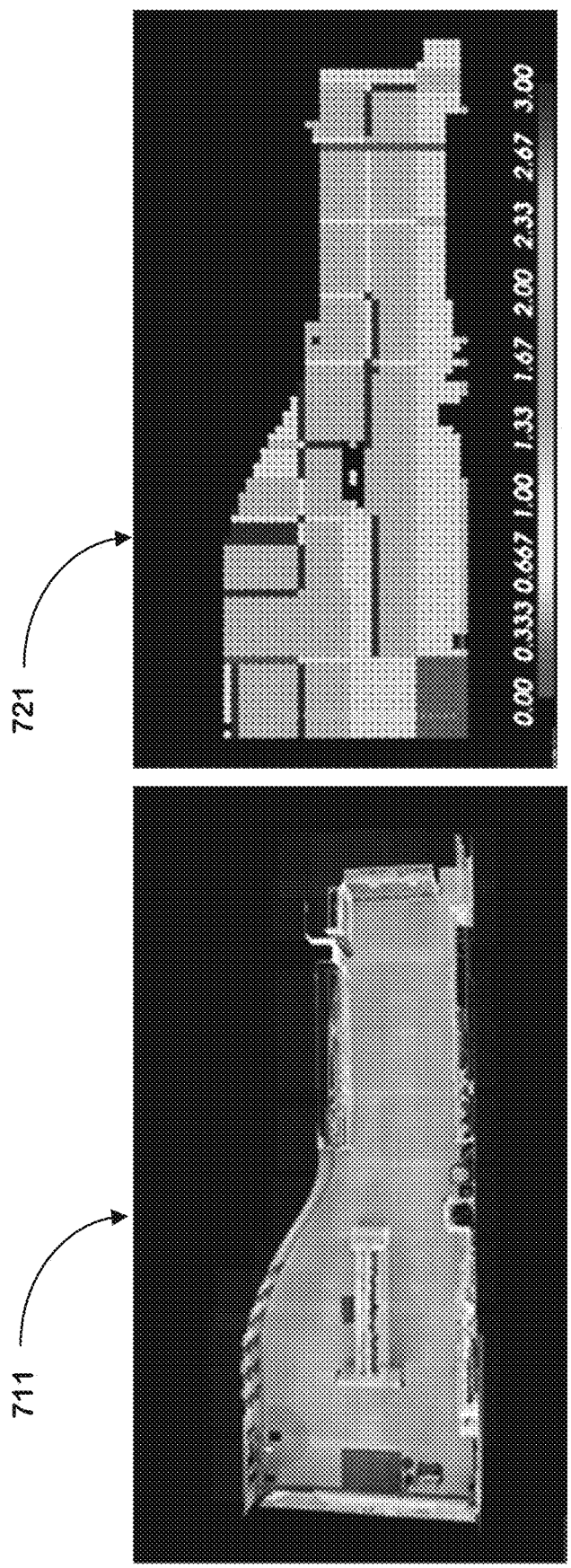
FIGS. 7A and 7B presents an example of camera coverage in an area of real space.

FIG. 7A shows a top view 711 of a three-dimensional image of the area of real space and corresponding camera coverage map 721. The regions in the area of real space with high camera coverage are shown in dark blue color. As the camera coverage decreases for a region, it is represented in a lighter blue color and then green color. The regions with coverage from one camera are shown in yellow color. Regions with no camera coverage are shown in red color. A legend at bottom of illustration 721 shows mapping of different colors to respective camera coverage. The highest camera coverage is three cameras visiting a voxel (dark blue color) and a lowest coverage is zero cameras visiting a voxel (red color).

Camera Coverage Constraints and Physical Placement Constraints

The camera placement tool generates camera placement plans for the multi-camera environment subject to constraints depending on both the generic and unique features of the environment. In the following sections we present further details of these constraints.

Physical Placement Constraints

Some of the physical constraints for the camera placement include fixtures on the ceiling, presence of lighting fixtures, presence of speakers, presence of heating or air conditioning (HVAC) vents etc. These physical constraints make placing cameras at certain positions challenging. The proposed method provides capability for automatically detecting these physical constraints and determines possible locations for placement of the cameras.

Figure 7B:
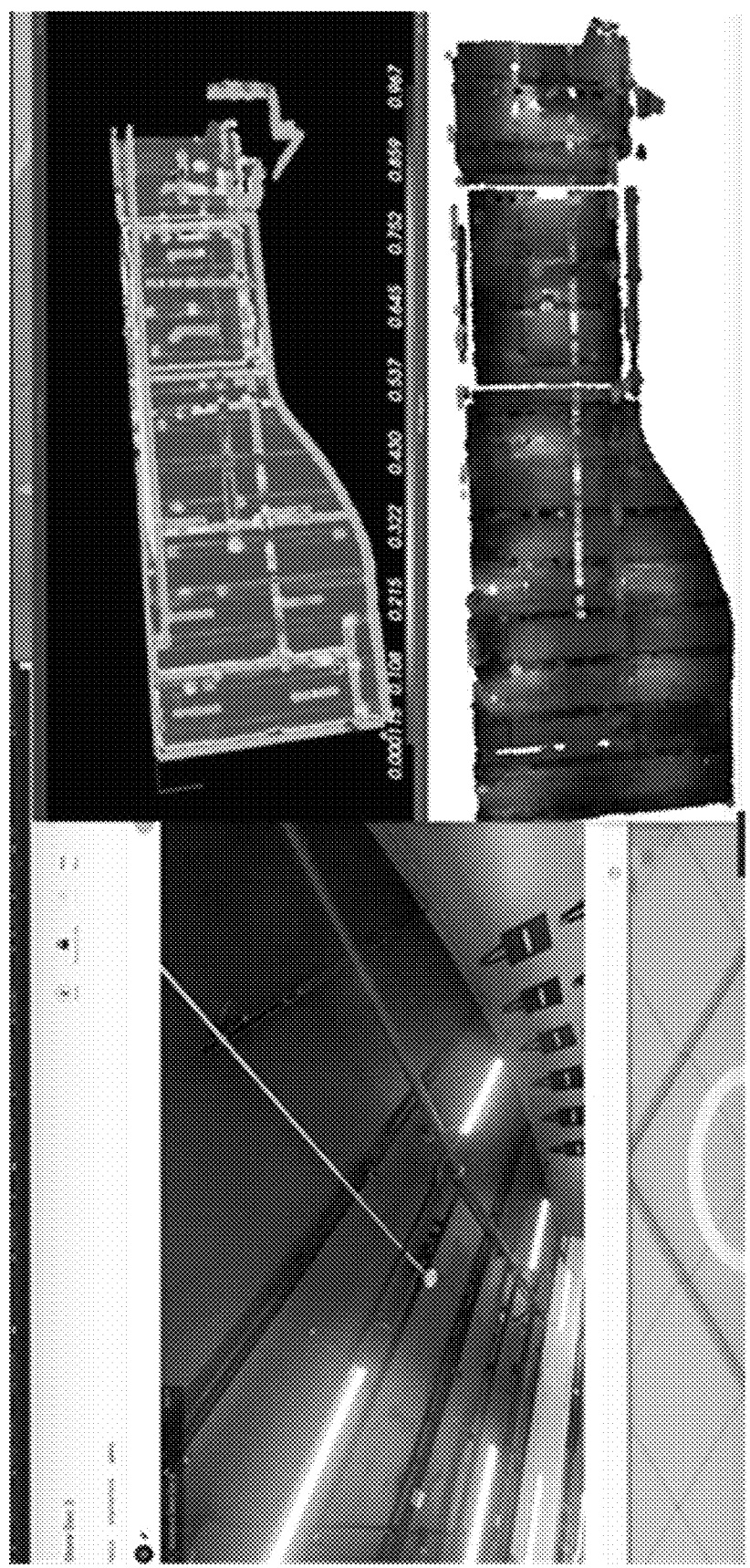

The technology disclosed can detect physical constraints using a combination of methods. To detect obstructions such as pipes and light fixtures, normal estimation can be used to differentiate these constraints from the flat ceiling surface. To detect obstructions such as air conditioning vents and speakers, etc. the system can use a learning-based method to automatically detect these and avoid placing cameras in these regions. FIG. 7B presents an image of the ceiling of an area of real space with physical constraints such as lighting, pipes, etc.

Coverage Constraints

The coverage requirements can include rules that are needed for the system to perform its operations. The coverage constraints can include a number of cameras having a voxel in a structure or display holding inventory within view, or a number of cameras having a voxel in a tracking zone of volume in which subjects are tracked within view. The coverage constrains can also include a difference in angles of incidence between cameras having a voxel within view, or an overall coverage of the three-dimensional real space, etc. For example, in order to perform triangulation for tracking, at least two cameras looking at each voxel in the tracking zone is required. Similarly, cameras looking into the shelves are required to predict the items in the shelves. It is understood that different coverage requirements can be set for different areas of real space or different deployments of the system. The technology disclosed can determine an improved camera placement plan by considering the coverage constraints set for the particular deployment in an area of real space. Following are some examples of coverage constraints that can be used by the system when determining camera placement:
1. Each voxel in the shelf is seen by at least three cameras.
2. Each voxel in the tracking zone is seen by two or more cameras with at least 60 degrees difference in angle of incidence. The tracking zone can include open spaces in which the subjects can move. Examples of tracking zones can be open spaces or aisles between inventory display structures in a shopping store.
3. The overall coverage of the store is more than 80% with simulated people walking in the store.

Using the coverage metrics indicating the camera coverage and the physical and coverage constraints, the technology disclosed can define an objective function that maximizes the coverage score while minimizing the number of cameras. Optimization of this objective function can provide the top few camera placement setups which can be verified and finalized before installation.

Other examples of constraints can include: shelves are seen at an angle of approximately 90 degrees, the neck plane (the plane at which neck joints are tracked) be observed with a camera angle of at least 45 degrees with respect to ceiling (or roof), two cameras be placed at positions at least 25 centimeters apart, etc.

In some shopping stores, large items may be placed on shelves which can block view of aisles or other display structures positioned behind the shelves containing large or tall items on top shelves. The system can include impact of such items when calculating the camera coverage. In such cases, additional cameras may be needed to provide coverage of display structures or aisle obstructed by tall or large items.

In one embodiment, the system can include logic to determine an improved camera coverage for a particular camera placement plan in the area of real space by changing positions of display structures including shelves, bins and other types of containers that can contain items in the area of real space. The system can include logic to improve the camera coverage for display structures and subject tracking by rearranging or moving the display structures in the area of real space.

The system can also determine the coverage of 360-degree cameras (omnidirectional cameras). These cameras are modeled with larger fields of view in comparison to traditional rectilinear lens cameras. The camera model of these cameras can have a field of view of 360 degrees horizontal and 180 degrees vertical. As the cameras are omnidirectional the computation of orientation is not required. The orientation of 360-degree cameras is determined by the surface to which they are attached to. The positions of the cameras are added in the search space and the method disclosed can compute the optimal positions and number of cameras to fulfill the required coverage constraints. The process presented with reference to FIGS. 8A and 8B can be applied to 360-degree or omnidirectional cameras.

Camera Pose Definition

The final camera placement is defined as a set of 6D poses for the cameras with respect to the defined store origin. Each camera pose has the position (x,y,z) and the orientation (rx, ry, rz). Also, each camera position is accompanied by an expected view from the camera for ease of installation.

Process for Determining Camera Placement

The technology disclosed presents a tool to estimate the number of cameras in the area of real space to support tracking subjects and detecting item take and puts. Calculating the number of cameras required to have optimal coverage in an environment is a challenge. For a multi-camera computer vision system, having proper coverage is important for operations of the autonomous checkout system.

The technology disclosed can provide a coverage plan for an area of real space. The system can include the following features:
1. Optimize for a particular system for cashier-less checkout, or other systems, the number of cameras for maximum coverage of a space respecting the constraints of where and how cameras can be installed.
2. Automatically provide camera coverage analysis in indoor spaces suited for a particular system for cashier-less checkout, or other systems.
3. Take into account various constraints such as number of cameras to be viewing a specific point in space, angle at which the cameras should see a point, etc. for a particular system for cashier-less checkout, or other systems.

4. Determine scores on the coverage quality with simulated people walking in the space with different shopper personas for a particular system for cashier-less checkout, or other systems.

Figure 8A:
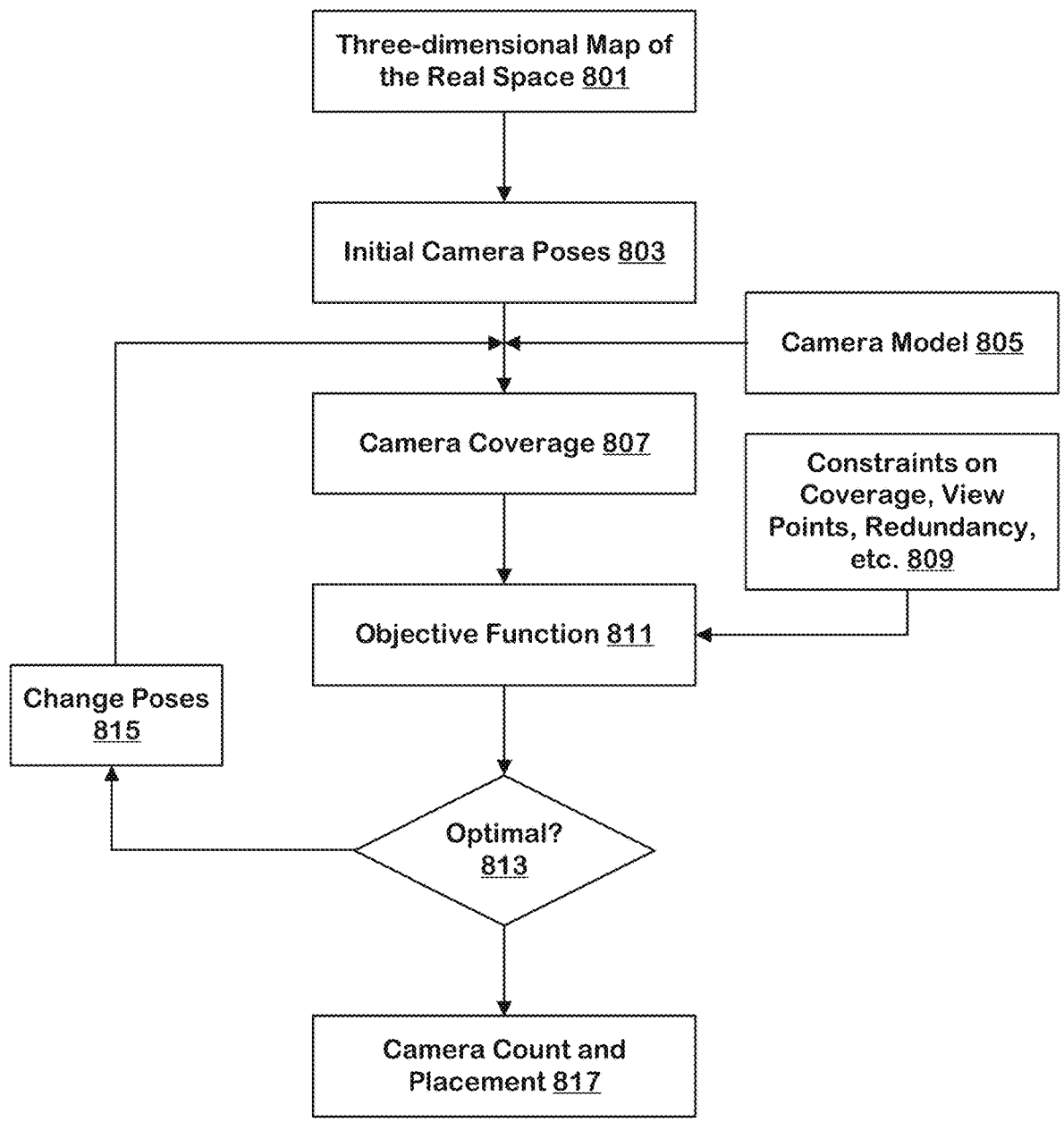
FIG. 8A is a flowchart illustrating process steps for camera placement.

FIG. 8A is a high-level process flow that indicates inputs, processing steps and outputs from the proposed tool. The process starts with creation of three-dimensional maps of the area of real space such as a shopping store (801). Calculating the poses of these cameras before installing is important to improve the accuracy and efficiency of the camera installation. The technology disclosed can ensure that the cameras cover the entire region of interest in the environment and meet specific constraints for implementation of systems like autonomous checkout, security and surveillance, etc. The initial camera poses are determined at a step 803. The camera model can also be provided as an input to the camera coverage calculation process (805). The initial camera coverage plan can be one selected from (i) a random initialized coverage plan comprising an initial number of cameras randomly distributed in the three-dimensional real space and (ii) a proto-coverage plan comprising a received input of an initial number of cameras approximately positioned in the three-dimensional real space.

At a step 807, camera coverage is determined. We present further details of camera coverage determination process in FIG. 8B.

The system can then use an objective function to evaluate the camera coverage (811). The objective function can consider the constraints on camera coverage, viewpoints, redundancies and other criteria when evaluating a coverage map (809). For example, constraints can include aspects like at least a minimum number of cameras that can see each point in space, angle of incidence for each point in space from different cameras, etc.

If the coverage map provides an improved camera coverage as compared to a previously determined camera plan (813) or fulfills coverage requirements as described above, the system can select the camera coverage plan at a step 817. Otherwise, the system can change camera poses at a step 815 and determine a new camera coverage plan. The system can also increase or decrease the number of cameras in a camera placement plan and generate a new coverage map in a next iteration of the process. This method can also provide the 6d poses of the cameras (position in x,y,z and orientation in x,y,z) with respect to a known coordinate in the environment (805). In one embodiment, the system can generate multiple camera coverage plans that meet the coverage requirements and constraints. The system can provide these to an expert to select a best camera placement plan for placing cameras in the area of real space. The camera placement data can be stored in the camera placement database 150.

Process for Camera Map Creation

The system can determine camera coverage maps for subjects, shelves and other objects of interest in the area of real space.

The system can include logic to determine a set of camera coverage maps per camera including one of a set of occupied voxels representing positions of simulated subjects on a plane at some height above a floor of the three-dimensional real space through which simulated subjects would move through. In one embodiment, the system can track subject using neck positions or neckjoints at a plane 1.5 meters above the floor. Other values of height above the floor can be used to detect subjects. Other feature types such as eyes, nose or other joints of subjects can be used to detect subjects. The system can then aggregate camera coverage maps to obtain aggregate coverage map based upon the set of occupied voxels.

The system can include logic to determine a set of camera coverage maps per camera including one of a set of occupied voxels representing positions on a shelf in field of view. The system can then aggregate camera coverage maps to obtain aggregate coverage map for the shelf based upon the set of occupied voxels. The system can combine coverage maps for subjects and shelves to create overall coverage maps for the area of real space.

Figure 8B:
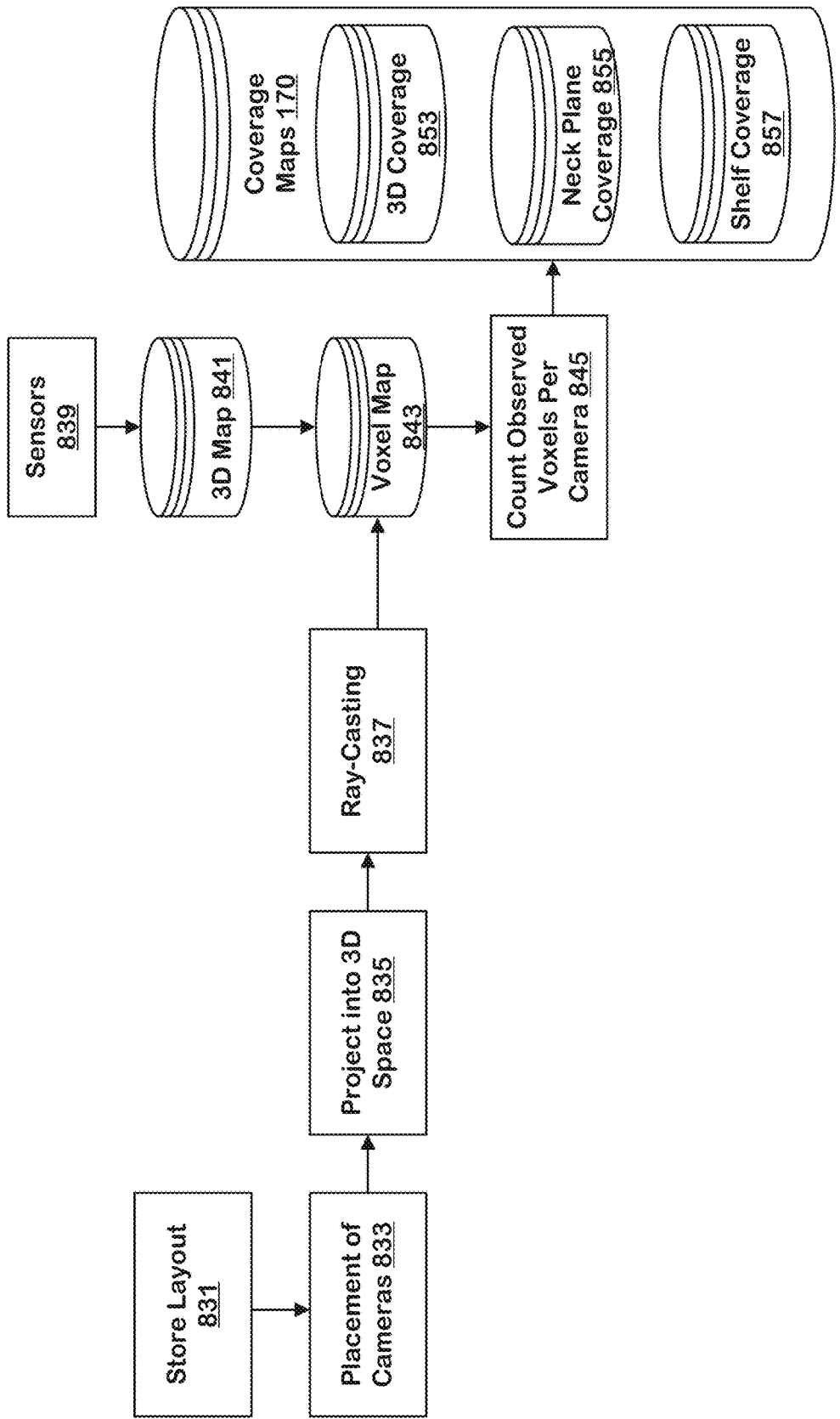
FIG. 8B is a flowchart illustrating process steps coverage map creation.

FIG. 8B presents an example process for creating coverage maps. The process starts with a layout of the area of real space such as a shopping store (831). The system can include logic to determine placement of cameras using the process presented in FIG. 8A (833). The system can then project the fields of view of the cameras in three dimensions by using overlapping images from cameras in the area of real space (835). The system can then perform ray casting from each pixel in images of cameras in three-dimensional geometric map and obtain the first occupied voxel hit by the ray (837).

The system can use sensors to determine three dimensional maps of the area of real space (839). An example of generation of 3D maps is presented above. The three-dimensional maps can be stored in a 3D maps database 841. The system can then determine voxels hit by ray-casting and store the identified voxels in a voxels map database 843. The system can then count observed voxels per camera (845). The system can determine three different types of coverage maps including 3D coverage maps (853), neck plane coverage maps (855), and shelf coverage maps (857). Collectively, the coverage maps can be stored in the coverage maps database 170.

The system can apply various threshold based on the constraints to select particular coverage maps per camera or aggregate coverage maps. For example, the system can apply coverage threshold to shelf coverage maps. The threshold can comprise at least 3 cameras visiting voxels representing positions on a shelf in field of view. Other threshold values above or below 3 cameras visiting voxels in shelves can be applied to select coverage maps.

The system can apply to the aggregate coverage map, a coverage threshold comprising a range of 80% or greater of a plane at some height above a floor of the three-dimensional real space through which simulated subjects would move through. It is understood that other values of threshold above or below 80% can be used to select coverage maps. The system can apply to aggregate coverage map, a coverage threshold comprising at least 2 cameras with at least 60 degrees angle of incidence covering select portions of a plane at some height above a floor of the three-dimensional real space through which simulated subjects would move through. Other values of threshold greater than or less than 60 degrees angle of incidence can be used to select coverage maps.

In one embodiment, the technology disclosed determines a set of camera location and orientation pairs in each iteration of the process flow described here such that the physical and coverage constraints are guaranteed. The objective function can be formulated to assign scores to camera placement plans based on coverage of shelves, coverage of tracking zones in which subjects can move, etc. The technology disclosed can determine camera placement plans using various criteria. For example, using a camera minimization criterion, the system can generate camera placement plans that reduce (or minimize) the number of cameras which satisfying the coverage and physical/placement constraints. Using a coverage maximization criterion, the system can generate camera placement plans that increase (or maximize) the camera coverage while keeping the number of cameras as fixed. The objective function can assign scores to camera placement plans generated by different criteria and select a top 3 or top 5 camera placement plans. A camera placement plan from these plans can be selected to install the cameras in the area of real space.

In another embodiment, the system can generate camera placement separate camera placement plans that improve coverage of either shelves or tracking subjects. In this embodiment, the system can generate an improved camera placement plans in two steps. For examples, in a first step, the system iteratively generates a camera placement plan that provides improved coverage of shelves. Then this camera placement plan is provided as input to a second step in which this camera placement plan is further iteratively adjusted to provide improved coverage of subject tracking in the area of real space. Camera placement plans in both steps can be generated by using process steps presented in FIGS. 8A and 8B.

Figure 9A:
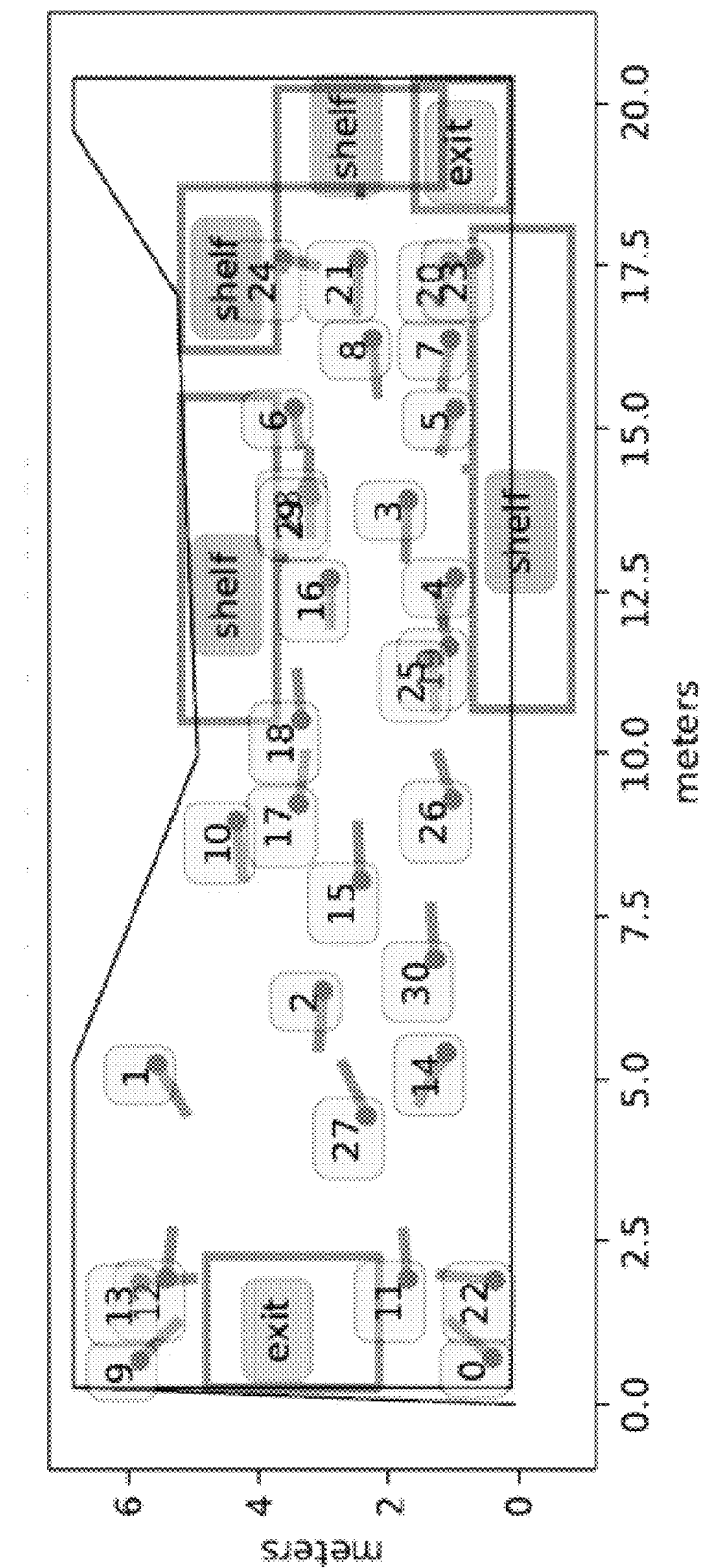
FIG. 9A presents an example top view of an area of real space with camera placement and orientations.

We present examples of various types of coverage maps in FIGS. 9C to 9K. FIG. 9A presents a top view of a layout of an area of real space such as a shopping store with cameras positioned on the ceiling. The camera centers are shown in orange circles or dots with orientations of respective cameras shown in red lines. Camera identifiers are shown inside yellow boxes. Shelf positions are shown in blue rectangles and exit areas are shown in green colors.

Figure 9B:
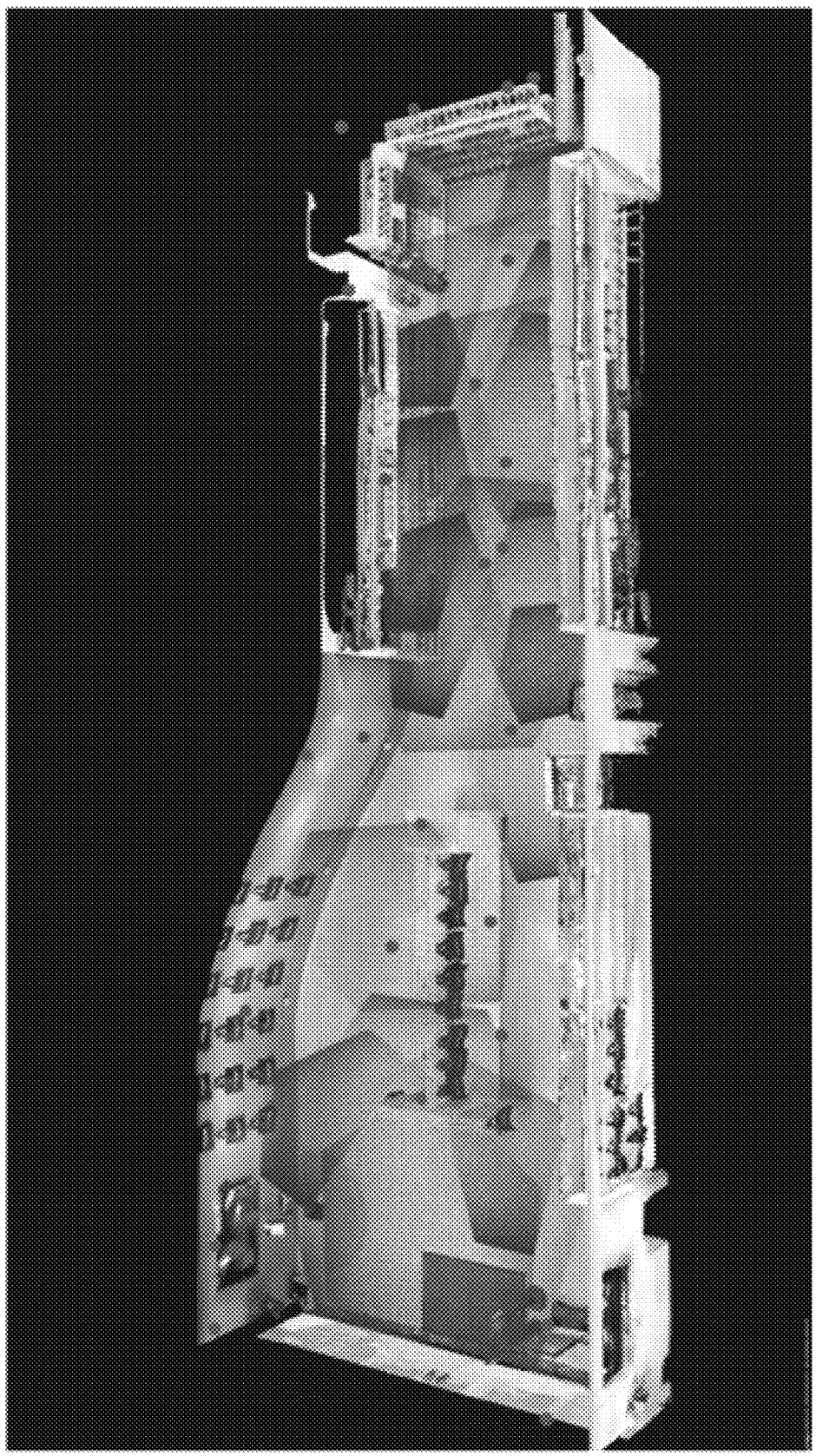
FIG. 9B present a three-dimensional view of the area of real space presented in FIG. 9A.

FIG. 9B presents a three-dimensional view of the area of real space of FIG. 9A. Red circles or dots represent the cameras in the three-dimensional space. Blue regions represent projections from respective cameras at 1.5-meter distance.

Figure 9C:
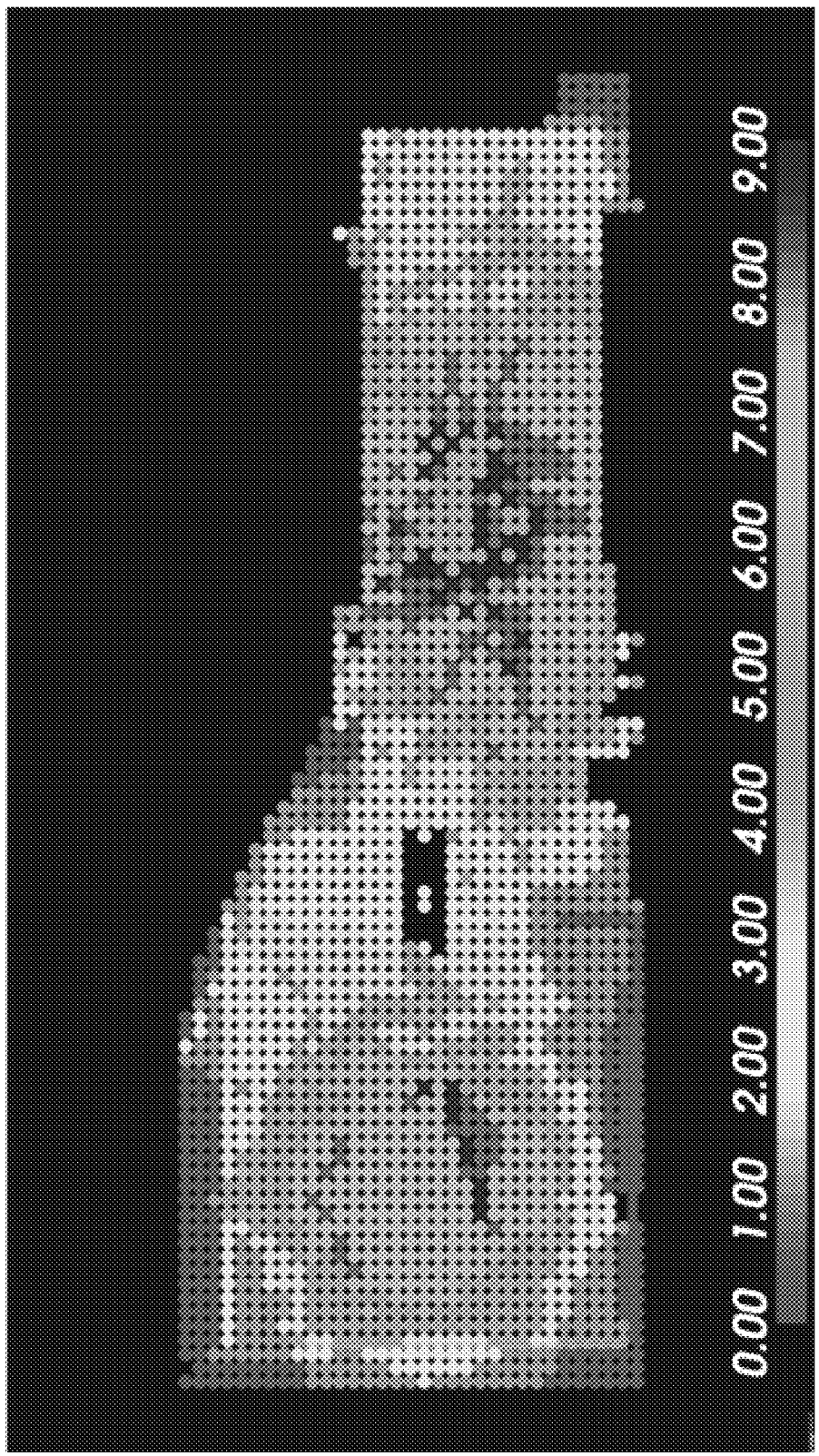
FIG. 9C presents an illustration of camera coverage for neck height detection in the area of real space.
Figure 9D:
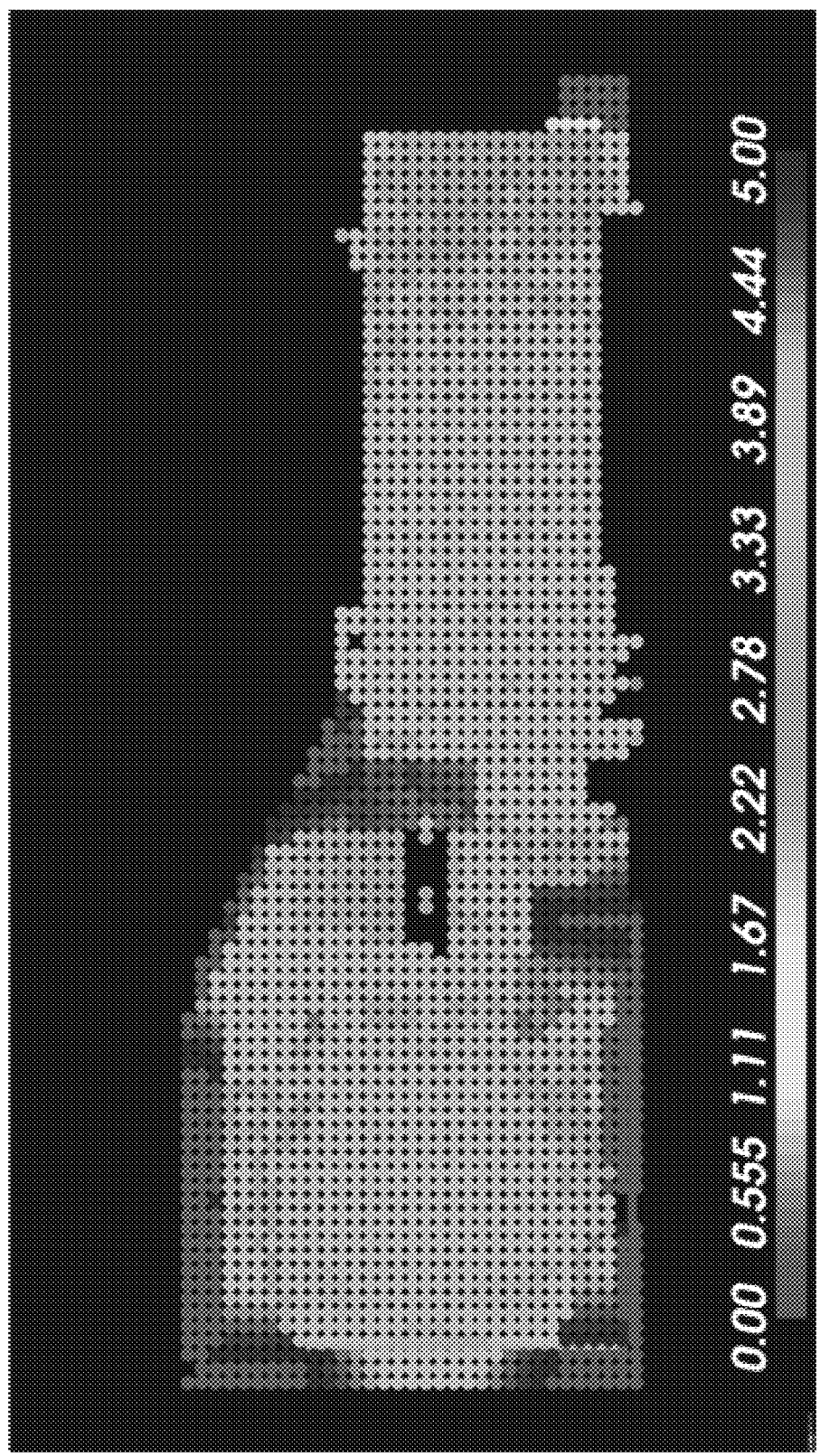
FIG. 9D presents an illustration of neck height average distance per voxel for the example in FIG. 9C.
Figure 9E:
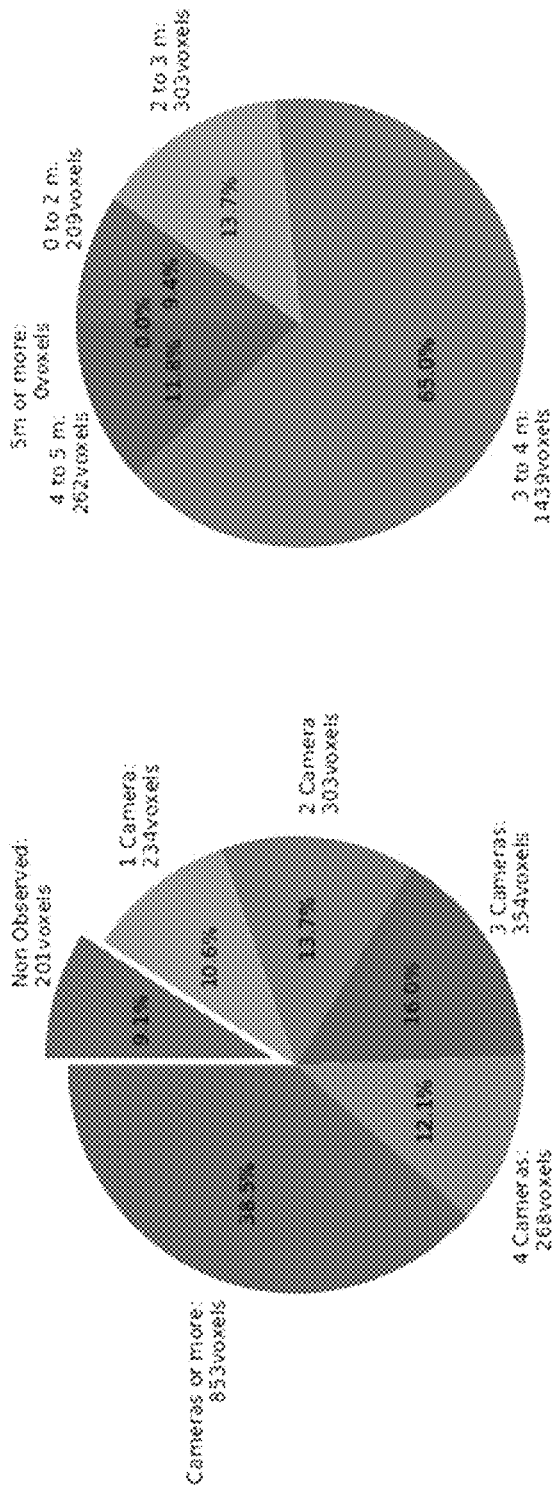
FIG. 9E presents statistics for an example camera placement in the area of real space for neck height level.

FIGS. 9C to 9E present camera coverage for of subjects in the area of real space. The subjects are tracked at neck (or neckjoint) positions. The neck height is a grid made at 1.5 meter above the floor which is a reasonable height to find subjects' necks. It is understood that planes at other heights can be created to detect neck joints or other features of subjects in the area of real space. The walkable areas of the real space (such as shopping store) are considered to build the neck grid. FIG. 9C presents number of times a camera has line of sight with a voxel at neck height. Red colored circles or dots represent voxels with low coverage (fewer cameras hitting a voxel) and blue colored dots represent voxels with high coverage values (more cameras hitting a voxel). A color legend at the bottom of the illustration in FIG. 9C shows color codes indicating number of cameras hitting a voxel of a particular color. FIG. 9D presents average distance of all cameras hitting a voxel. The illustration is for neck height coverage and indicates average distance per voxel at neck height. Red voxels show distance closer to cameras (which is better) and blue voxels show distance further away from the cameras (which is not good). FIG. 9E presents various statistics for neck height coverage. The graph on the left shows number of cameras that visited a voxel. The mean distance for this example is 3.86 meters and standard deviation is 2.46. The graph on the right shows average distance between a camera and voxels. The mean distance for this example is 3.17 meters and standard deviation is 1.12.

Figure 9F:
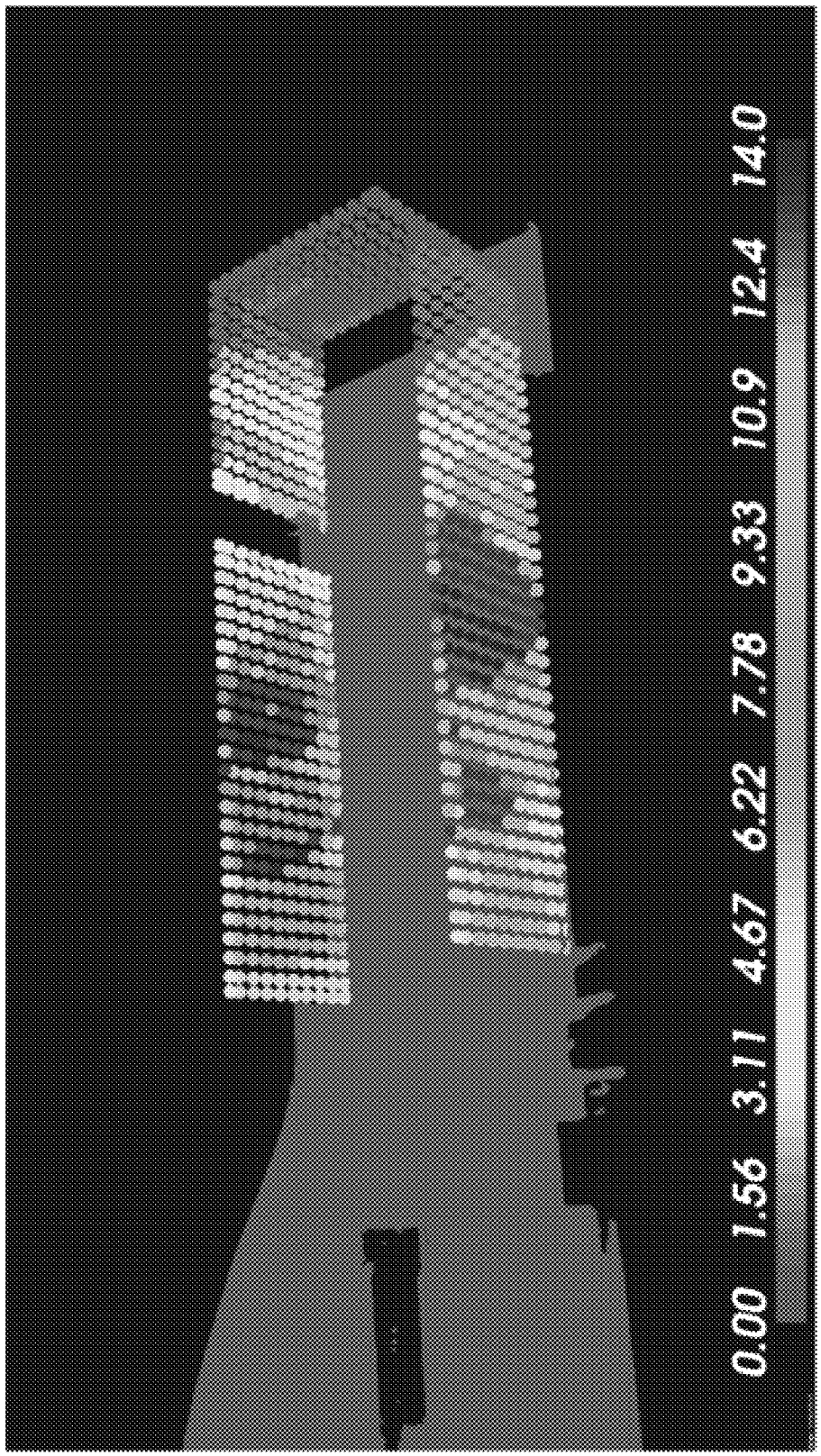
FIG. 9F presents an illustration of camera coverage for shelves in the area of real space.
Figure 9G:
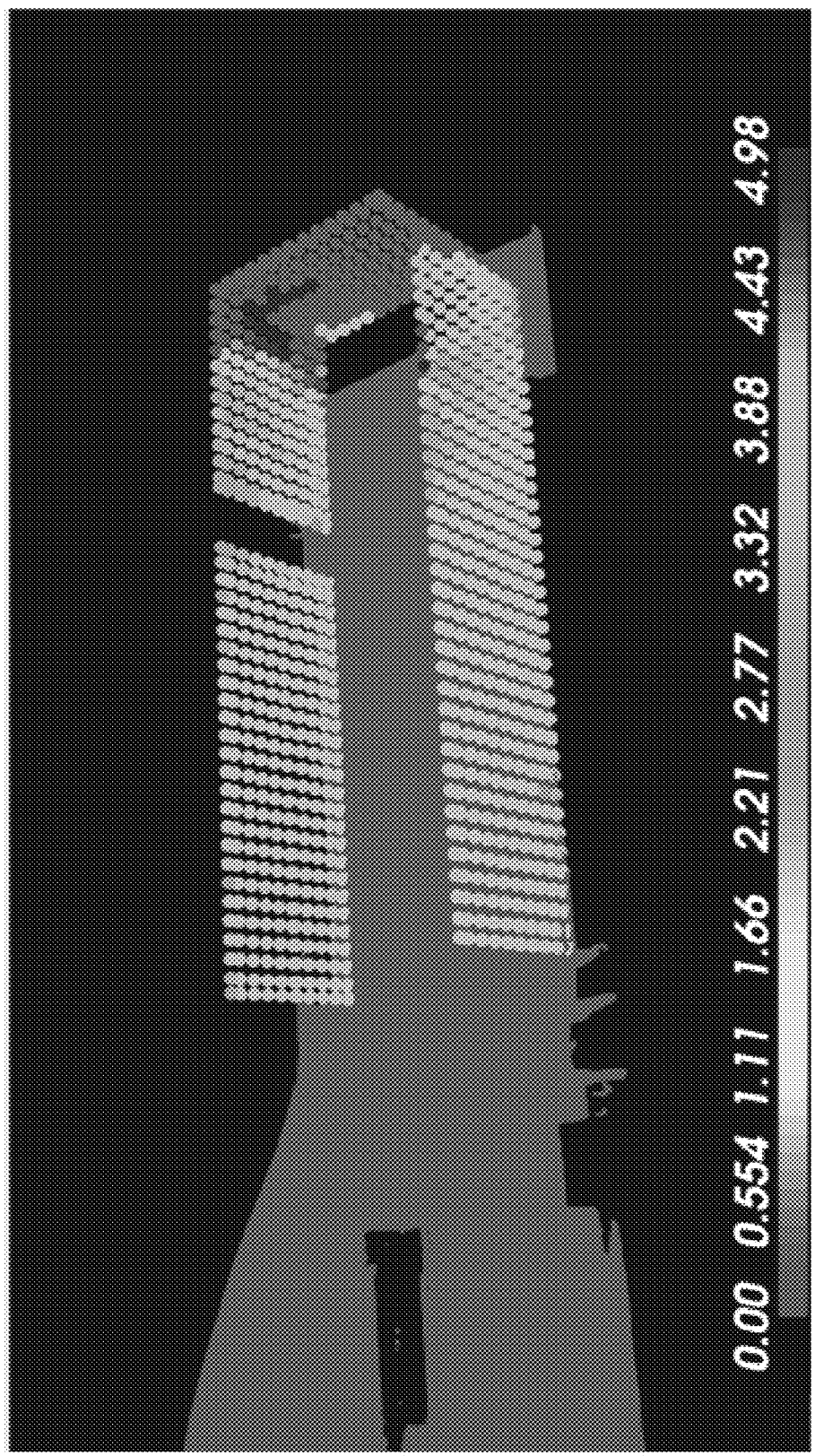
FIG. 9G presents an illustration of average distance per voxel for the example in FIG. 9F.
Figure 9H:
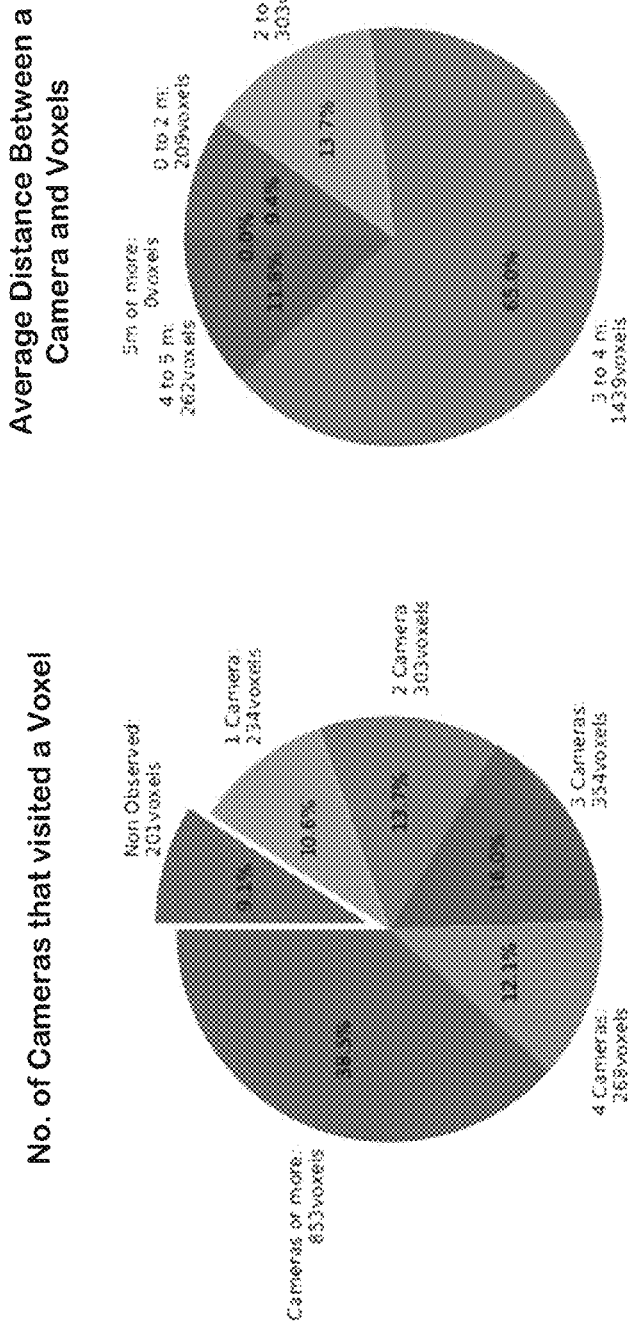
FIG. 9H presents an illustration of shelf coverage statistics in the area of real space.

FIGS. 9F to 9H present camera coverage for shelves in the area of real space. These figures show how the shelves positioned in the area of real space are detected by the cameras. FIG. 9F presents number of cameras visiting voxels in shelves. The voxels can be positioned on shelves or inside the display structures. Red colored circles or dots represent voxels that are not visited by any camera (thus low coverage). Blue colored circles or dots represent voxels visited by higher number of cameras (thus higher coverage). FIG. 9G presents average distance per voxel positioned in shelves. Red colored circles represent voxels closer to cameras or having low distance to cameras (which is better) and blue colored circles represent voxels further away from cameras (which is not good). FIG. 9H presents statistics for shelf coverage in the area shopping store. The graph on the left shows number of cameras that visited a voxel. The mean distance for this example is 5.56 meters and standard deviation is 4.66. The graph on the right shows average distance between a camera and voxels. The mean distance for this example is 2.98 meters and standard deviation is 1.34.

Figure 9I:
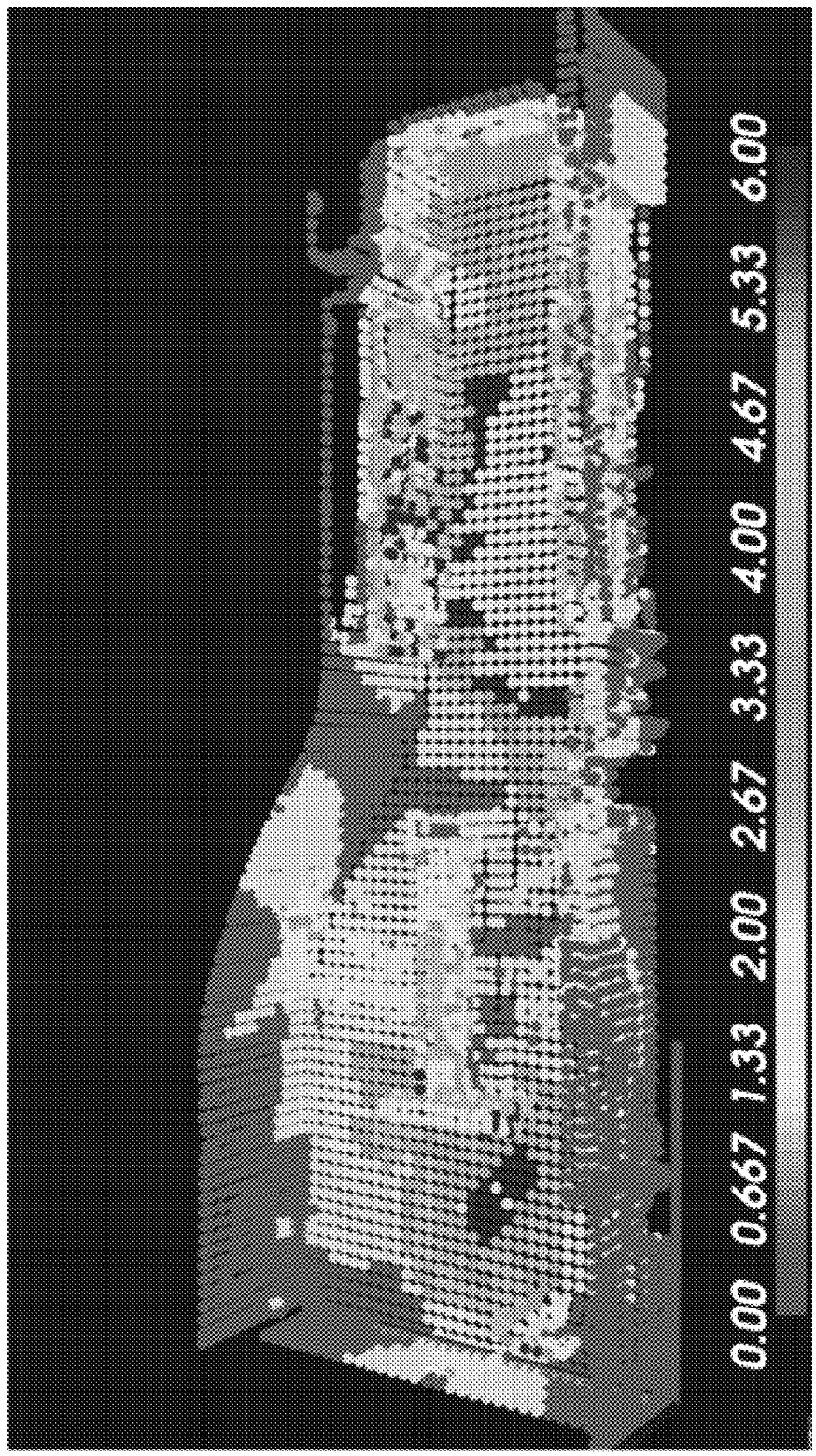
FIG. 9I presents an illustration of overall coverage of an area of real space for an example placement of cameras.
Figure 9J:
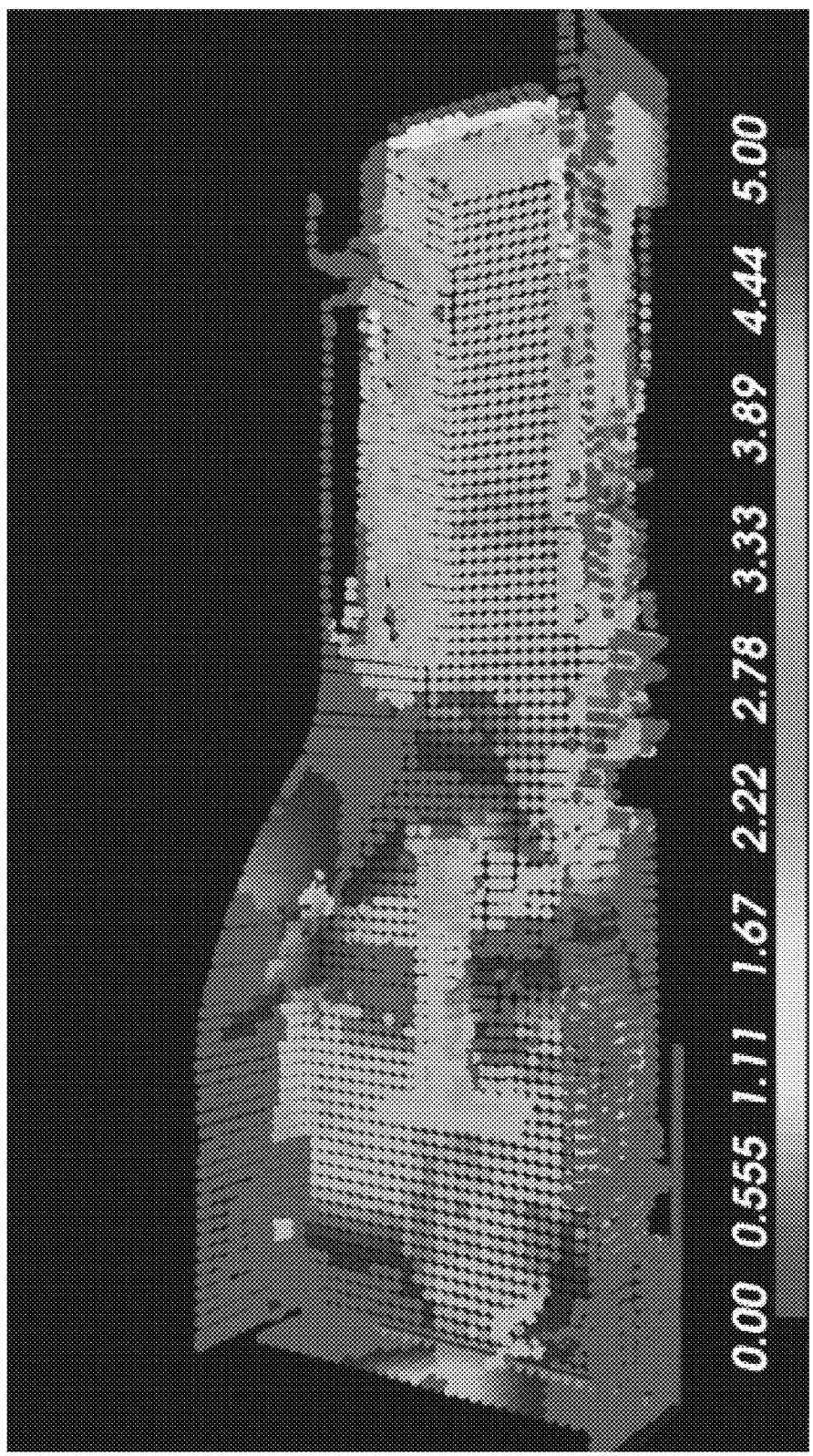
FIG. 9J presents an illustration of average distance per voxel for the camera coverage map of FIG. 9I.
Figure 9K:
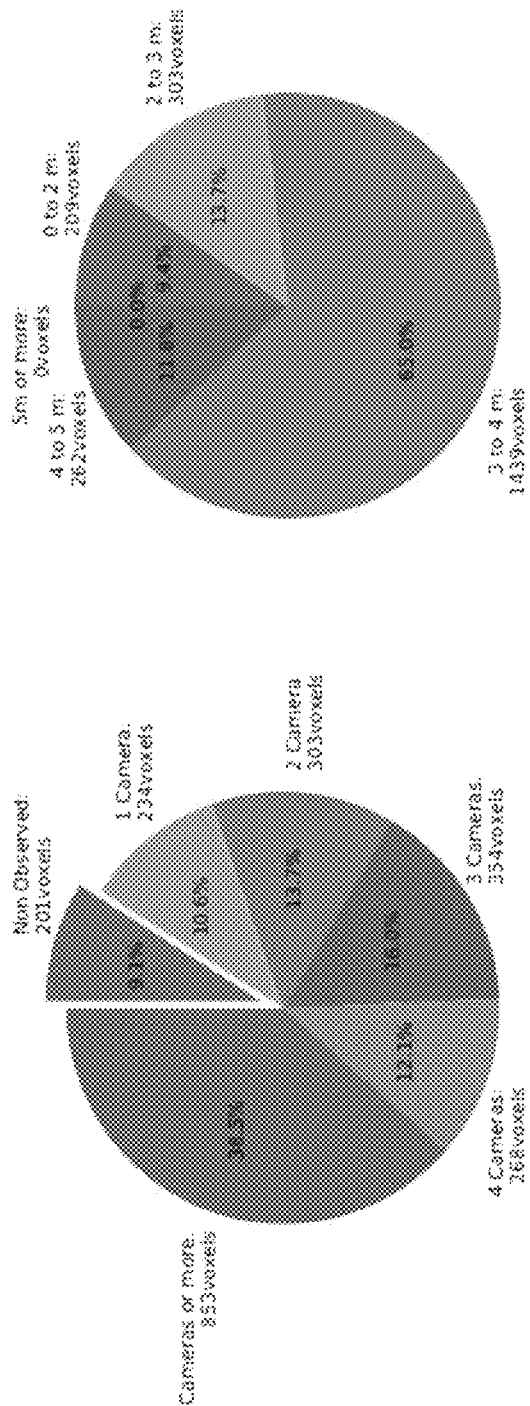
FIG. 9K presents overall camera coverage statistics in the area of real space.
Figure 9L:
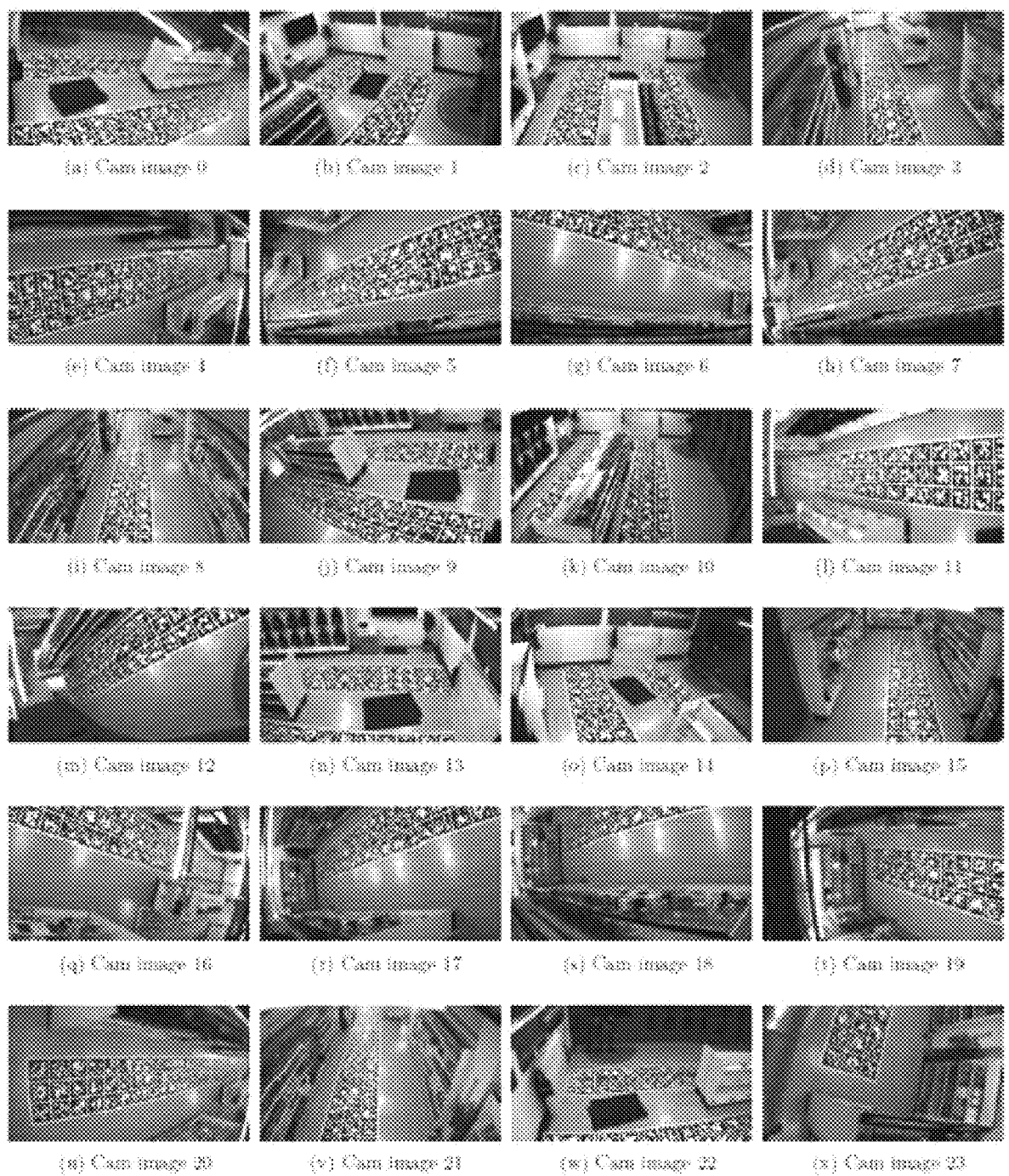
FIGS. 9L and 9M present views from cameras positioned over the area of real space.
Figure 9M:
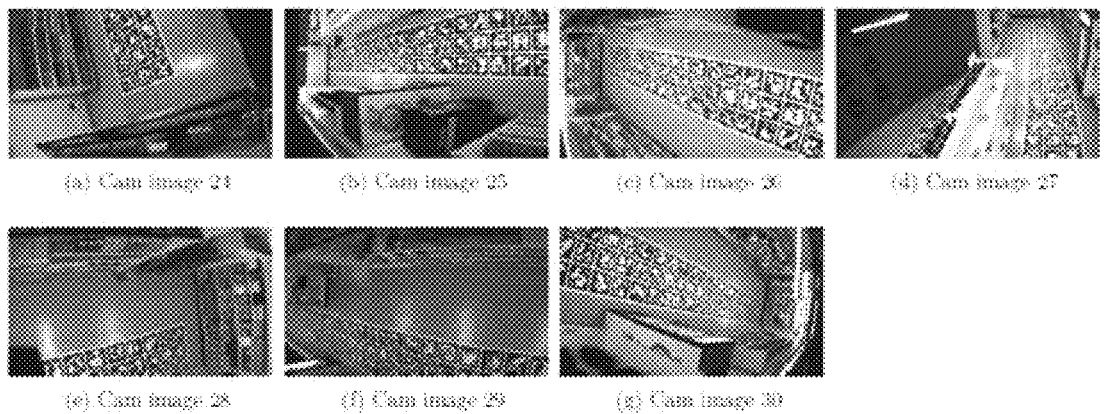

FIGS. 9I to 9K present camera coverage for three-dimensional area of real space including walking areas and shelves or display structures. FIG. 9I presents a number of times a camera has a line of sight with a voxel in the area of real space. Red circles represent voxels with low camera coverage values and blue circles represent voxels with high camera coverage values. A legend at the bottom of the figure maps different colors to number of cameras hitting a voxel. FIG. 9J presents average distance of all the cameras visiting a voxel. Red colored circles represent voxels with small distance to cameras or closer to cameras (which is better) and blue color circles represent voxels with larger distance to cameras or further away from cameras (which is not good). FIG. 9K presents statistics for coverage of three-dimensional area of real space. A graph on the left shows number of cameras that visited a voxel. The mean distance for this example is 1.58 meters and standard deviation is 1.7. A graph on the right shows average distance between camera and voxels. The mean distance for this example is 2.44 meters and standard deviation is 1.91. FIGS. 9L and 9M present images from thirty cameras positioned in an area of real space.

Figure 10:
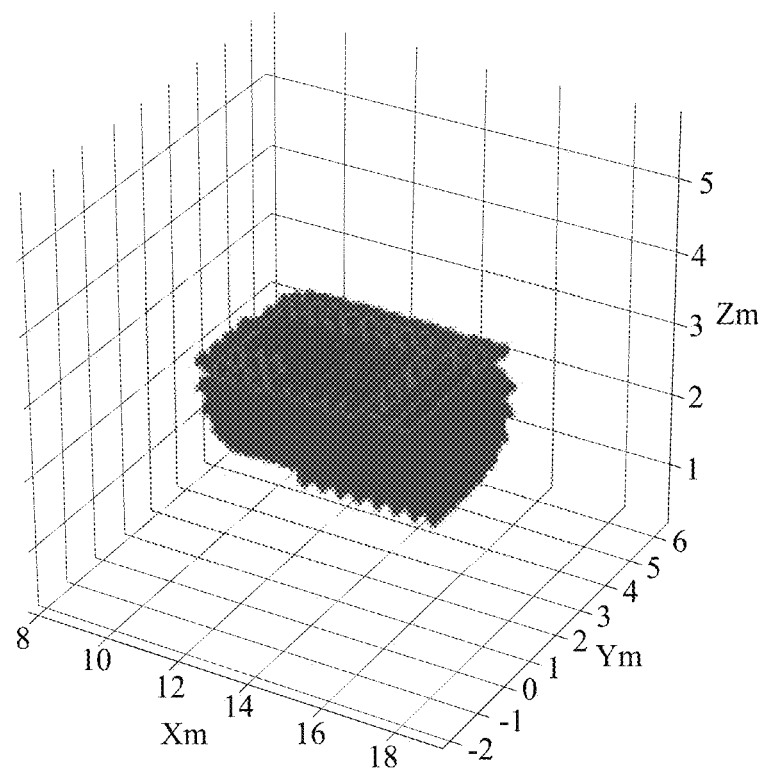
FIG. 10 presents all possible camera positions and their orientations in the area of real space.
Figure 10:
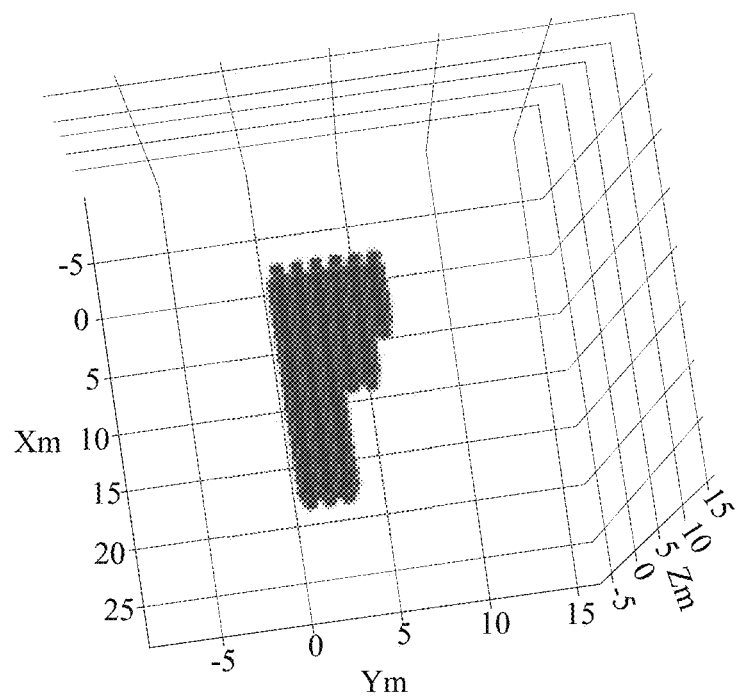

FIG. 10 present visualizations showing all possible camera locations in an area of real space in blue color. The orientation of cameras at all possible locations in the area of real space are indicated in red color. In this example, the cameras are assumed to be positioned at or near the ceiling of the area of real space and orientation of cameras are towards the floor and shelves positioned in the area of the real space. The red colors in the illustrations represent direction vectors from cameras with respective orientations.

Figure 11A:
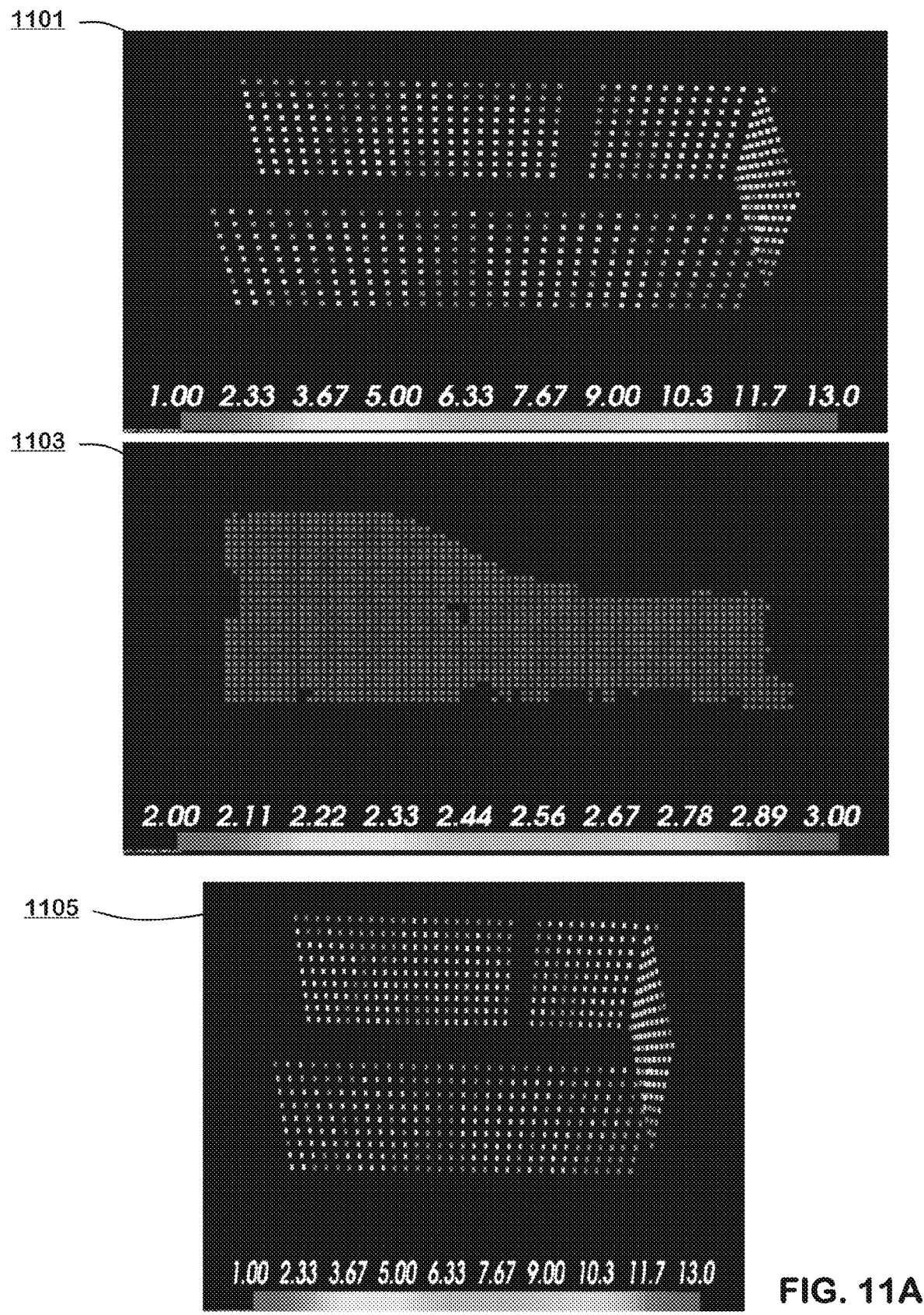
FIGS. 11A, 11B, 11C, and 11D present examples of camera coverage maps for the area of real space.
Figure 11B:
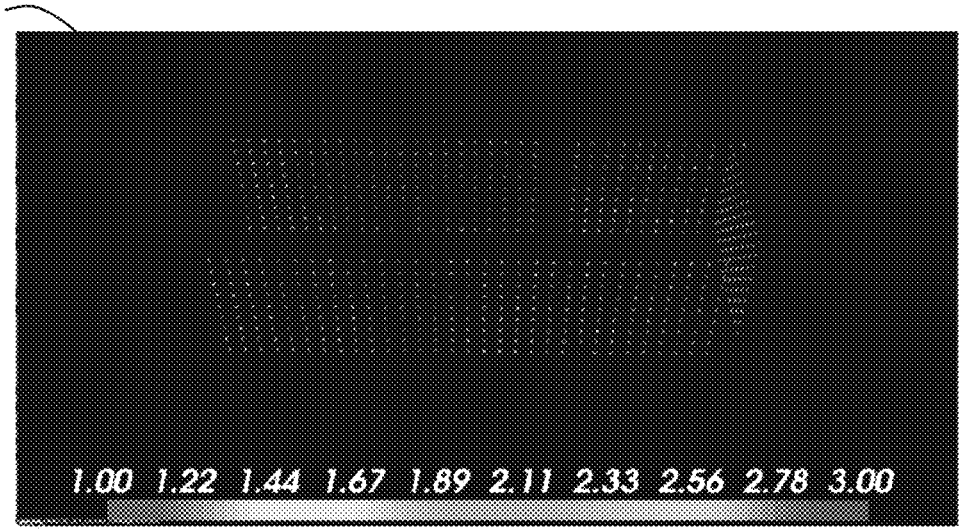
Figure 11B:
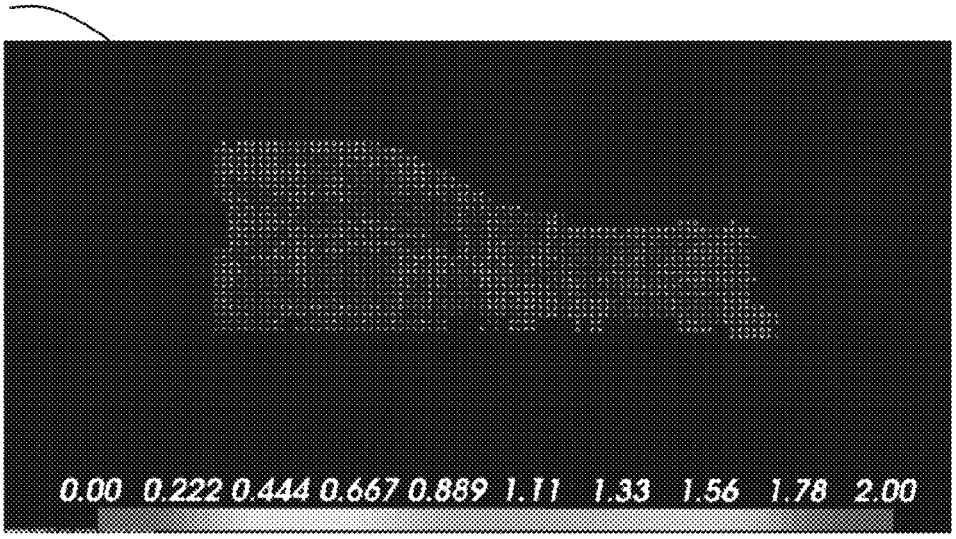
Figure 11B:
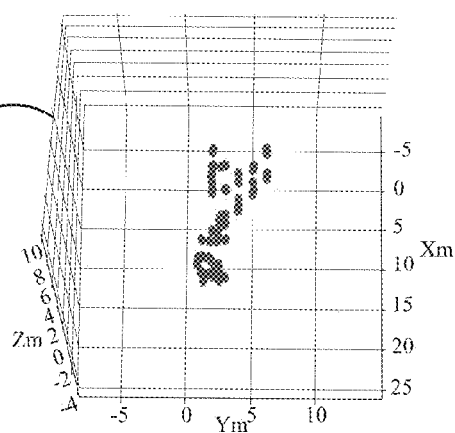
Figure 11C:
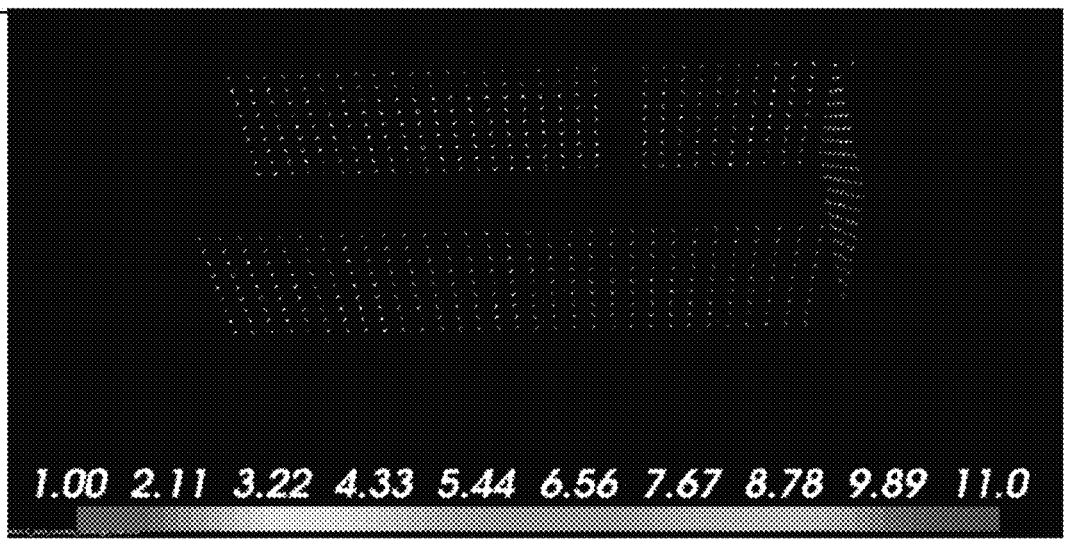
Figure 11C:
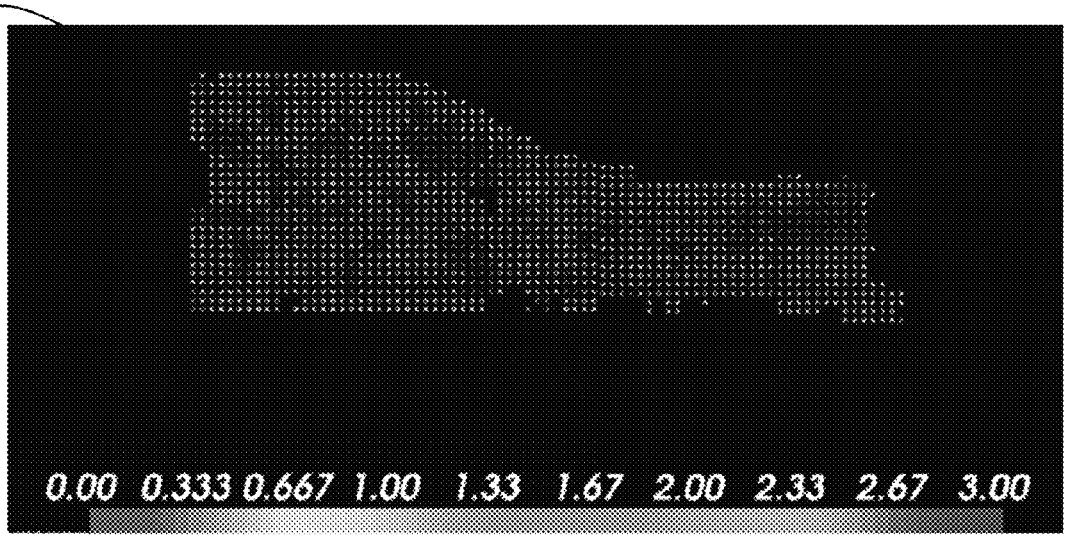
Figure 11C:
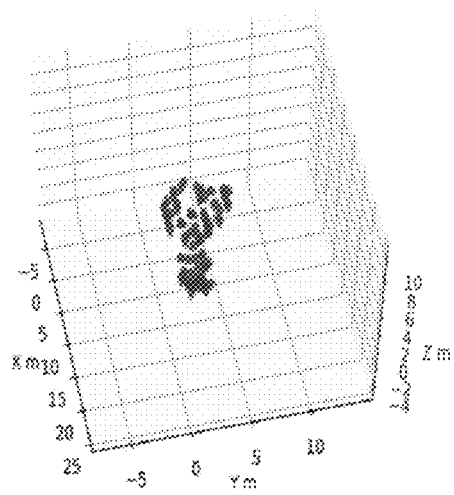
Figure 11D:
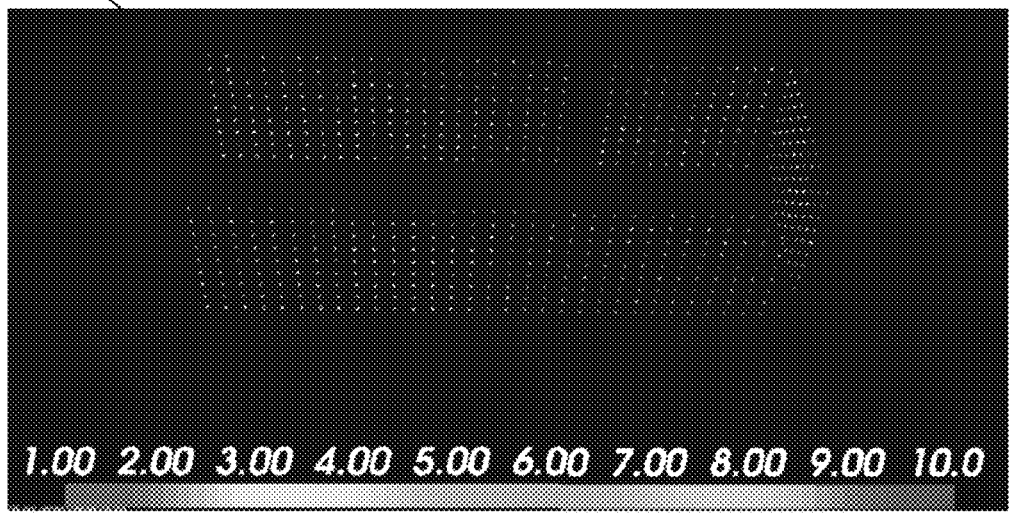
Figure 11D:
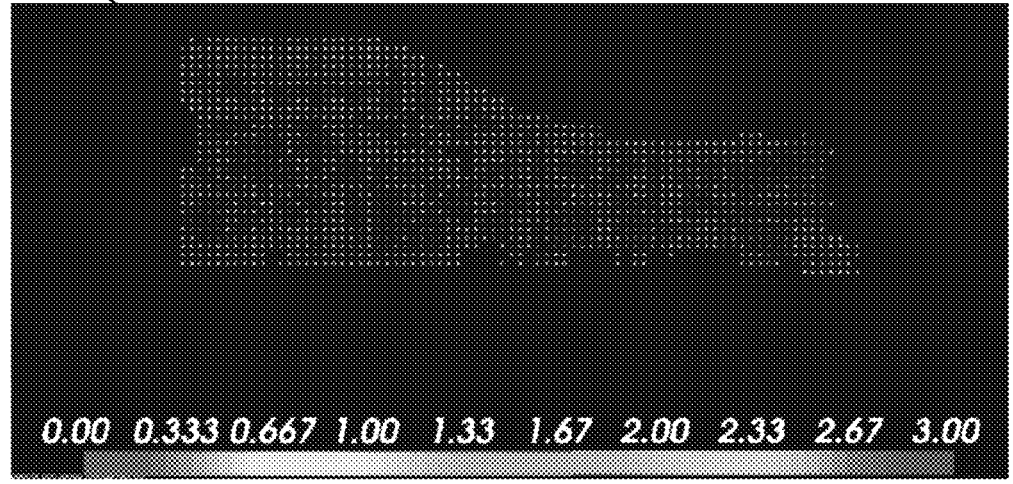
Figure 11D:
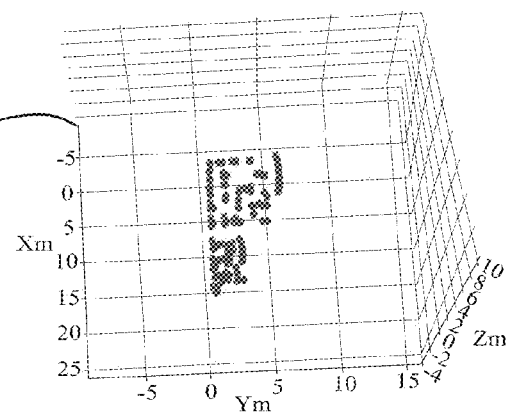

FIGS. 11A to 11D present examples of camera coverage maps for an area of real space with different number of cameras. FIG. 11A presents an example shelf coverage map 1101, an example neck height coverage map 1103, and camera positions 1105 for complete camera coverage determined using the method presented herein. FIG. 11B presents an example shelf coverage map 1111, an example neck height coverage map 1113, and camera positions 1115 with thirty cameras in the area of real space. FIG. 11C presents an example shelf coverage map 1121, an example neck height coverage map 1123, and camera positions 1125 with forty cameras in the area of real space. FIG. 11D presents an example shelf coverage map 1131, an example neck height coverage map 1133, and camera positions 1135 with fifty cameras in the area of real space.

We now present the subject data structures and process steps for subject tracking. Following this, we present the details of the joints CNN model that can be used to identify and track subjects in the area of real space.

Subject Data Structure

The joints of the subjects are connected to each other using the metrics described above. In doing so, the subject tracking engine 110 creates new subjects and updates the locations of existing subjects by updating their respective joint locations. FIG. 12 shows the subject data structure 1200 to store the subjects in the area of real space. The data structure 1200 stores the subject-related data as a key-value dictionary. The key is a frame number and the value is another key-value dictionary where the key is the camera_id and the value is a list of 18 joints (of the subject) with their locations in the real space. The subject data can be stored in the subject database 140. Every new subject is also assigned a unique identifier that is used to access the subject's data in the subject database 140.

In one embodiment, the system identifies joints of a subject and creates a skeleton of the subject. The skeleton is projected into the real space indicating the position and orientation of the subject in the real space. This is also referred to as "pose estimation" in the field of machine vision. In one embodiment, the system displays orientations and positions of subjects in the real space on a graphical user interface (GUI). In one embodiment, the image analysis is anonymous, i.e., a unique identifier assigned to a subject created through joints analysis does not identify personal identification details (such as names, email addresses, mailing addresses, credit card numbers, bank account numbers, driver's license number, etc.) of any specific subject in the real space.

Process Flow of Subject Tracking

A number of flowcharts illustrating subject detection and tracking logic are described herein. The logic can be implemented using processors configured as described above programmed using computer programs stored in memory accessible and executable by the processors, and in other configurations, by dedicated logic hardware, including field programmable integrated circuits, and by combinations of dedicated logic hardware and computer programs. With all flowcharts herein, it will be appreciated that many of the steps can be combined, performed in parallel, or performed in a different sequence, without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the embodiments, and it will be understood that numerous additional steps for accomplishing other functions can be performed before, after and between those shown.

Figure 13A:
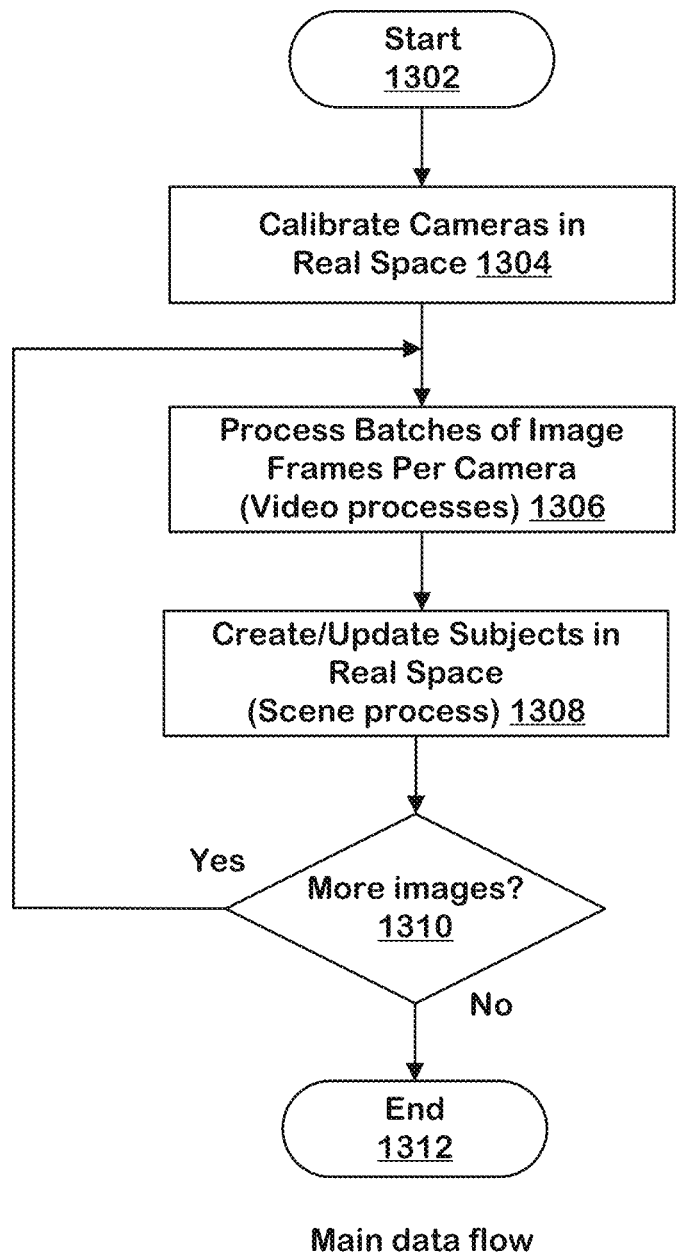
FIG. 13A is a flowchart illustrating process steps for calibrating cameras and tracking subjects by the system of FIG. 1.
Figure 13B:
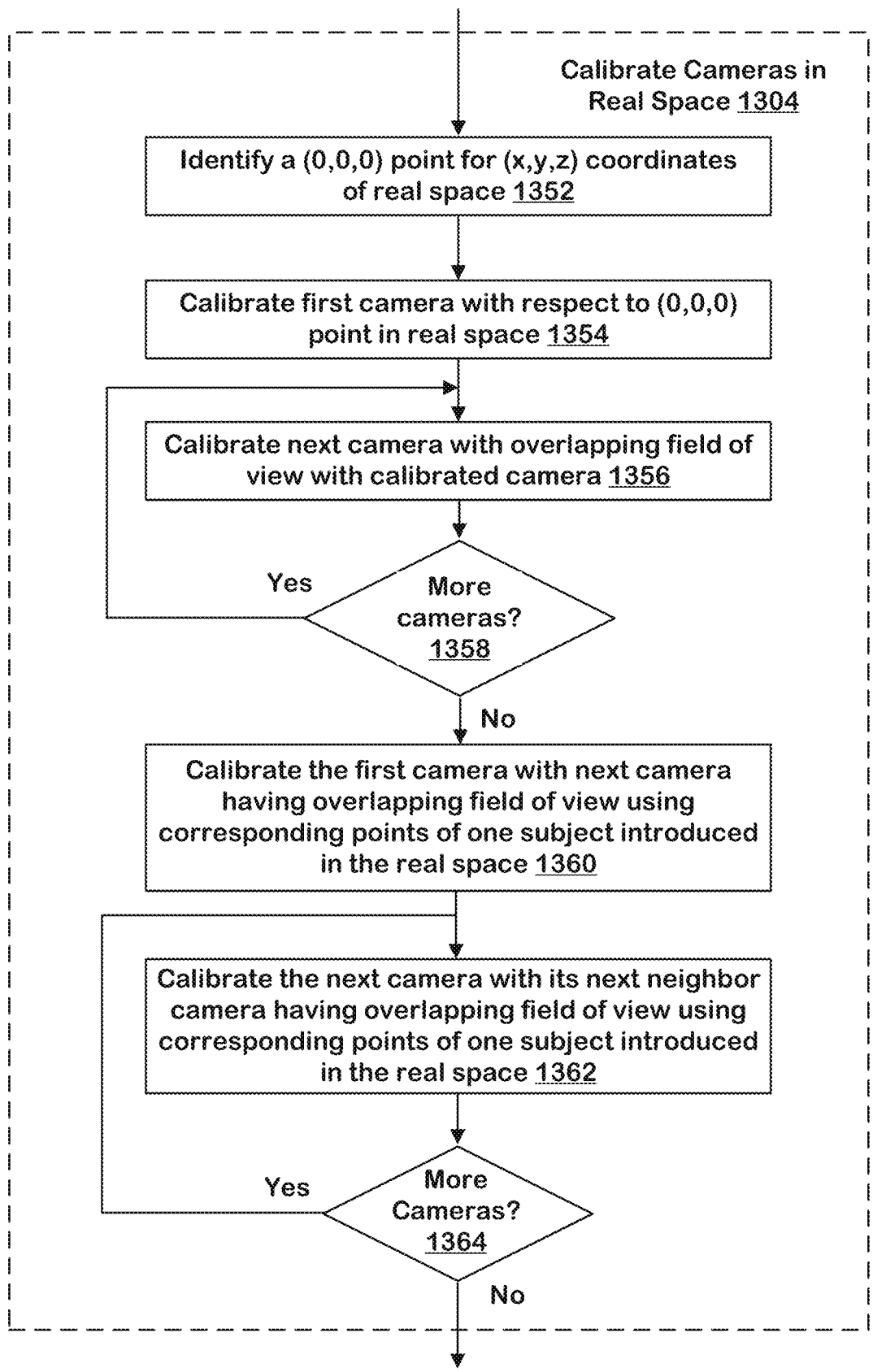
FIG. 13B is a flowchart showing more detailed process steps for a camera calibration step of FIG. 13A.

FIG. 13A is a flowchart illustrating process steps for tracking subjects. The process starts at step 1302. The cameras 114 having fields of view in an area of the real space are calibrated in process step 1304. The calibration process can include identifying a (0, 0, 0) point for (x, y, z) coordinates of the real space. A first camera with the location (0, 0, 0) in its field of view is calibrated. More details of camera calibration are presented earlier in this application. Following this, a next camera with an overlapping field of view with the first camera is calibrated. The process is repeated at step 1304 until all cameras 114 are calibrated. In a next process step of camera calibration, a subject is introduced in the real space to identify conjugate pairs of corresponding points between cameras with overlapping fields of view. Some details of this process are described above. The process is repeated for every pair of overlapping cameras. The calibration process ends if there are no more cameras to calibrate.

Video processes are performed at step 1306 by image recognition engines 112a-112n. In one embodiment, the video process is performed per camera to process batches of image frames received from respective cameras. The output of all or some of the video processes from respective image recognition engines 112a-112n is given as input to a scene process performed by the tracking engine 110 at step 1308. The scene process identifies new subjects and updates the joint locations of existing subjects. At step 1310, it is checked whether there are more image frames to be processed. If there are more image frames, the process continues at step 1306, otherwise the process ends at step 1312.

More detailed process steps of the process step 1304 "calibrate cameras in real space" are presented in a flowchart in FIG. 13A. The calibration process starts at step 1352 by identifying a (0, 0, 0) point for (x, y, z) coordinates of the real space. At step 1354, a first camera with the location (0, 0, 0) in its field of view is calibrated. More details of camera calibration are presented earlier in this application. At step 1356, a next camera with an overlapping field of view with the first camera is calibrated. At step 1358, it is checked whether there are more cameras to calibrate. The process is repeated at step 1356 until all cameras 114 are calibrated.

In a next process step 1360, a subject is introduced in the real space to identify conjugate pairs of corresponding points between cameras with overlapping fields of view. Some details of this process are described above. The process is repeated for every pair of overlapping cameras at step 1362. The process ends if there are no more cameras (step 1364).

Figure 14:
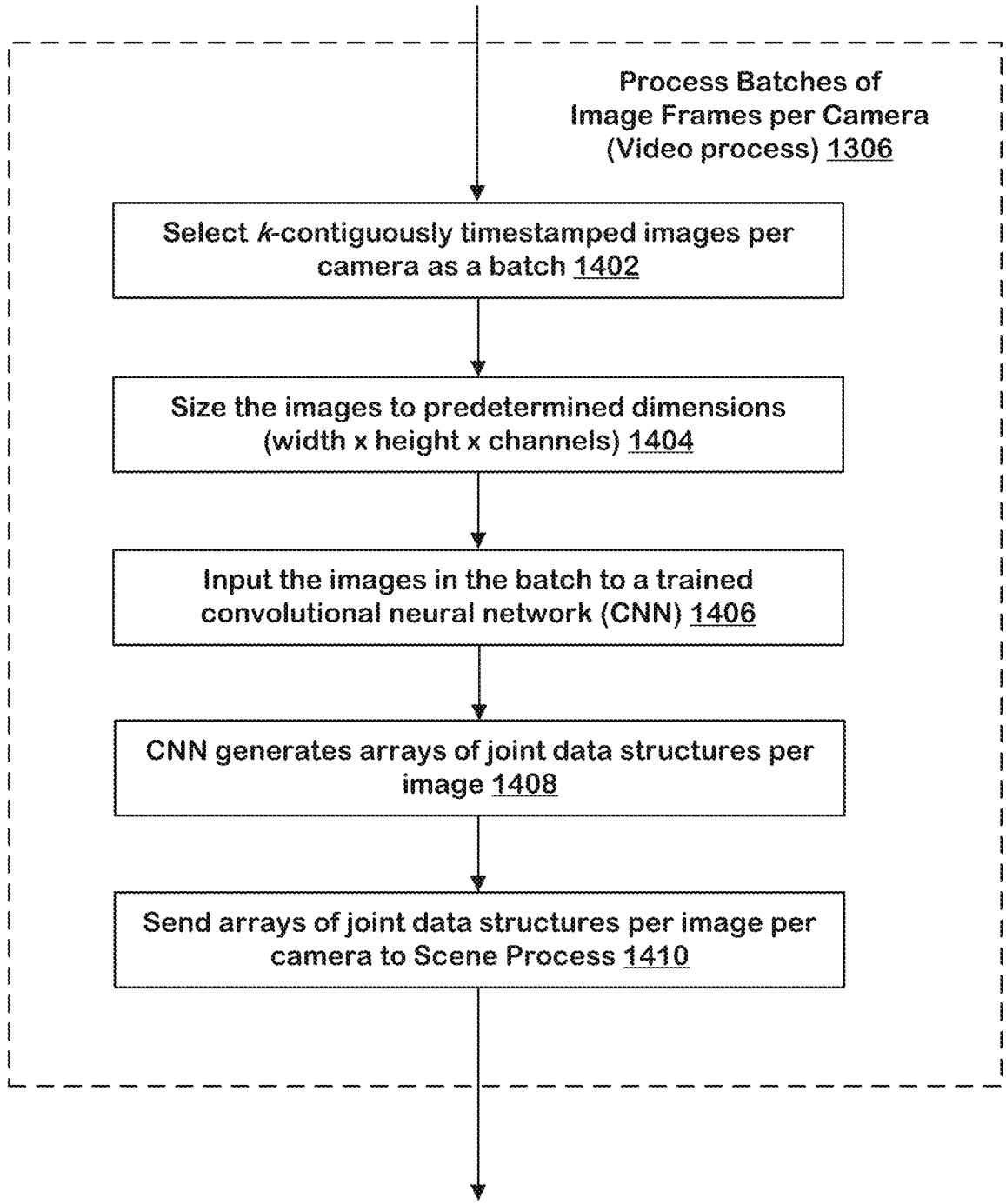
FIG. 14 is a flowchart showing more detailed process steps for a video process step of FIG. 13A.

A flowchart in FIG. 14 shows more detailed steps of the "video process" step 1306 in the flowchart of FIG. 13A. At step 1402, k-contiguously timestamped images per camera are selected as a batch for further processing. In one embodiment, the value of k=6 which is calculated based on available memory for the video process in the network nodes 101a-101n, respectively hosting image recognition engines 112a-112n. It is understood that the technology disclosed can process image batches of greater than or less than six images. In a next step 1404, the size of the images is set to appropriate dimensions. In one embodiment, the images have a width of 1280 pixels, a height of 720 pixels and three channels RGB (representing red, green and blue colors). At step 1406, a plurality of trained convolutional neural networks (CNN) process the images and generate arrays of joints data structures per image. The output of the CNNs are arrays of joints data structures per image (step 1408). This output is sent to a scene process at step 1410.

Figure 15A:
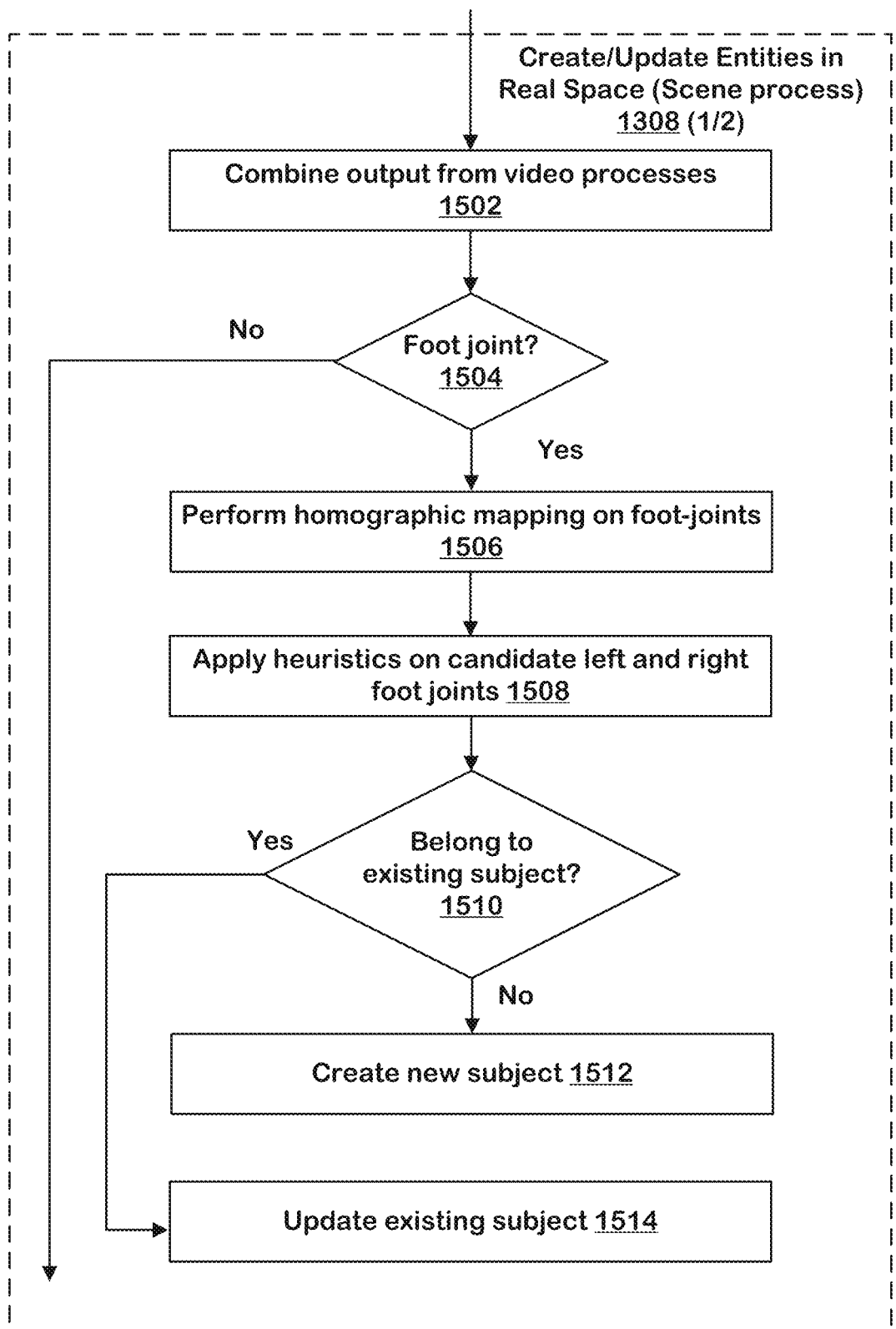
FIG. 15A is a flowchart showing a first part of more detailed process steps for the scene process of FIG. 13A.

FIG. 15A is a flowchart showing a first part of more detailed steps for the "scene process" step 1308 in FIG. 13A. The scene process combines outputs from multiple video processes at step 1502. At step 1504, it is checked whether a joints data structure identifies a foot joint or a non-foot joint. If the joints data structure is of a foot-joint, homographic mapping is applied to combine the joints data structures corresponding to images from cameras with overlapping fields of view at step 1506. This process identifies candidate foot joints (left and right foot joints). At step 1508 heuristics are applied on candidate foot joints identified in step 1506 to identify sets of candidate foot joints as subjects. It is checked at step 1510 whether the set of candidate foot joints belongs to an existing subject. If not, a new subject is created at step 1512. Otherwise, the existing subject is updated at step 1514.

Figure 15B:
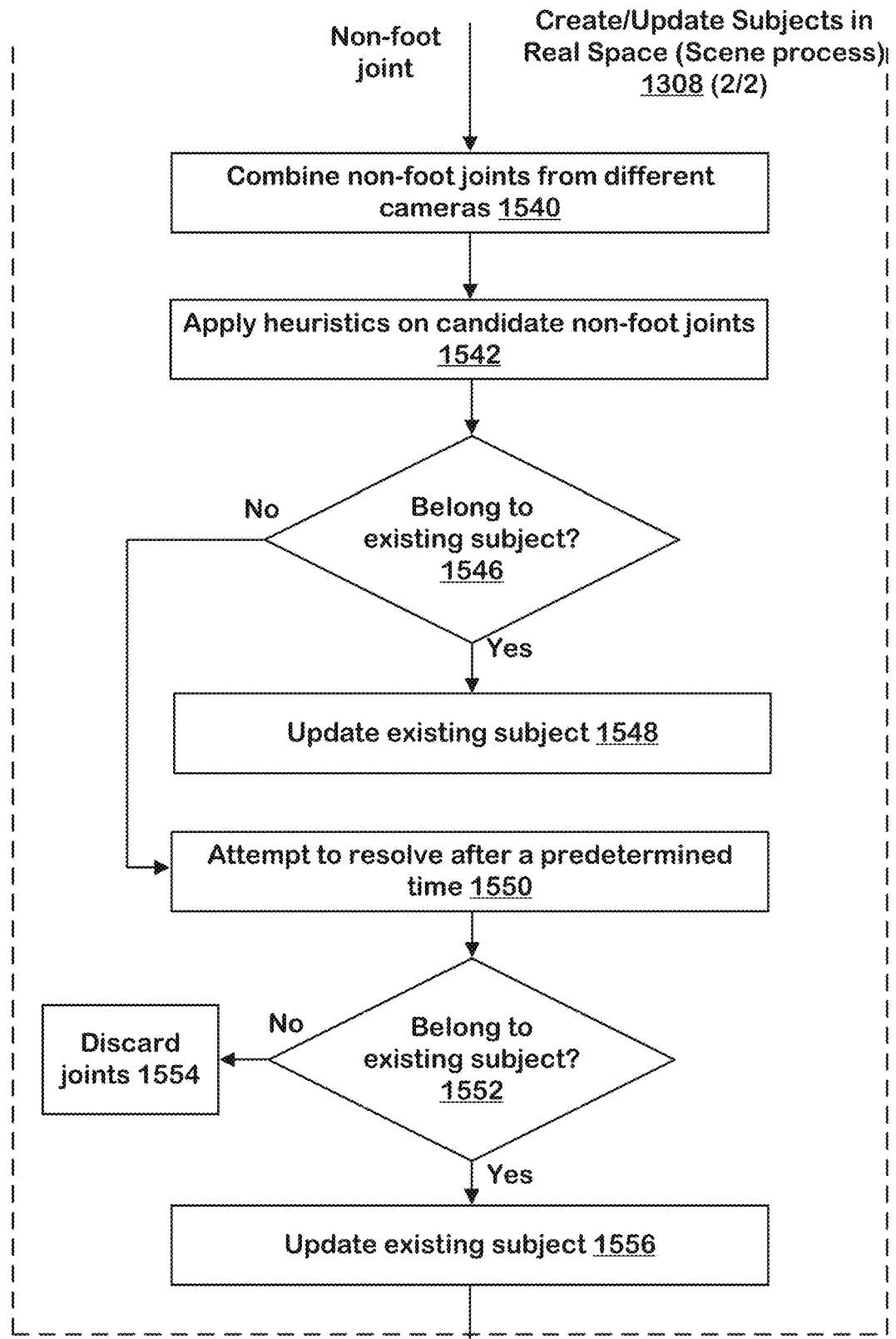
FIG. 15B is a flowchart showing a second part of more detailed process steps for the scene process of FIG. 13A.

A flowchart in FIG. 15B illustrates a second part of more detailed steps for the "scene process" step 1308. At step 1540, the data structures of non-foot joints are combined from multiple arrays of joints data structures corresponding to images in the sequence of images from cameras with overlapping fields of view. This is performed by mapping corresponding points from a first image from a first camera to a second image from a second camera with overlapping fields of view. Some details of this process are described above. Heuristics are applied at step 1542 to candidate non-foot joints. At step 1546 it is determined whether a candidate non-foot joint belongs to an existing subject. If so, the existing subject is updated at step 1548. Otherwise, the candidate non-foot joint is processed again at step 1550 after a predetermined time to match it with an existing subject. At step 1552 it is checked whether the non-foot joint belongs to an existing subject. If true, the subject is updated at step 1556. Otherwise, the joint is discarded at step 1554.

In an example embodiment, the processes to identify new subjects, track subjects and eliminate subjects (who have left the real space or were incorrectly generated) are implemented as part of an "entity cohesion algorithm" performed by the runtime system (also referred to as the inference system). An entity is a constellation of joints referred to as a subject above. The entity cohesion algorithm identifies entities in the real space and updates the locations of the joints in real space to track the movement of the entity.

Classification of Proximity Events

We now describe the technology to identify the type of a proximity event by classifying the detected proximity events. The proximity event can be a take event, a put event, a hand-off event or a touch event. The technology disclosed can further identify an item associated with the identified event. A system and various implementations for tracking exchanges of inventory items between sources and sinks in an area of real space are described with reference to FIGS. 16A and 16B. The system and processes are described with reference to FIGS. 16A and 16B, which are architectural level schematics of a system in accordance with an implementation. Because FIGS. 16A and 16B are architectural diagrams, certain details are omitted to improve the clarity of the description.

The technology disclosed comprises multiple image processors that can detect put and take events in parallel. We can also refer to these image processors as image processing pipelines that process the sequences of images from the cameras 114. The system can then fuse the outputs from two or more image processors to generate an output identifying the event type and the item associated with the event. The multiple processing pipelines for detecting put and take events increase the robustness of the system as the technology disclosed can predict a take and put of an item in an area of real space using the output of one of the image processors when the other image processors cannot generate a reliable output for that event. The first image processors 1604 use locations of subjects and locations of inventory display structures to detect "proximity events" which are further processed to detect put and take events. The second image processors 1606 use bounding boxes of hand images of subjects in the area of real space and perform time series analysis of the classification of hand images to detect region proposals-based put and take events. The third images processors 1622 can use masks to remove foreground objects (such as subjects or shoppers) from images and process background images (of shelves) to detect change events (or diff events) indicating puts and takes of items. The put and take events (or exchanges of items between sources and sinks) detected by the three image processors can be referred to as "inventory events".

The same cameras and the same sequences of images are used by the first image processors 1604 (predicting location-based inventory events), the second image processors 1606 (predicting region proposals-based inventory events) and the third image processors 1622 (predicting semantic diffing-based inventory events), in one implementation. As a result, detections of puts, takes, transfers (exchanges), or touches of inventory items are performed by multiple subsystems (or procedures) using the same input data allowing for high confidence, and high accuracy, in the resulting data.

Figure 16A:
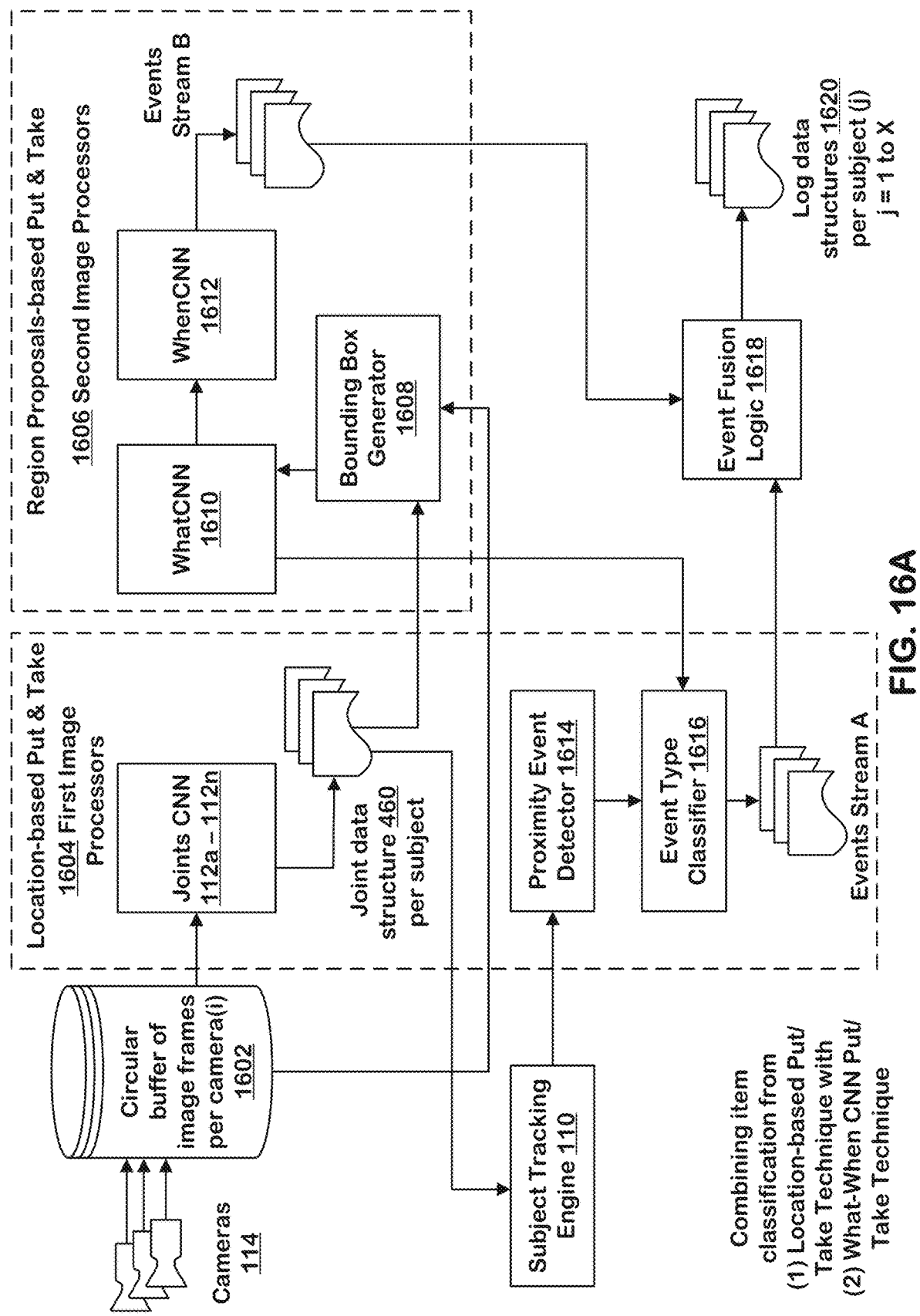
FIG. 16A is an example architecture for combining an event stream from location-based put and take detection with an event stream from region proposals-based (What-CNN and WhenCNN) put and take detection.
Figure 16B:
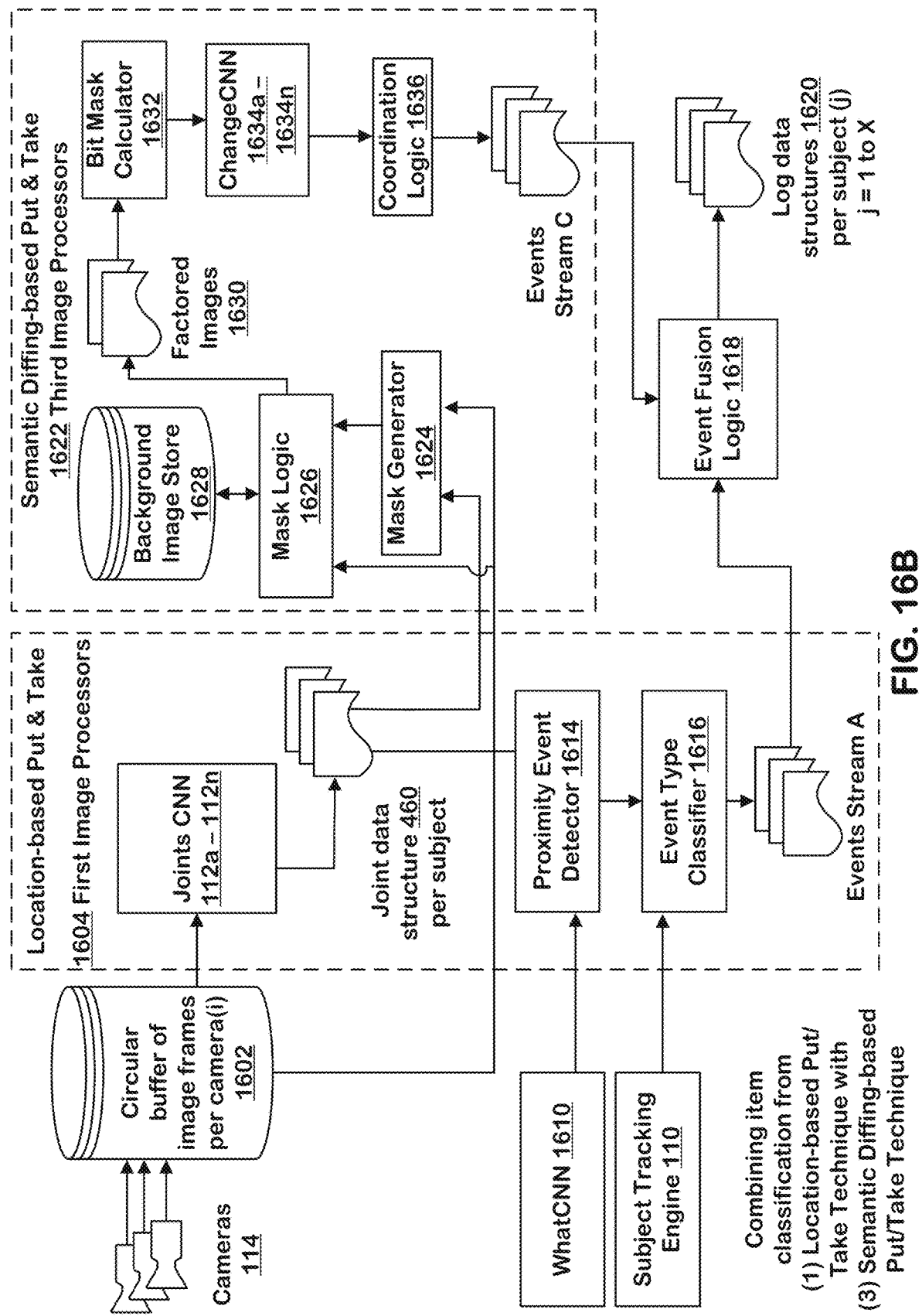
FIG. 16B is an example architecture for combining an event stream from location-based put and take detection with an event stream from semantic diffing-based put and take detection.

In FIG. 16A, we present the system architecture illustrating the first and the second image processors and fusion logic to combine their respective outputs. In FIG. 16B, we present a system architecture illustrating the first and the third image processors and fusion logic to combine their respective outputs. It should be noted that all three image processors can operate in parallel and the outputs of any combination of the two or more image processors can be combined. The system can also detect inventory events using one of the image processors.

Location-Based Events and Region Proposals-Based Events

FIG. 16A is a high-level architecture of two pipelines of neural networks processing image frames received from cameras 114 to generate shopping cart data structures for subjects in the real space. The system described here includes per-camera image recognition engines as described above for identifying and tracking multi-joint subjects. Alternative image recognition engines can be used, including examples in which only one "joint" is recognized and tracked per individual, or other features or other types of image data over space and time are utilized to recognize and track subjects in the real space being processed.

The processing pipelines run in parallel per camera, moving images from respective cameras to image recognition engines 112a-112n via circular buffers 1602 per camera. In one embodiment, the first image processors subsystem 1604 includes image recognition engines 112a-112n implemented as convolutional neural networks (CNNs) and referred to as joint CNNs 112a-112n. As described in relation to FIG. 1, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space.

In one embodiment, the cameras 114 are installed in a shopping store (such as a supermarket) such that sets of cameras (two or more) with overlapping fields of view are positioned over each aisle to capture images of real space in the store. There are N cameras in the real space, represented as camera(i) where the value of i ranges from 1 to N. Each camera produces a sequence of images of real space corresponding to its respective field of view.

In one embodiment, the image frames corresponding to sequences of images from each camera are sent at the rate of 30 frames per second (fps) to respective image recognition engines 112a-112n. Each image frame has a timestamp, an identity of the camera (abbreviated as "camera_id"), and a frame identity (abbreviated as "frame_id") along with the image data. The image frames are stored in a circular buffer 1502 (also referred to as a ring buffer) per camera 114. Circular buffers 1602 store a set of consecutively timestamped image frames from respective cameras 114. In some embodiments, an image resolution reduction process, such as downsampling or decimation, is applied to images output from the circular buffers 1602, before their input to the Joints CNN 122a-122n.

A Joints CNN processes sequences of image frames per camera and identifies the 18 different types of joints of each subject present in its respective field of view. The outputs of joints CNNs 112a-112n corresponding to cameras with overlapping fields of view are combined to map the locations of joints from the 2D image coordinates of each camera to the 3D coordinates of real space. The joints data structures 460 per subject (j) where j equals 1 to x, identify locations of joints of a subject (j) in the real space. The details of the subject data structure 460 are presented in FIG. 4B. In one example embodiment, the joints data structure 460 is a two level key-value dictionary of the joints of each subject. A first key is the frame number and the value is a second key-value dictionary with the key as the camera_id and the value as the list of joints assigned to a subject.

The data sets comprising subjects identified by the joints data structures 460 and corresponding image frames from sequences of image frames per camera are given as input to a bounding box generator 1608 in the second image processors subsystem 1606 (or the second processing pipeline). The second image processors produce a stream of region proposals-based events, shown as events stream B in FIG. 16A. The second image processors subsystem further comprises foreground image recognition engines. In one embodiment, the foreground image recognition engines recognize semantically significant objects in the foreground (i.e. shoppers, their hands and inventory items) as they relate to puts and takes of inventory items, for example, over time in the images from each camera. In the example implementation shown in FIG. 16A, the foreground image recognition engines are implemented as WhatCNN 1610 and WhenCNN 1612. The bounding box generator 1608 implements the logic to process data sets to specify bounding boxes which include images of hands of identified subjects in images in the sequences of images. The bounding box generator 1608 identifies locations of hand joints in each source image frame per camera using locations of hand joints in the multi joints data structures (also referred to as subject data structures) 1200 corresponding to the respective source image frame. In one embodiment, in which the coordinates of the joints in the subject data structure indicate the locations of joints in 3D real space coordinates, the bounding box generator maps the joint locations from 3D real space coordinates to 2D coordinates in the image frames of respective source images.

The bounding box generator 1608 creates bounding boxes for hand joints in image frames in a circular buffer per camera 114. In some embodiments, the image frames output from the circular buffer to the bounding box generator has full resolution, without downsampling or decimation, alternatively with a resolution higher than that applied to the joints CNN. In one embodiment, the bounding box is a 128 pixels (width) by 128 pixels (height) portion of the image frame with the hand joint located in the center of the bounding box. In other embodiments, the size of the bounding box is 64 pixels×64 pixels or 32 pixels×32 pixels. Form subjects in an image frame from a camera, there can be a maximum of 2m hand joints, thus 2m bounding boxes. However, in practice fewer than 2m hands are visible in an image frame because of occlusions due to other subjects or other objects. In one example embodiment, the hand locations of subjects are inferred from locations of elbow and wrist joints. For example, the right hand location of a subject is extrapolated using the location of the right elbow (identified as p1) and the right wrist (identified as p2) as extrapolation_amount*(p2−p1)+p2 where extrapolation_amount equals 0.4. In another embodiment, the joints CNN 112a-112n are trained using left and right hand images. Therefore, in such an embodiment, the joints CNN 112a-112n directly identify locations of hand joints in image frames per camera. The hand locations per image frame are used by the bounding box generator 1608 to create a bounding box per identified hand joint.

The WhatCNN 1610 is a convolutional neural network trained to process the specified bounding boxes in the images to generate the classification of hands of the identified subjects. One trained WhatCNN 1610 processes image frames from one camera. In the example embodiment of the shopping store, for each hand joint in each image frame, the WhatCNN 1610 identifies whether the hand joint is empty. The WhatCNN 1610 also identifies a SKU (stock keeping unit) number of the inventory item in the hand joint, a confidence value indicating the item in the hand joint is a non-SKU item (i.e. it does not belong to the shopping store inventory) and the context of the hand joint location in the image frame.

The outputs of WhatCNN models 1610 for all cameras 114 are processed by a single WhenCNN model 1612 for a pre-determined window of time. In the example of a shopping store, the WhenCNN 1612 performs time series analysis for both hands of subjects to identify whether each subject took a store inventory item from a shelf or put a store inventory item on a shelf. A stream of put and take events (also referred to as region proposals-based inventory events) is generated by the WhenCNN 1612 and is labeled as events stream B in FIG. 16B. The put and take events from the events stream are used to update the log data structures of subjects (also referred to as shopping cart data structures including a list of inventory items). A log data structure 1620 is created per subject to keep a record of the inventory items in a shopping cart (or basket) associated with the subject. The log data structures per shelf and per store can be generated to indicate items on shelves and in a store. The system can include an inventory database to store the log data structures of subjects, shelves and stores.

Video Processes and Scene Process to Classify Region Proposals

In one embodiment of the system, data from a so called "scene process" and multiple "video processes" are given as input to the WhatCNN model 1610 to generate hand image classifications. Note that the output of each video process is given to a separate WhatCNN model. The output from the scene process is a joints dictionary. In this dictionary, keys are unique joint identifiers and values are unique subject identifiers with which each joint is associated. If no subject is associated with a joint, then it is not included in the dictionary. Each video process receives a joints dictionary from the scene process and stores it into a ring buffer that maps frame numbers to the returned dictionary. Using the returned key-value dictionary, the video processes select subsets of the image at each moment in time that are near hands associated with identified subjects. These portions of image frames around hand joints can be referred to as region proposals.

In the example of a shopping store, a "region proposal" is the frame image of a hand location from one or more cameras with the subject in their corresponding fields of view. A region proposal can be generated for sequences of images from all cameras in the system. It can include empty hands as well as hands carrying shopping store inventory items and items not belonging to shopping store inventory. Video processes select portions of image frames containing hand joints per moment in time. Similar slices of foreground masks are generated. The above (image portions of hand joints and foreground masks) are concatenated with the joints dictionary (indicating subjects to whom respective hand joints belong) to produce a multi-dimensional array. This output from video processes is given as input to the WhatCNN model.

The classification results of the WhatCNN model can be stored in the region proposal data structures. All regions for a moment in time are then given back as input to the scene process. The scene process stores the results in a key-value dictionary, where the key is a subject identifier and the value is a key-value dictionary, where the key is a camera identifier and the value is a region's logits. This aggregated data structure is then stored in a ring buffer that maps frame numbers to the aggregated structure for each moment in time.

Region proposal data structures for a period of time e.g., for one second, are given as input to the scene process. In one embodiment, in which cameras are taking images at the rate of 30 frames per second, the input includes 30 time periods and corresponding region proposals. The system includes logic (also referred to as a scene process) that reduces the 30 region proposals (per hand) to a single integer representing the inventory item SKU. The output of the scene process is a key-value dictionary in which the key is a subject identifier and the value is the SKU integer.

The WhenCNN model 1612 performs a time series analysis to determine the evolution of this dictionary over time. This results in the identification of items taken from shelves and put on shelves in the shopping store. The output of the WhenCNN model is a key-value dictionary in which the key is the subject identifier and the value is logits produced by the WhenCNN. In one embodiment, a set of heuristics can be used to determine the shopping cart data structure 1620 per subject. The heuristics are applied to the output of the WhenCNN, joint locations of subjects indicated by their respective joints data structures, and planograms. The heuristics can also include the planograms that are pre-computed maps of inventory items on shelves. The heuristics can determine, for each take or put, whether the inventory item is put on a shelf or taken from a shelf, whether the inventory item is put in a shopping cart (or a basket) or taken from the shopping cart (or the basket) or whether the inventory item is close to the identified subject's body.

We now refer back to FIG. 16A to present the details of the first image processors 1604 for location-based put and take detection. The first image processors can be referred to as the first image processing pipeline. It can include a proximity event detector 1614 that receives information about inventory caches linked to subjects identified by the joints data structures 460. The proximity event detector includes the logic to process positions of hand joints (left and right) of subjects, or other joints corresponding to inventory caches, to detect when a subject's position is closer to another subject than a pre-defined threshold such as 10 cm. Other values of the threshold less than or greater than 10 cm can be used. The distance between the subjects is calculated using the positions of their hands (left and right). If one or both hands of a subject are occluded, the proximity event detector can use the positions of other joints of the subjects such as an elbow joint, or shoulder joint, etc. The above positions calculation logic can be applied per hand per subject in all image frames in the sequence of image frames per camera to detect proximity events. In other embodiments, the system can apply the distance calculation logic after every 3 frames, 5 frames or 10 frames in the sequence of frames. The system can use other frame intervals or time intervals to calculate the distance between subjects or the distance between subjects and shelves.

If a proximity event is detected by the proximity event detector 1614, the event type classifier 1616 processes the output from the WhatCNN 1610 to classify the event as one of a take event, a put event, a touch event, or a transfer or exchange event. The event type classifier receives the holding probability for the hand joints of subjects identified in the proximity event. The holding probability indicates a confidence score indicating whether the subject is holding an item or not. A large positive value indicates that the WhatCNN model has a high level of confidence that the subject is holding an item. A large negative value indicates that the model is confident that the subject is not holding any item. A close to zero value of the holding probability indicates that the WhatCNN model is not confident in predicting whether the subject is holding an item or not.

Referring back to FIG. 16A, the event type classifier 1616 can take the holding probability values over N frames before and after the proximity event as input to detect whether the event detected is a take event, a put event, a touch event, or a transfer or exchange event. If a take event is detected, the system can use the average item class probability from the WhatCNN over N frames after the proximity event to determine the item associated with the proximity event. The technology disclosed can include logic to detect the hand-off or exchange of an item from the source subject to the sink subject. The sink subject may also have taken the detected item from a shelf or another inventory location. This item can then be added to the log data structure of the sink subject.

The exchange or transfer of an item between two shoppers (or subjects) includes two events: a take event and a put event. For the put event, the system can take the average item class probability from the WhatCNN over N frames before the proximity event to determine the item associated with the proximity event. The item detected is handed-off from the source subject to the sink subject. The source subject may also have put the item on a shelf or another inventory location. The detected item can then be removed from the log data structure of the source subject. The system detects a take event for the sink subject and adds the item to the subject's log data structure. A touch event does not result in any changes to the log data structures of the source and sink in the proximity event.

Methods to Detect Proximity events

We present examples of methods to detect proximity events. One example is based on heuristics using data about the locations of joints such as hand joints, and other examples use machine learning models that process data about locations of joints. Combinations of heuristics and machine learning models can used in some embodiments.

Method 1: Using Heuristics to DetectProximity events

The system detects the positions of both hands of shoppers (or subjects) per frame per camera in the area of real space. Other joints or other inventory caches which move over time and are linked to shoppers can be used. The system calculates the distances of the left hand and right hand of each shopper to the left hands and right hands of other shoppers in the area of real space. In one embodiment, the system calculates the distances between hands of shoppers per portion of the area of real space, for example in each aisle of the shopping store. The system also calculates the distances of the left hand and right hand of each shopper per frame per camera to the nearest shelf in the inventory display structure. The shelves can be represented by a plane in a 3D coordinate system or by a 3D mesh. The system analyzes the time series of hand distances over time by processing sequences of image frames per camera.

The system selects a hand (left or right) per subject per frame that has a minimum distance (of the two hands) to the hand (left or right) of another shopper or to a shelf (i.e. fixed inventory cache). The system also determines if the hand is "in the shelf". The hand is considered "in the shelf" if the (signed) distance between the hand and the shelf is below a threshold. A negative distance between the hand and shelf indicates that the hand has gone past the plane of the shelf. If the hand is in the shelf for more than a pre-defined number of frames (such as M frames), then the system detects a proximity event when the hand moves out of the shelf. The system determines that the hand has moved out of the shelf when the distance between the hand and the shelf increases above a threshold distance. The system assigns a timestamp to the proximity event which can be a midpoint between the entrance time of the hand in the shelf and the exit time of the hand from the shelf. The hand associated with the proximity event is the hand (left or right) that has the minimum distance to the shelf at the time of the proximity event. Note that the entrance time can be the timestamp of the frame in which the distance between the shelf and the hand falls below the threshold as mentioned above. The exit time can be the timestamp of the frame in which the distance between the shelf and the hand increases above the threshold.

Method 2: Applying a Decision Tree Model to Detect Proximity Events

The second method to detect proximity events uses a decision tree model that uses heuristics and/or machine learning. The heuristics-based method to detect the proximity event might not detect proximity events when one or both hands of the subjects are occluded in image frames from the sensors. This can result in missed detections of proximity events which can cause errors in updates to the log data structures of shoppers. Therefore, the system can include an additional method to detect proximity events for robust event detections. If the system cannot detect one or both hands of an identified subject in an image frame, the system can use (left or right) elbow joint positions instead. The system can apply the same logic as described above to detect the distance of the elbow joint to a shelf or a (left or right) hand of another subject to detect a proximity event, if the distance falls below a threshold distance. If the elbow of the subject is occluded as well, then the system can use a shoulder joint to detect a proximity event.

Shopping stores can use different types of shelves having different properties, e.g., depth of shelf, height of shelf, and space between shelves, etc. The distribution of occlusions of subjects (or portions of subjects) induced by shelves at different camera angles is different, and we can train one or more decision tree models using labeled data. The labeled data can include a corpus of example image data. We can train a decision tree that takes in a sequence of distances, with some missing data to simulate occlusions, of shelves to joints over a period of time. The decision tree outputs whether an event happened in the time range or not. In the case of a proximity event prediction, the decision tree also predicts the time of the proximity event (relative to the initial frame).

The inputs to the decision tree can be median distances of three-dimensional keypoints (3D keypoints) to shelves. A 3D keypoint can represent a three-dimensional position in the area of real space. The three-dimensional position can be a position of a joint in the area of real space. The outputs from the decision tree model are event classifications, i.e., event or no event.

Method 3: Applying a Random Forest Model to Detect Proximity Events

The third method for detecting proximity events uses an ensemble of decision trees. In one embodiment, we can use the trained decision trees from the method 2 above to create the ensemble random forest. A random forest classifier (also referred to as a random decision forest) is an ensemble machine learning technique. Ensembled techniques or algorithms combine more than one technique of the same or different kind for classifying objects. The random forest classifier consists of multiple decision trees that operate as an ensemble. Each individual decision tree in a random forest acts as base classifier and outputs a class prediction. The class with the most votes becomes the random forest model's prediction. The fundamental concept behind random forests is that a large number of relatively uncorrelated models (decision trees) operating as a committee will outperform any of the individual constituent models.

The technology disclosed can generate separate event streams in parallel for the same inventory events. For example, as shown in FIG. 16A, the first image processors generate an event stream A of location-based put and take events. As described above, the first image processors can also detect touch events. As touch events do not result in a put or take, the system does not update the log data structures of sources and sinks when it detects a touch event. The event stream A can include location-based put and take events and can include the item identifier associated with each event. The location-based events in the event stream A can also include the subject identifiers of the source subjects or the sink subjects and the time and location of the events in the area of real space. In one embodiment, a location-based event can also include the shelf identifier of the source shelf or the sink shelf.

The second image processors produce a second event stream B including put and take events based on hand-image processing of the WhatCNN and time series analysis of the output of the WhatCNN by the WhenCNN. The region proposals-based put and take events in the event stream B can include item identifiers, the subjects or shelves associated with the events, and the time and location of the events in the real space. The events in both the event stream A and event stream B can include confidence scores identifying the confidence of the classifier.

The technology disclosed includes event fusion logic 1618 to combine events from event stream A and event stream B to increase the robustness of event predictions in the area of real space. In one embodiment, the event fusion logic determines, for each event in event stream A, if there is a matching event in event stream B. The events are matched if both events are of the same event type (put, take), if the event in event stream B has not been already matched to an event in event stream A, and if the event in event stream B is identified in a frame within a threshold number of frames preceding or following the image frame in which the proximity event is detected. As described above, the cameras 114 can be synchronized in time with each other, so that images are captured at the same time, or close in time, and at the same image capture rate. Images captured in all the cameras covering an area of real space at the same time, or close in time, are synchronized in the sense that the synchronized images can be identified in the processing engines as representing different views at a moment in time of subjects having fixed positions in the real space Therefore, if an event is detected in a frame x in event stream A, the matching logic considers events in frame x±N, where the value of N can be set as 1, 3, 5 or more. If a matching event is found in event stream B, the technology disclosed uses a weighted combination of event predictions to generate an item put or take prediction. For example, in one embodiment, the technology disclosed can assign 50 percent weight to events of stream A and 50 percent weight to matching events from stream B and use the resulting output to update the log data structures 1020 of source and sinks. In another embodiment, the technology disclosed can assign more weight to events from one of the streams when combining the events to predict puts and takes of items.

If the event fusion logic cannot find a matching event in event stream B for an event in event stream A, the technology disclosed can wait for a threshold number of frames to pass. For example, if the threshold is set as 5 frames, the system can wait until five frames following the frame in which the proximity event is detected are processed by the second image processors. If a matching event is not found after the threshold number of frames, the system can use the item put or take prediction from the location-based event to update the log data structure of the source and the sink. The technology disclosed can apply the same matching logic for events in the event stream B. Thus, for an event in the event stream B, if there is no matching event in the event stream A, the system can use the item put or take detection from the region proposals-based prediction to update the log data structures 1620 of the source and sink subjects. Therefore, the technology disclosed can produce robust event detections even when one of the first or the second image processors cannot predict a put or a take event or when one technique predicts a put or a take event with low confidence.

Location-Based Events and Semantic Diffing-Based Events

We now present the third image processors 1622 (also referred to as the third image processing pipeline) and the logic to combine the item put and take predictions from this technique to item put and take predictions from the first image processors 1604. Note that item put and take predictions from third image processors can be combined with item put and take predictions from second image processors 1606 in a similar manner. FIG. 16B is a high-level architecture of pipelines of neural networks processing image frames received from the cameras 114 to generate shopping cart data structures for subjects in the real space. The system described here includes per camera image recognition engines as described above for identifying and tracking multi-joint subjects.

The processing pipelines run in parallel per camera, moving images from respective cameras to image recognition engines 112a-112n via circular buffers 1602. We have described the details of the first image processors 1004 with reference to FIG. 16A. The output from the first image processors is an events stream A. The technology disclosed includes event fusion logic 1618 to combine the events in the events stream A to matching events in an events stream C which is output from the third image processors.

A "semantic diffing" subsystem (also referred to as the third image processors 1622) includes background image recognition engines, receiving corresponding sequences of images from the plurality of cameras and recognizing semantically significant differences in the background (i.e. inventory display structures like shelves) as they relate to puts and takes of inventory items, for example, over time in the images from each camera. The third image processors receive joint data structures 460 from the joints CNNs 112a-112n and image frames from the cameras 114 as input. The third image processors mask the identified subjects in the foreground to generate masked images. The masked images are generated by replacing bounding boxes that correspond with foreground subjects with background image data. Following this, the background image recognition engines process the masked images to identify and classify background changes represented in the images in the corresponding sequences of images. In one embodiment, the background image recognition engines comprise convolutional neural networks.

The third image processors process identified background changes to predict takes of inventory items by identified subjects and puts of inventory items on inventory display structures by identified subjects. The set of detections of puts and takes from the semantic diffing system are also referred to as background detections of puts and takes of inventory items. In the example of a shopping store, these detections can identify inventory items taken from the shelves or put on the shelves by customers or employees of the store. The semantic diffing subsystem includes the logic to associate identified background changes with identified subjects. We now present the details of the components of the semantic diffing subsystem or third image processors 1622 as shown inside the broken line on the right side of FIG. 16B.

The system comprises the plurality of cameras 114 producing respective sequences of images of corresponding fields of view in the real space. The field of view of each camera overlaps with the field of view of at least one other camera in the plurality of cameras as described above. In one embodiment, the sequences of image frames corresponding to the images produced by the plurality of cameras 114 are stored in a circular buffer 1602 (also referred to as a ring buffer) per camera 114. Each image frame has a timestamp, an identity of the camera (abbreviated as "camera_id"), and a frame identity (abbreviated as "frame_id") along with the image data. Circular buffers 1602 store a set of consecutively timestamped image frames from respective cameras 114. In one embodiment, the cameras 114 are configured to generate synchronized sequences of images.

The first image processors 1604 include the Joints CNN 112a-112n, receiving corresponding sequences of images from the plurality of cameras 114 (with or without image resolution reduction). The technology includes subject tracking engines to process images to identify subjects represented in the images in the corresponding sequences of images. In one embodiment, the subject tracking engines can include convolutional neural networks (CNNs) referred to as joints CNN 112a-112n. The outputs of the joints CNNs 112a-112n corresponding to cameras with overlapping fields of view are combined to map the locations of joints from the 2D image coordinates of each camera to the 3D coordinates of real space. The joints data structures 460 per subject (j), where j equals 1 to x, identify locations of joints of a subject (j) in the real space and in 2D space for each image. Some details of the subject data structure 1200 are presented in FIG. 12.

A background image store 1628, in the semantic diffing subsystem or third image processors 1622, stores masked images (also referred to as background images in which foreground subjects have been removed by masking) for corresponding sequences of images from the cameras 114. The background image store 1628 is also referred to as a background buffer. In one embodiment, the size of the masked images is the same as the size of the image frames in the circular buffer 1602. In one embodiment, a masked image is stored in the background image store 1628 corresponding to each image frame in the sequences of image frames per camera.

The semantic diffing subsystem 1622 (or the second image processors) includes a mask generator 1624 producing masks of foreground subjects represented in the images in the corresponding sequences of images from a camera. In one embodiment, one mask generator processes sequences of images per camera. In the example of the shopping store, the foreground subjects are customers or employees of the store in front of the background shelves containing items for sale.

In one embodiment, the joint data structures 460 per subject and image frames from the circular buffer 1602 are given as input to the mask generator 1624. The joint data structures identify locations of foreground subjects in each image frame. The mask generator 1624 generates a bounding box per foreground subject identified in the image frame. In such an embodiment, the mask generator 1624 uses the values of the x and y coordinates of joint locations in the 2D image frame to determine the four boundaries of the bounding box. A minimum value of x (from all x values of joints for a subject) defines the left vertical boundary of the bounding box for the subject. A minimum value of y (from ally values of joints for a subject) defines the bottom horizontal boundary of the bounding box. Likewise, the maximum values of x and y coordinates identify the right vertical and top horizontal boundaries of the bounding box. In a second embodiment, the mask generator 1624 produces bounding boxes for foreground subjects using a convolutional neural network-based person detection and localization algorithm. In such an embodiment, the mask generator 1624 does not use the joint data structures 460 to generate bounding boxes for foreground subjects.

The semantic diffing subsystem (or the third image processors 1622) includes a mask logic to process images in the sequences of images to replace foreground image data representing the identified subjects with background image data from the background images for the corresponding sequences of images to provide the masked images, resulting in a new background image for processing. As the circular buffer receives image frames from the cameras 114, the mask logic processes images in the sequences of images to replace foreground image data defined by the image masks with background image data. The background image data is taken from the background images for the corresponding sequences of images to generate the corresponding masked images.

Consider the example of the shopping store. Initially at time t=0, when there are no customers in the store, a background image in the background image store 1628 is the same as its corresponding image frame in the sequences of images per camera. Now consider at time t=1, a customer moves in front of a shelf to buy an item in the shelf. The mask generator 1624 creates a bounding box of the customer and sends it to a mask logic component 1626. The mask logic component 1626 replaces the pixels in the image frame at t=1 inside the bounding box with corresponding pixels in the background image frame at t=0. This results in a masked image at t=1 corresponding to the image frame at t=1 in the circular buffer 1602. The masked image does not include pixels for the foreground subject (or customer) which are now replaced by pixels from the background image frame at t=0. The masked image at t=1 is stored in the background image store 1628 and acts as a background image for the next image frame at t=2 in the sequence of images from the corresponding camera.

In one embodiment, the mask logic component 1626 combines, such as by averaging or summing by pixel, sets of N masked images in the sequences of images to generate sequences of factored images for each camera. In such an embodiment, the second image processors identify and classify background changes by processing the sequence of factored images. A factored image can be generated, for example, by taking an average value for pixels in the N masked images in the sequence of masked images per camera. In one embodiment, the value of N is equal to the frame rate of the cameras 114, for example if the frame rate is 30 FPS (frames per second), the value of N is 30. In such an embodiment, the masked images for a time period of one second are combined to generate a factored image. Taking the average pixel values minimizes the pixel fluctuations due to sensor noise and luminosity changes in the area of real space.

The third image processors identify and classify background changes by processing the sequences of factored images. A factored image in the sequences of factored images is compared with the preceding factored image for the same camera by a bit mask calculator 1632. Pairs of factored images 1630 are given as input to the bit mask calculator 1632 to generate a bit mask identifying changes in corresponding pixels of the two factored images. The bit mask has 1s at the pixel locations where the difference between the corresponding pixels' (current and previous factored image) RGB (red, green and blue channels) values is greater than a "difference threshold". The value of the difference threshold is adjustable. In one embodiment, the value of the difference threshold is set at 0.1.

The bit mask and the pair of factored images (current and previous) from the sequences of factored images per camera are given as input to background image recognition engines. In one embodiment, the background image recognition engines comprise convolutional neural networks and are referred to as ChangeCNN 1634a-1634n. A single ChangeCNN processes sequences of factored images per camera. In another embodiment, the masked images from corresponding sequences of images are not combined. The bit mask is calculated from the pairs of masked images. In this embodiment, the pairs of masked images and the bit mask are then given as input to the ChangeCNN.

The input to a ChangeCNN model in this example consists of seven (7) channels including three image channels (red, green and blue) per factored image and one channel for the bit mask. The ChangeCNN comprises multiple convolutional layers and one or more fully connected (FC) layers. In one embodiment, the ChangeCNN comprises the same number of convolutional and FC layers as the joints CNN 112a-112n as illustrated in FIG. 4A.

The background image recognition engines (ChangeCNN 1634a-1634n) identify and classify changes in the factored images and produce change data structures for the corresponding sequences of images. The change data structures include coordinates in the masked images of identified background changes, identifiers of an inventory item subject of the identified background changes and classifications of the identified background changes. The classifications of the identified background changes in the change data structures classify whether the identified inventory item has been added or removed relative to the background image.

As multiple items can be taken or put on the shelf simultaneously by one or more subjects, the ChangeCNN generates a number "B" overlapping bounding box predictions per output location. A bounding box prediction corresponds to a change in the factored image. Consider the shopping store has a number "C" unique inventory items, each identified by a unique SKU. The ChangeCNN predicts the SKU of the inventory item subject of the change. Finally, the ChangeCNN identifies the change (or inventory event type) for every location (pixel) in the output indicating whether the item identified is taken from the shelf or put on the shelf. The above three parts of the output from the ChangeCNN are described by an expression "5*B+C+1". Each bounding box "B" prediction comprises five (5) numbers, therefore "B" is multiplied by 5. These five numbers represent the "x" and "y" coordinates of the center of the bounding box, and the width and height of the bounding box. The fifth number represents the ChangeCNN model's confidence score for the prediction of the bounding box. "B" is a hyperparameter that can be adjusted to improve the performance of the ChangeCNN model. In one embodiment, the value of "B" equals 4. Consider that the width and height (in pixels) of the output from the ChangeCNN are represented by W and H, respectively. The output of the ChangeCNN is then expressed as "W*H*(5*B+C+1)". The bounding box output model is based on an object detection system proposed by Redmon and Farhadi in their paper, "YOLO9000: Better, Faster, Stronger" published on Dec. 25, 2016. The paper is available at <arxiv.org/pdf/1612.08242.pdf>.

The outputs of the ChangeCNN 1634a-1634n corresponding to sequences of images from cameras with overlapping fields of view are combined by a coordination logic component 1636. The coordination logic component processes change data structures from sets of cameras having overlapping fields of view to locate the identified background changes in the real space. The coordination logic component 1636 selects bounding boxes representing the inventory items having the same SKU and the same inventory event type (take or put) from multiple cameras with overlapping fields of view. The selected bounding boxes are then triangulated in the 3D real space using triangulation techniques described above to identify the location of the inventory item in the 3D real space. Locations of shelves in the real space are compared with the triangulated locations of the inventory items in the 3D real space. False positive predictions are discarded. For example, if the triangulated location of a bounding box does not map to a location of a shelf in the real space, the output is discarded. Triangulated locations of bounding boxes in the 3D real space that map to a shelf are considered true predictions of inventory events.

In one embodiment, the classifications of identified background changes in the change data structures produced by the second image processors classify whether the identified inventory item has been added or removed relative to the background image. In another embodiment, the classifications of identified background changes in the change data structures indicate whether the identified inventory item has been added or removed relative to the background image and the system includes logic to associate background changes with identified subjects. The system makes detections of takes of inventory items by the identified subjects and of puts of inventory items on inventory display structures by the identified subjects.

A log generator component can implement the logic to associate changes identified by true predictions of changes with identified subjects near the locations of the changes. In an embodiment utilizing the joints identification engine to identify subjects, the log generator can determine the positions of hand joints of subjects in the 3D real space using the joint data structures 460. A subject whose hand joint location is within a threshold distance to the location of a change at the time of the change is identified. The log generator associates the change with the identified subject.

In one embodiment, as described above, N masked images are combined to generate factored images which are then given as input to the ChangeCNN. Consider that N equals the frame rate (frames per second) of the cameras 114. Thus, in such an embodiment, the positions of the hands of subjects during a one second time period are compared with the locations of the changes to associate the changes with identified subjects. If more than one subject's hand joint locations are within the threshold distance to a location of a change, then association of the change with a subject is deferred to the output of the first image processors or second image processors.

In one embodiment, the system can store masks and unmodified images, and conditioned on an elsewhere computed region & time of interest, process the masks to determine the latest time before and earliest time after the time of interest in which the region is not occluded by a person. The system can then take the images from those two times, crop to the region of interest, and classify the background changes between those two crops. The main difference is that in this embodiment, the system is not doing image processing to generate these background images, and the change detection model is only run on specific regions of interest, conditioned on times when the system determines that a shopper may have interacted with a shelf. In such an embodiment, the processing can stop when a shopper is positioned in front of the shelf. The processing can start when the shopper moves away and the shelf or a portion of shelf is not occluded by the shopper.

The technology disclosed can combine the events in an events stream C from the semantic diffing model with events in the events stream A from the location-based event detection model. The location-based put and take events are matched to put and take events from the semantic diffing model by the event fusion logic component 1618. As described above, the semantic diffing events (or diff events) classify items put on or taken from shelves based on background image processing. In one embodiment, the diff events can be combined with existing shelf maps from the maps of shelves including item information or planograms to determine the likely items associated with pixel changes represented by diff events. The diff events may not be associated with a subject at the time of detection of the event and may not result in the update of the log data structure of any source subject or sink subject. The technology disclosed includes logic to match the diff events that may have been associated with a subject or not associated with a subject with a location-based put and take event from events stream A and a region proposals-based put and take event from events stream B.

Semantic diffing events are localized to an area in the 2D image plane in image frames from the cameras 114 and have a start time and end time associated with each of them. The event fusion logic matches the semantic diffing events from events stream C to events in events stream A and events stream B in between the start and end times of the semantic diffing events. The location-based put and take events and region proposals-based put and take events have 3D positions associated with them based on the hand joint positions in the area of real space. The technology disclosed includes logic to project the 3D positions of the location-based put and take events and region proposal-based put and take events to 2D image planes and compute the overlap with the semantic diffing-based events in the 2D image planes. The following three scenarios can result based on how many predicted events from events streams A and B overlap with a semantic diffing event (also referred to as a diff event).

(1) If no events from events streams A and B overlap with a diff event in the time range of the diff event, then in this case, the technology disclosed can associate the diff event with the closest person to the shelf in the time range of the diff event.

(2) If one event from events stream A or events stream B overlaps with the diff event in the time range of the diff event, then in this case, the system combines the matched event to the diff event by taking a weighted combination of the item predictions from the events stream (A or B) which predicted the event and the item prediction from diff event.

(3) If two or more events from events streams A or B overlap with the diff event in the time range of the diff event, the system selects one of the matched events from events streams A or B. The event that has the closest item classification probability value to the item classification probability value in the diff event can be selected. The system can then take a weighted average of the item classification from the diff event and the item classification from the selected event from events stream A or events stream B.

Figure 16C:
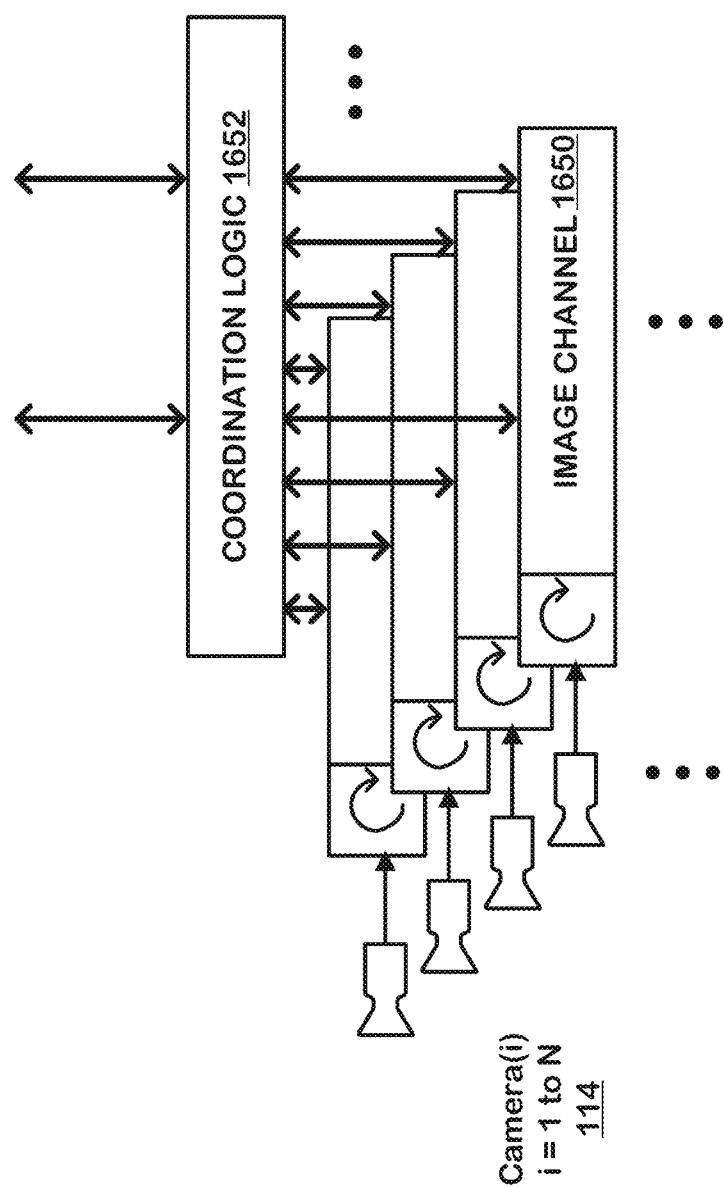
FIG. 16C shows multiple image channels from multiple cameras and coordination logic for the subjects and their respective shopping cart data structures.

FIG. 16C shows the coordination logic module 1652 combining the results of multiple WhatCNN models and giving this as input to a single WhenCNN model. As mentioned above, two or more cameras with overlapping fields of view capture images of subjects in the real space. Joints of a single subject can appear in image frames of multiple cameras in the respective image channel 1650. A separate WhatCNN model identifies SKUs of inventory items in the hands (represented by hand joints) of subjects. The coordination logic module 1652 combines the outputs of WhatCNN models into a single consolidated input for the WhenCNN model. The WhenCNN model operates on the consolidated input to generate the shopping cart of the subject.

An example inventory data structure 1620 (also referred to as a log data structure) is shown in FIG. 16D. This inventory data structure stores the inventory of a subject, a shelf or a store as a key-value dictionary. The key is the unique identifier of a subject, a shelf or a store and the value is another key value-value dictionary where the key is the item identifier such as a stock keeping unit (SKU) and the value is a number identifying the quantity of the item along with the "frame_id" of the image frame that resulted in the inventory event prediction. The frame identifier ("frame_id") can be used to identify the image frame which resulted in the identification of an inventory event resulting in the association of the inventory item with the subject, the shelf, or the store. In other embodiments, a "camera_id" identifying the source camera can also be stored in combination with the frame_id in the inventory data structure 1620. In one embodiment, the "frame_id" is the subject identifier because the frame has the subject's hand in the bounding box. In other embodiments, other types of identifiers can be used to identify subjects such as a "subject_id" which explicitly identifies a subject in the area of real space.

When a put event is detected, the item identified by the SKU in the inventory event (such as a location-based event, region proposals-based event, or semantic diffing event) is removed from the log data structure of the source subject. Similarly, when a take event is detected, the item identified by the SKU in the inventory event is added to the log data structure of the sink subject. In an item hand-off or exchange between subjects, the log data structures of both subjects in the hand-off are updated to reflect the item exchange from the source subject to the sink subject. Similar logic can be applied when subjects take items from shelves or put items on the shelves. Log data structures of shelves can also be updated to reflect the put and take of items.

The shelf inventory data structure can be consolidated with the subject's log data structure, resulting in the reduction of shelf inventory to reflect the quantity of items taken by the customer from the shelf. If the items were put on the shelf by a shopper or an employee stocking items on the shelf, the items get added to the respective inventory locations' inventory data structures. Over a period of time, this processing results in updates to the shelf inventory data structures for all inventory locations in the shopping store. Inventory data structures of inventory locations in the area of real space are consolidated to update the inventory data structure of the area of real space indicating the total number of items of each SKU in the store at that moment in time. In one embodiment, such updates are performed after each inventory event. In another embodiment, the store inventory data structures are updated periodically.

In the following process flowcharts (FIGS. 18 to 22), we present process steps for subject identification using Joints CNN, hand recognition using WhatCNN, time series analysis using WhenCNN, detection of proximity events and proximity event types (put, take, touch), detection of an item in a proximity event, and fusion of multiple inventory events streams.

Joints CNN—Identification and Update of Subjects

Figure 18:
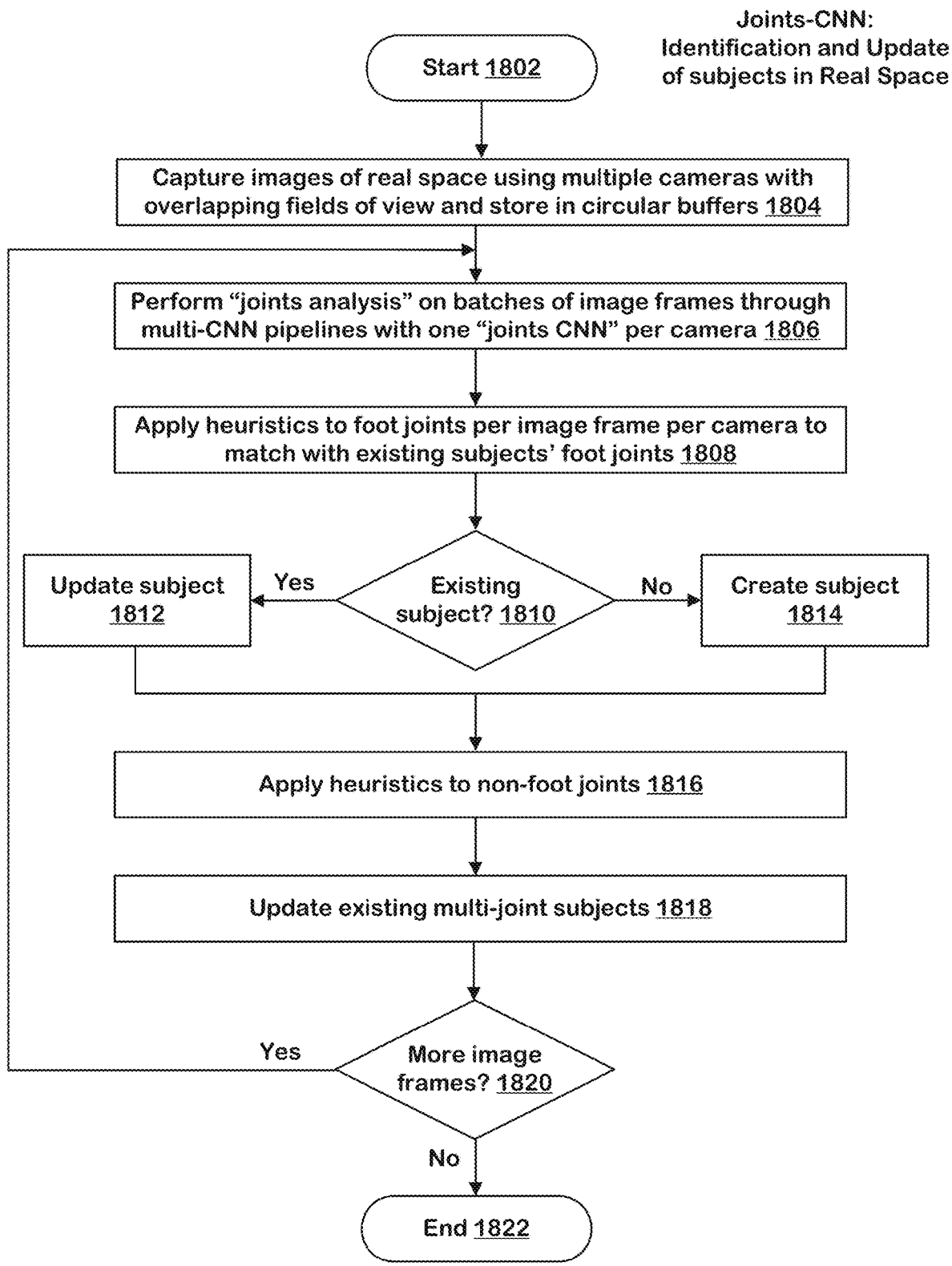
FIG. 18 is a flowchart illustrating process steps for identifying and updating subjects in the real space.

FIG. 18 is a flowchart of processing steps performed by the Joints CNN 112a-112n to identify subjects in the real space. In the example of a shopping store, the subjects are shoppers or customers moving in the store in aisles between shelves and other open spaces. The process starts at step 1802. Note that, as described above, the cameras are calibrated before the sequences of images from cameras are processed to identify subjects. Details of camera calibration are presented above. Cameras 114 with overlapping fields of view capture images of real space in which subjects are present (step 1804). In one embodiment, the cameras are configured to generate synchronized sequences of images. The sequences of images of each camera are stored in respective circular buffers 1602 per camera. A circular buffer (also referred to as a ring buffer) stores the sequences of images in a sliding window of time. In an embodiment, a circular buffer stores 110 image frames from a corresponding camera. In another embodiment, each circular buffer 1602 stores image frames for a time period of 3.5 seconds. It is understood that, in other embodiments, the number of image frames (or the time period) can be greater than or less than the example values listed above.

Joints CNNs 112a-112n receive sequences of image frames from corresponding cameras 114 as output from a circular buffer, with or without resolution reduction (step 1806). Each Joints CNN processes batches of images from a corresponding camera through multiple convolution network layers to identify joints of subjects in image frames from the corresponding camera. The architecture and processing of images by an example convolutional neural network is presented FIG. 4A. As the cameras 114 have overlapping fields of view, the joints of a subject are identified by more than one joints CNN. The two-dimensional (2D) coordinates of joints data structures 460 produced by the Joints CNN are mapped to three-dimensional (3D) coordinates of the real space to identify joints locations in the real space. Details of this mapping are presented above in which the subject tracking engine 110 translates the coordinates of the elements in the arrays of joints data structures corresponding to images in different sequences of images into candidate joints having coordinates in the real space.

The joints of a subject are organized in two categories (foot joints and non-foot joints) for grouping the joints into constellations, as discussed above. The left and right-ankle joint types in the current example, are considered foot joints for the purpose of this procedure. At step 1808, heuristics are applied to assign a candidate left foot joint and a candidate right foot joint to a set of candidate joints to create a subject. Following this, at step 1810, it is determined whether the newly identified subject already exists in the real space. If not, then a new subject is created at step 1814, otherwise, the existing subject is updated at step 1812.

Other joints from the galaxy of candidate joints can be linked to the subject to build a constellation of some or all of the joint types for the created subject. At step 1816, heuristics are applied to non-foot joints to assign those to the identified subjects. A global metric calculator can calculate the global metric value and attempt to minimize the value by checking different combinations of non-foot joints. In one embodiment, the global metric is a sum of heuristics organized in four categories as described above.

The logic to identify sets of candidate joints comprises heuristic functions based on physical relationships among the joints of subjects in the real space to identify sets of candidate joints as subjects. At step 1818, the existing subjects are updated using the corresponding non-foot joints. If there are more images for processing (step 1820), steps 1806 to 1818 are repeated, otherwise the process ends at step 1822. The first data sets are produced at the end of the process described above. The first data sets identify subjects and the locations of the identified subjects in the real space. In one embodiment, the first data sets are presented above in relation to FIGS. 16A and 16B as joints data structures 460 per subject.

WhatCNN—Classification of Hand Joints

Figure 19:
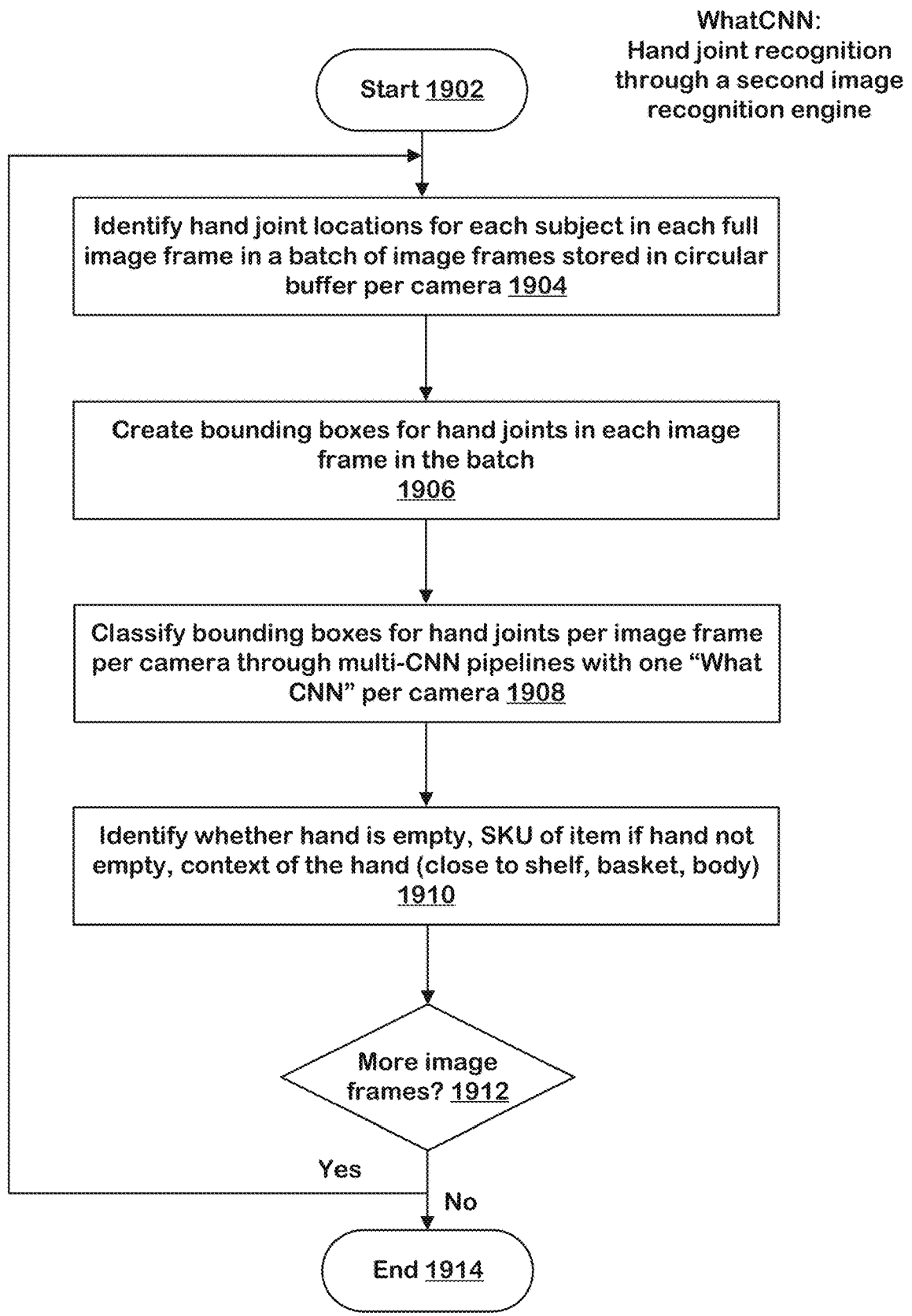
FIG. 19 is a flowchart showing process steps for processing hand joints (or moving inventory caches) of subjects to identify inventory items.

FIG. 19 is a flowchart illustrating process steps to identify inventory items in the hands of subjects (shoppers) identified in the real space. As the subjects move in aisles and opens spaces, they pickup inventory items stocked in the shelves and put items in their shopping carts or baskets. The image recognition engines identify subjects in the sets of images in the sequences of images received from the plurality of cameras. The system includes the logic to process sets of images in the sequences of images that include the identified subjects to detect takes of inventory items by identified subjects and puts of inventory items on the shelves by identified subjects.

In one embodiment, the logic to process sets of images includes, for the identified subjects, generating classifications of the images of the identified subjects. The classifications can include predicting whether an identified subject is holding an inventory item. The classifications can include a first nearness classification indicating a location of a hand of the identified subject relative to a shelf. The classifications can include a second nearness classification indicating a location of a hand of the identified subject relative to the body of the identified subject. The classifications can further include a third nearness classification indicating a location of a hand of an identified subject relative to a basket associated with the identified subject. The classification can include a fourth nearness classification of the hand that identifies a location of a hand of a subject positioned close to the hand of another subject. Finally, the classifications can include an identifier of a likely inventory item.

In another embodiment, the logic to process sets of images includes, for the identified subjects, identifying bounding boxes of data representing hands in images in the sets of images of the identified subjects. The data in the bounding boxes are processed to generate classifications of data within the bounding boxes for the identified subjects. In such an embodiment, the classifications can include predicting whether the identified subject is holding an inventory item. The classifications can include a first nearness classification indicating a location of a hand of the identified subject relative to a shelf. The classifications can include a second nearness classification indicating a location of a hand of the identified subject relative to the body of the identified subject. The classifications can include a third nearness classification indicating a location of a hand of the identified subject relative to a basket associated with an identified subject. The classification can include a fourth nearness classification of the hand that identifies a location of a hand of a subject positioned close to the hand of another subject. Finally, the classifications can include an identifier of a likely inventory item.

The process starts at step 1902. At step 1904, locations of hands (represented by hand joints) of subjects in image frames are identified. The bounding box generator 1904 identifies hand locations of subjects per frame from each camera using joint locations identified in the first data sets generated by the Joints CNNs 112a-112n. Following this, at step 1906, the bounding box generator 1608 processes the first data sets to specify bounding boxes which include images of hands of identified multi joint subjects in images in the sequences of images. Details of the bounding box generator are presented above with reference to FIG. 16A.

A second image recognition engine receives sequences of images from the plurality of cameras and processes the specified bounding boxes in the images to generate the classification of hands of the identified subjects (step 1908). In one embodiment, each of the image recognition engines used to classify the subjects based on images of hands comprises a trained convolutional neural network referred to as a WhatCNN 1610. WhatCNNs are arranged in multi-CNN pipelines as described above in relation to FIG. 16A. In one embodiment, the input to a WhatCNN is a multi-dimensional array B×W×H×C (also referred to as a B×W×H×C tensor). "B" is the batch size indicating the number of image frames in a batch of images processed by the What-CNN. "W" and "H" indicate the width and height of the bounding boxes in pixels, and "C" is the number of channels. In one embodiment, there are 30 images in a batch (B=30), so the size of the bounding boxes is 32 pixels (width) by 32 pixels (height). There can be six channels representing red, green, blue, foreground mask, forearm mask and upperarm mask, respectively. The foreground mask, forearm mask and upperarm mask are additional and optional input data sources for the WhatCNN in this example, which the CNN can include in the processing to classify information in the RGB image data. The foreground mask can be generated using a mixture of Gaussian algorithms, for example. The forearm mask can be a line between the wrist and elbow providing context produced using information in the joints data structure. Likewise, the upperarm mask can be a line between the elbow and shoulder produced using information in the joints data structure. Different values of B, W, H and C parameters can be used in other embodiments. For example, in another embodiment, the size of the bounding boxes is larger e.g., 64 pixels (width) by 64 pixels (height) or 128 pixels (width) by 128 pixels (height).

Each WhatCNN 1610 processes batches of images to generate classifications of hands of the identified subjects. The classifications can include whether the identified subject is holding an inventory item. The classifications can further include one or more classifications indicating locations of the hands relative to the shelves and relative to the subjects, relative to a shelf or a basket, and relative to a hand or another subject, usable to detect puts and takes. In this example, a first nearness classification indicates a location of a hand of the identified subject relative to a shelf. The classifications can include a second nearness classification indicating a location a hand of the identified subject relative to the body of the identified subject. A subject may hold an inventory item during shopping close to his or her body instead of placing the item in a shopping cart or a basket. The classifications can further include a third nearness classification indicating a location of a hand of the identified subject relative to a basket associated with an identified subject. A "basket" in this context can be a bag, a basket, a cart or other object used by the subject to hold the inventory items during shopping. The classifications can include a fourth nearness classification of the hand that identifies a location of a hand of a subject positioned close to the hand of another subject. Finally, the classifications can include an identifier of a likely inventory item. The final layer of the WhatCNN 1610 produces logits which are raw values of predictions. The logits are represented as floating point values and further processed, as described below, to generate a classification result. In one embodiment, the outputs of the WhatCNN model include a multi-dimensional array B×L (also referred to as a B×L tensor). "B" is the batch size, and "L=N+5" is the number of logits output per image frame. "N" is the number of SKUs representing "N" unique inventory items for sale in the shopping store.

The output "L" per image frame is a raw activation from the WhatCNN 1610. The logits "L" are processed at step 1910 to identify an inventory item and context. The first "N" logits represent the confidence that the subject is holding one of the "N" inventory items. The logits "L" include an additional five (5) logits which are explained below. The first logit represents the confidence that the image of the item in the hand of the subject is not one of the store SKU items (also referred to as a non-SKU item). The second logit indicates a confidence of whether the subject is holding an item or not. A large positive value indicates that the What-CNN model has a high level of confidence that the subject is holding an item. A large negative value indicates that the model is confident that the subject is not holding any item. A close to zero value of the second logit indicates that the WhatCNN model is not confident in predicting whether the subject is holding an item or not. The value of the holding logit is provided as input to the proximity event detector for location-based put and take detection.

The next three logits represent first, second and third nearness classifications, including a first nearness classification indicating a location of a hand of the identified subject relative to a shelf, a second nearness classification indicating a location of a hand of the identified subject relative to the body of the identified subject, and a third nearness classification indicating a location of a hand of the identified subject relative to a basket associated with an identified subject. Thus, the three logits represent the context of the hand location with one logit each indicating the confidence that the context of the hand is near to a shelf, near to a basket (or a shopping cart), or near to the body of the subject. In one embodiment, the output can include a fourth logit representing the context of the hand of a subject positioned close to a hand of another subject. In one embodiment, the What-CNN is trained using a training dataset containing hand images in the three contexts: near to a shelf, near to a basket (or a shopping cart), and near to the body of a subject. In another embodiment, the WhatCNN is trained using a training dataset containing hand images in the four contexts: near to a shelf, near to a basket (or a shopping cart), near to the body of a subject, and near to a hand of another subject. In another embodiment, a "nearness" parameter is used by the system to classify the context of the hand. In such an embodiment, the system determines the distance of a hand of the identified subject to the shelf, basket (or a shopping cart), and body of the subject to classify the context.

The output of a WhatCNN is "L" logits comprised of N SKU logits, 1 Non-SKU logit, 1 holding logit, and 3 context logits as described above. The SKU logits (first N logits) and the non-SKU logit (the first logit following the N logits) are processed by a softmax function. As described above with reference to FIG. 4A, the softmax function transforms a K-dimensional vector of arbitrary real values to a K-dimensional vector of real values in the range [0, 1] that add up to 1. A softmax function calculates the probabilities distribution of the item over N+1 items. The output values are between 0 and 1, and the sum of all the probabilities equals one. The softmax function (for multi-class classification) returns the probabilities of each class. The class that has the highest probability is the predicted class (also referred to as the target class). The value of the predicted item class is averaged over N frames before and after the proximity event to determine the item associated with the proximity event.

The holding logit is processed by a sigmoid function. The sigmoid function takes a real number value as input and produces an output value in the range of 0 to 1. The output of the sigmoid function identifies whether the hand is empty or holding an item. The three context logits are processed by a softmax function to identify the context of the hand joint location. At step 1912, it is checked whether there are more images to process. If true, steps 1904-1910 are repeated, otherwise the process ends at step 1914.

WhenCNN—Time Series Analysis to Identify Puts and Takes of Items

In one embodiment, the technology disclosed performs a time sequence analysis over the classifications of subjects to detect takes and puts by the identified subjects based on foreground image processing of the subjects. The time sequence analysis identifies gestures of the subjects and inventory items associated with the gestures represented in the sequences of images.

The outputs of WhatCNNs 1610 are given as inputs to the WhenCNN 1612 which processes these inputs to detect puts and takes of items by the identified subjects. The system includes logic, responsive to the detected takes and puts, to generate a log data structure including a list of inventory items for each identified subject. In the example of a shopping store, the log data structure is also referred to as a shopping cart data structure 1620 per subject.

Figure 20:
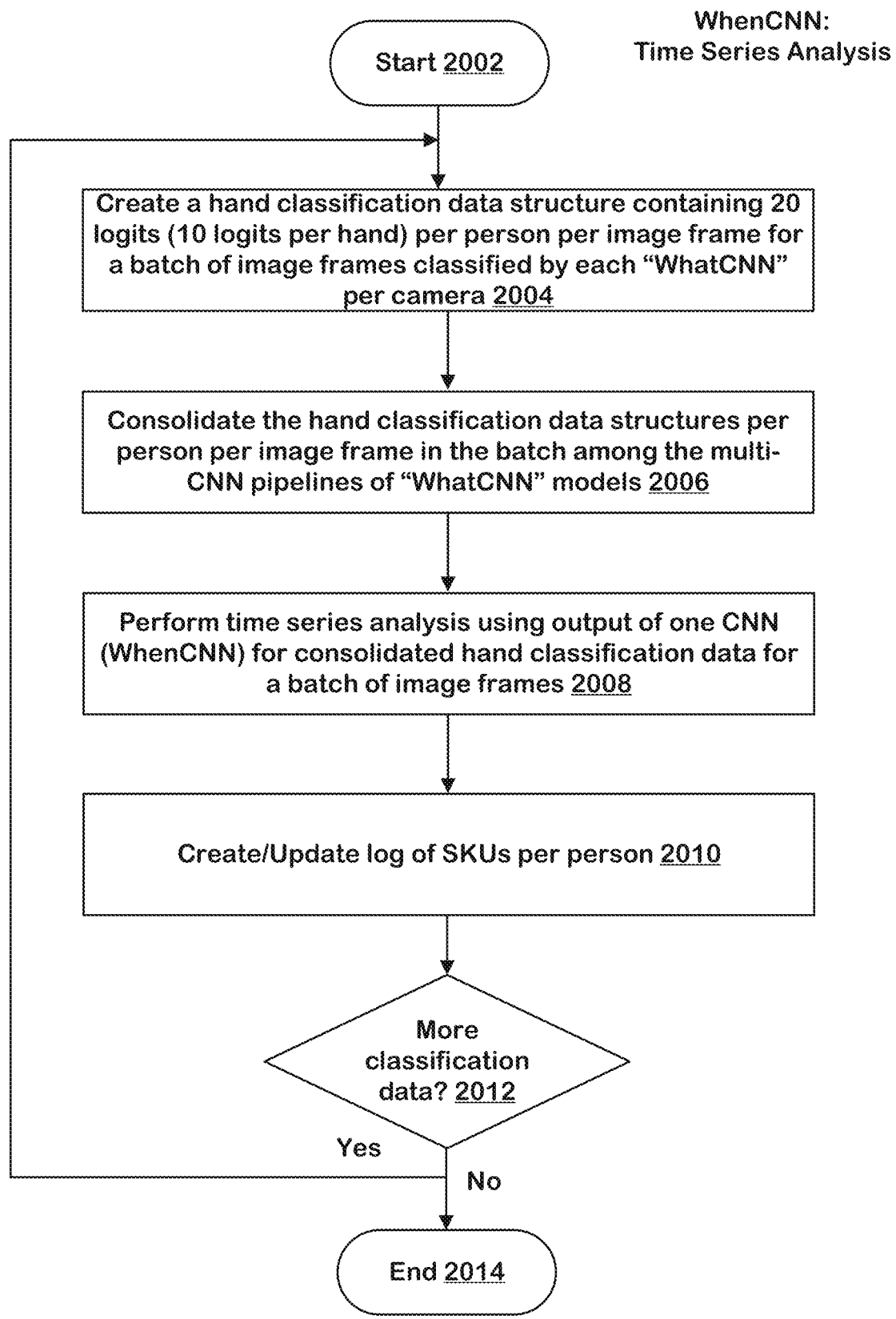
FIG. 20 is a flowchart showing process steps for a time series analysis of the inventory items per hand joint (or moving inventory cache) to create a shopping cart data structure per subject.

FIG. 20 presents a process implementing the logic to generate a shopping cart data structure per subject. The process starts at step 2002. The input to the WhenCNN 1612 is prepared at step 2004. The input to the WhenCNN is a multi-dimensional array B×C×T×Cams, where B is the batch size, C is the number of channels, T is the number of frames considered for a window of time, and Cams is the number of cameras 114. In one embodiment, the batch size "B" is 64 and the value of "T" is 110 image frames or the number of image frames in 3.5 seconds of time. It is understood that other values of batch size "B" greater than or less than 64 can be used. Similarly, the value of the parameter "T" can be set greater than or less than 110 images frames or a time period greater than or less than 3.5 seconds can be used to select the number of frames for processing.

For each subject identified per image frame, per camera, a list of 10 logits per hand joint (20 logits for both hands) is produced. The holding and context logits are part of the "L" logits generated by the WhatCNN 1610 as described above.

[
holding, #1 logit
context, #3 logits
slice dot(sku, log sku), #1 logit
slice dot(sku, log other sku), #1 logit
slice dot(sku, roll(log sku, −30)), #1 logit
slice dot(sku, roll(log sku, 30)), #1 logit
slice dot(sku, roll(log other sku, −30)), #1 logit
slice dot(sku, roll(log other sku, 30)) #1 logit
]

The above data structure is generated for each hand in an image frame and also includes data about the other hand of the same subject. For example, if data are for the left hand joint of a subject, corresponding values for the right hand are included as "other" logits. The fifth logit (item number 3 in the list above referred to as log sku) is the log of the SKU logit in the "L" logits described above. The sixth logit is the log of the SKU logit for the other hand. A "roll" function generates the same information before and after the current frame. For example, the seventh logit (referred to as roll(log sku, −30)) is the log of the SKU logit, 30 frames earlier than the current frame. The eighth logit is the log of the SKU logit for the hand, 30 frames later than the current frame. The ninth and tenth data values in the list are similar data for the other hand 30 frames earlier and 30 frames later than the current frame. A similar data structure for the other hand is also generated, resulting in a total of 20 logits per subject per image frame per camera. Therefore, the number of channels in the input to the WhenCNN is 20 (i.e. C=20 in the multi-dimensional array B×C×T×Cams), whereas "Cams" represents the number of cameras in the area of real space.

For all image frames in the batch of image frames (e.g., B=64) from each camera, similar data structures of 20 hand logits per subject, identified in the image frame, are generated. A window of time (T=3.5 seconds or 110 image frames) is used to search forward and backward image frames in the sequence of image frames for the hand joints of subjects. At step 2006, the 20 hand logits per subject per frame are consolidated from multiple WhatCNNs. In one embodiment, the batch of image frames (64) can be imagined as a smaller window of image frames placed in the middle of a larger window of the image frame 110 with additional image frames for forward and backward search on both sides. The input B×C×T×Cams to the WhenCNN 1612 is composed of 20 logits for both hands of subjects identified in batch "B" of image frames from all cameras 114 (referred to as "Cams"). The consolidated input is given to a single trained convolutional neural network referred to as the WhenCNN model 1608.

The output of the WhenCNN model comprises 3 logits, representing confidence in three possible actions of an identified subject: taking an inventory item from a shelf, putting an inventory item back on the shelf, and no action. The three output logits are processed by a softmax function to predict the action performed. The three classification logits are generated at regular intervals for each subject and the results are stored per person along with a time stamp. In one embodiment, the three logits are generated every twenty frames per subject. In such an embodiment, at an interval of every 20 image frames per camera, a window of 110 image frames is formed around the current image frame.

A time series analysis of these three logits per subject over a period of time is performed (step 2008) to identify gestures corresponding to true events and their time of occurrence. A non-maximum suppression (NMS) algorithm is used for this purpose. As one event (i.e. the put or take of an item by a subject) is detected by the WhenCNN 1612 multiple times (both from the same camera and from multiple cameras), the NMS removes superfluous events for a subject. The NMS is a rescoring technique comprising two main tasks: "matching loss" that penalizes superfluous detections and "joint processing" of neighbors to know if there is a better detection close by.

The true events of takes and puts for each subject are further processed by calculating an average of the SKU logits for 30 image frames prior to the image frame with the true event. Finally, the arguments of the maxima (abbreviated arg max or argmax) are used to determine the largest value. The inventory item classified by the argmax value is used to identify the inventory item put on or taken from the shelf. The inventory item is added to a log of SKUs (also referred to as shopping cart or basket) of respective subjects in step 2010. The process steps 2004 to 2010 are repeated, if there are more classification data (checked at step 2012). Over a period of time, this processing results in updates to the shopping cart or basket of each subject. The process ends at step 2014.

We now present process flowcharts for location-based event detection, item detection in location-based events and fusion of a location-based events stream with a region proposals-based events stream and a semantic diffing-based events stream.

Process Flowchart for Proximity event Detection

Figure 21:
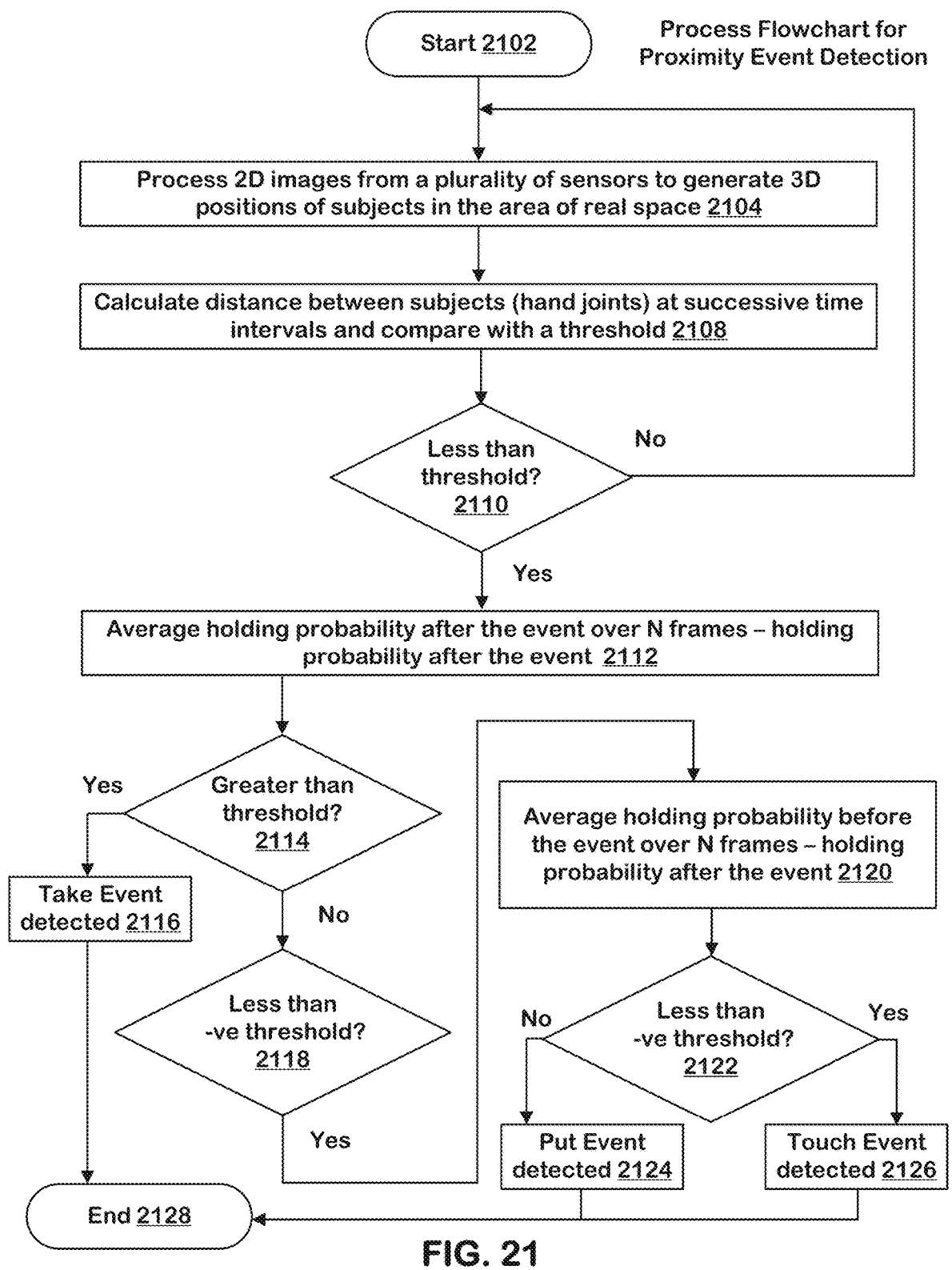
FIG. 21 is a flowchart presenting process steps for detecting proximity events.

FIG. 21 presents a flowchart of process steps for detecting location-based events in the area of real space. The process starts at a step 2102. The system processes 2D images from a plurality of sensors to generate 3D positions of subjects in the area of real space (step 2104). As described above, the system uses image frames from synchronized sensors with overlapping fields of views for 3D scene generation. In one embodiment, the system uses joints to create and track subjects in the area of real space. The system calculates distances between hand joints (both left and right hands) (step 2108) of subjects at regular time intervals and compares the distances with a threshold. If the distance between hand joints of two subjects is below a threshold (step 2110), the system continues the process steps for detecting the type of the proximity event (put, take or touch). Otherwise, the system repeats steps 2104 to 2110 for detecting proximity events.

At a step 2112, the system calculates the average holding probability over N frames after the frame in which the proximity event was detected for the subjects whose hands were positioned closer than the threshold. Note that the WhatCNN model described above outputs a holding probability per hand per subject per frame which is used in this process step. The system calculates the difference between the average holding probability over N frames after the proximity event and the holding probability in a frame following the frame in which proximity event is detected. If the result of the difference is greater than a threshold (step 2114), the system detects a take event (step 2116) for the subject in the image frame. Note that when one subject hands-off an item to another subject, the location-based event can have a take event (for the subject who takes the item) and a put event (for the subject who hands-off the item). The system processes the logic described in this flowchart for each hand joint in the proximity event, thus the system is able to detect both take and put events for the subjects in the location-based events. If at step 2114, it is determined that the difference between the average holding probability value over N frames after the event and the holding probability value in the frame following the proximity event is not greater than the threshold (step 2114), the system compares the difference to a negative threshold (step 2118). If the difference is less than the negative threshold then the proximity event can be a put event, however, it can also indicate a touch event. Therefore, the system calculates the difference between the average holding probability value over N frames before the proximity event and the holding probability value after the proximity event (step 2120). If the difference is less than a negative threshold (step 2122), the system detects a touch event (step 2126). Otherwise, the system detects a put event (step 2124). The process ends at a step 2128.

Process Flowchart for Item Detection

Figure 22:
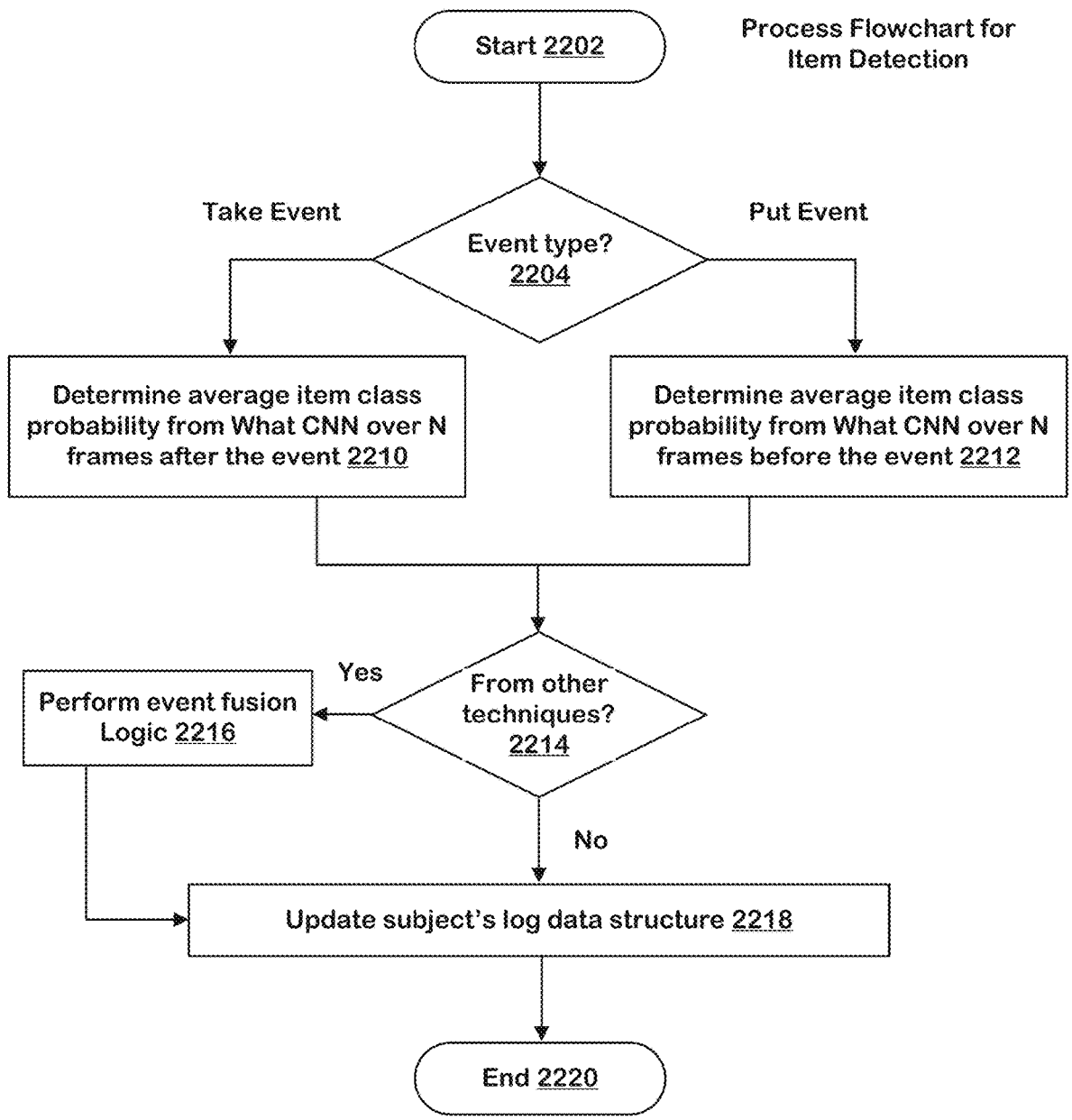
FIG. 22 is a flowchart presenting process steps for detecting an item associated with the proximity event detected in FIG. 21.

FIG. 22 presents a process flowchart for item detection in a proximity event. The process starts at a step 2202. The event type is detected at a step 2204. We have presented detailed process steps above of the event type detection in the process flowchart in FIG. 22. If a take event is detected (step 2204), the process continues at a step 2210. The system determines the average item class probability by taking an average of the item class probability values from the What-CNN over N frames after the frame in which the proximity event is detected. If a put event is detected the process continues at a step 2212 in the process flowchart. The system determines the average item class probability by taking an average of the item class probability values from the What-CNN over N frames before the frame in which the proximity event is detected.

At a step 2214, the system checks if event streams from other event detection techniques have a matching event. We have presented details of two parallel event detection techniques above: a region proposals-based event detection technique (also referred to as second image processors) and a semantic diffing-based event detection technique (also referred to as third image processors). If a matching event is detected from other event detection techniques, the system combines the two events using event fusion logic in a step 2216. As described above, the event fusion logic can include weighted combination of events from multiple event streams. If no matching event is detected from other events streams, then the system can use the item classification from the location-based event. The process continues at a step 2218 in which the subject's log data structure is updated using the item classification and the event type. The process ends at a step 2220.

Computer System

Figure 23:
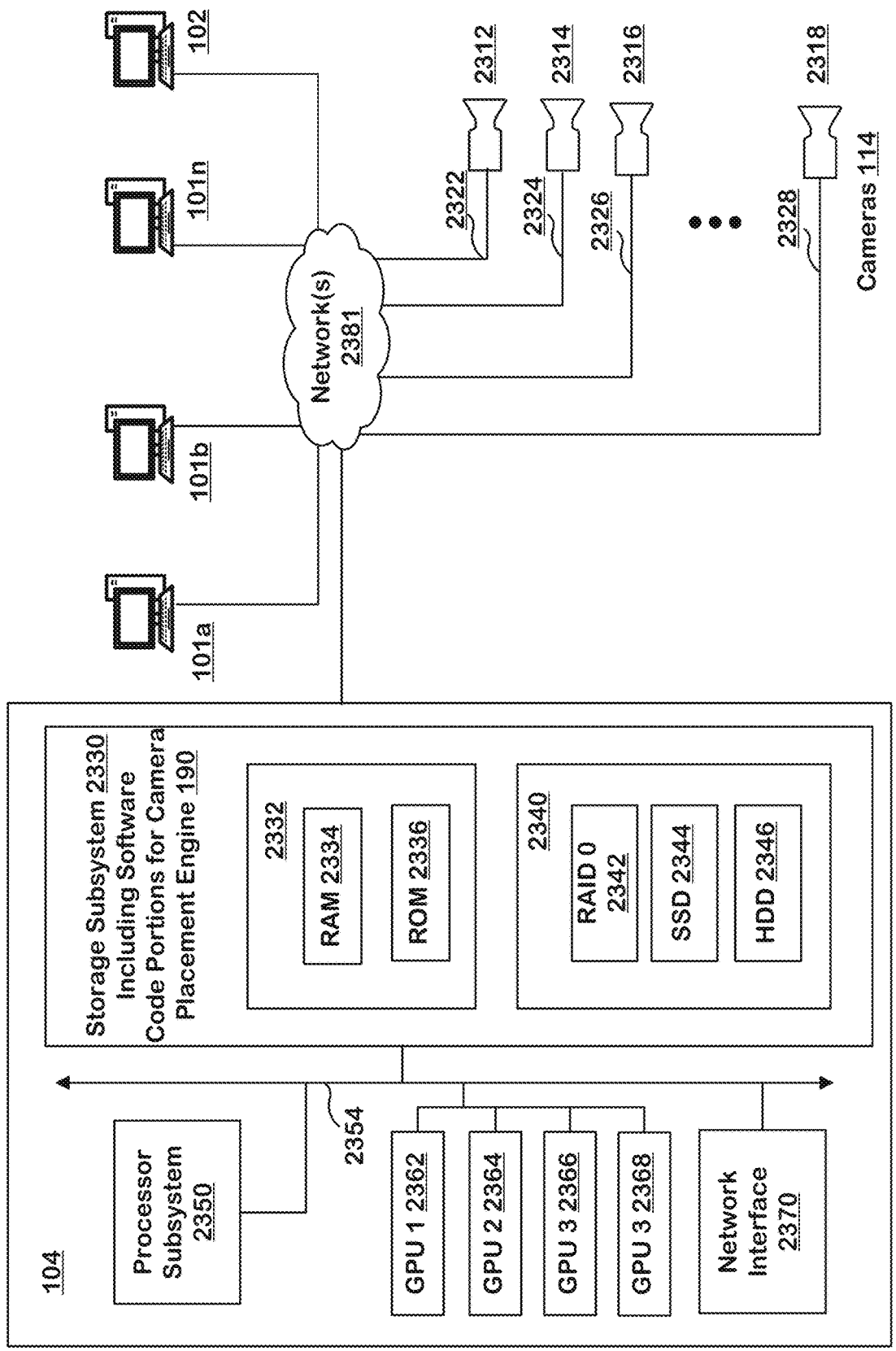
FIG. 23 is an example of a computer system architecture implementing the proximity events detection logic.

FIG. 23 presents an architecture of a network hosting image recognition engines. The system includes a plurality of network nodes 101a-101n in the illustrated embodiment. In such an embodiment, the network nodes are also referred to as processing platforms. Processing platforms 101a-101n and cameras 2312, 2314, 2316, ... 2318 are connected to the network(s) 2381.

FIG. 23 shows a plurality of cameras 2312, 2314, 2316, ... 2318 connected to the network(s). A large number of cameras can be deployed in particular systems. In one embodiment, the cameras 2312 to 2318 are connected to the network(s) 2381 using Ethernet-based connectors 2322, 2324, 2326, and 2328, respectively. In such an embodiment, the Ethernet-based connectors have a data transfer speed of 1 gigabit per second, also referred to as Gigabit Ethernet. It is understood that in other embodiments, the cameras 114 are connected to the network using other types of network connections which can have faster or slower data transfer rates than Gigabit Ethernet. Also, in alternative embodiments, a set of cameras can be connected directly to each processing platform, and the processing platforms can be coupled to a network.

The storage subsystem 2330 stores the basic programming and data constructs that provide the functionality of certain embodiments of the present invention. For example, the various modules implementing the functionality of the calibration engine may be stored in the storage subsystem 2330. The storage subsystem 2330 is an example of a computer readable memory comprising a non-transitory data storage medium, having computer instructions stored in the memory executable by a computer to perform all or any combinations of the data processing and image processing functions described herein, including logic to identify changes in the real space, to track subjects, to detect puts and takes of inventory items, and to detect the hand off of inventory items from one subject to another in an area of real space by processes as described herein. In other examples, the computer instructions can be stored in other types of memory, including portable memory, that comprise a non-transitory data storage medium or media, readable by a computer.

These software modules are generally executed by a processor subsystem 2350. The processor subsystem 2350 can include sequential instruction processors such as CPUs and GPUs, data flow instruction processors, such as FPGAs configured by instructions in the form of bit files, dedicated logic circuits supporting some or all of the functions of the processor subsystem, and combinations of one or more of these components. The processor subsystem may include cloud-based processors in some embodiments.

A host memory subsystem 2332 typically includes a number of memories including a main random access memory (RAM) 2334 for the storage of instructions and data during program execution and a read-only memory (ROM) 2336 in which fixed instructions are stored. In one embodiment, the RAM 2334 is used as a buffer for storing video streams from the cameras 114 connected to the platform 101a.

A file storage subsystem 2340 provides persistent storage for program and data files. In an example embodiment, the storage subsystem 2340 includes four 120 Gigabyte (GB) solid state disks (SSD) in a RAID 0 2342 (redundant array of independent disks) arrangement. In the example embodiment, in which a CNN is used to identify joints of subjects, the RAID 0 2342 is used to store training data. During training, the training data which is not in the RAM 2334 is read from the RAID 0 2342. Similarly, when images are being recorded for training purposes, the data which are not in the RAM 2334 are stored in the RAID 0 2342. In the example embodiment, the hard disk drive (HDD) 2346 is a 10 terabyte storage. It is slower in access speed than the RAID 0 2342 storage. The solid state disk (SSD) 2344 contains the operating system and related files for the image recognition engine 112a.

In an example configuration, three cameras 2312, 2314, and 2316, are connected to the processing platform 101a. Each camera has a dedicated graphics processing unit GPU 1 2462, GPU 2 2464, and GPU 3 2366, to process images sent by the camera. It is understood that fewer than or more than three cameras can be connected per processing platform. Accordingly, fewer or more GPUs are configured in the network node so that each camera has a dedicated GPU for processing the image frames received from the camera. The processor subsystem 2350, the storage subsystem 2330 and the GPUs 2362, 2364, and 2366 communicate using the bus subsystem 2354.

A number of peripheral devices such as a network interface 2370 sub system, user interface output devices, and user interface input devices are also connected to the bus subsystem 23 54 forming part of the processing platform 101*a*. These subsystems and devices are intentionally not shown in FIG. 23 to improve the clarity of the description. Although the bus subsystem 2354 is shown schematically as a single bus, alternative embodiments of the bus subsystem may use multiple busses.

In one embodiment, the cameras 2312 can be implemented using Chameleon3 1.3 MP Color USB3 Vision (Sony ICX445), having a resolution of 1288×964, a frame rate of 30 FPS, and at 1.3 MegaPixels per image, with a Varifocal Lens having a working distance (mm) of 300-∞, and a field of view with a ⅓" sensor of 98.2°-23.8°.

What is claimed is:

1. A computer-implemented method for determining an improved camera coverage plan including a number, a placement, and a pose of cameras that are arranged to track puts and takes of items by subjects in a three-dimensional real space, the computer-implemented method including:
   receiving an initial camera coverage plan including a three-dimensional map of a three-dimensional real space, an initial number and initial pose of a plurality of cameras and a camera model including characteristics of the cameras;
   beginning with the initial camera coverage plan received, iteratively applying a machine learning process to an objective function of number and poses of cameras, and subject to a set of constraints, to obtain from the initial camera coverage plan as received, an improved camera coverage plan using one or more of: (i) a changed number of cameras, and (ii) a changed number of camera poses, and having an improved coverage score and concurrently using a same or reduced number of cameras; and
   providing the improved camera coverage plan to an installer to arrange cameras to track puts and takes of items by subjects in the three-dimensional real space.

2. The computer-implemented method of claim 1, wherein applying a machine learning process to an objective function of number and poses of cameras, and subject to a set of constraints to obtain the improved camera coverage plan includes:
   determining a set of camera coverage maps per camera including one of a first set of occupied voxels representing positions on a shelf in field of view; and
   aggregating camera coverage maps to obtain a first aggregate coverage map for the shelf based upon the first set of occupied voxels.

3. The computer-implemented method of claim 2, wherein applying a machine learning process to an objective function of number and poses of cameras, and subject to a set of constraints to obtain the improved camera coverage plan further includes:
   applying a first coverage threshold to the first aggregate coverage map covering a number of cameras having voxels representing positions on a shelf in field of view.

4. The computer-implemented method of claim 3, wherein applying a first coverage threshold to coverage map covering a number of cameras having voxels representing positions on a shelf in field of view further includes:

applying to coverage maps, a first coverage threshold comprising at least 3 cameras having voxels representing positions on a shelf in field of view.

5. The computer-implemented method of claim 2, wherein applying a machine learning process to an objective function of number and poses of cameras, and subject to a set of constraints to obtain the improved camera coverage plan includes:
   determining a set of camera coverage maps per camera including one of a second set of occupied voxels representing positions of simulated subjects on a plane at some height above a floor of the three-dimensional real space through which simulated subjects would move through; and
   aggregating camera coverage maps to obtain a second aggregate coverage map based upon the second set of occupied voxels.

6. The computer-implemented method of claim 5, wherein applying a machine learning process to an objective function of number and poses of cameras, and subject to a set of constraints to obtain the improved camera coverage plan further includes:
   applying a second coverage threshold to the second aggregate coverage map covering a select portions of a plane at some height above a floor of the three-dimensional real space through which simulated subjects would move.

7. The computer-implemented method of claim 6, wherein applying a second coverage threshold to second aggregate coverage map covering a select portions of a plane at some height above a floor of the three-dimensional real space through which simulated subjects would move further includes:
   applying to the second aggregate coverage map, a second coverage threshold comprising a range of 80% or greater of a plane at some height above a floor of the three-dimensional real space through which simulated subjects would move through.

8. The computer-implemented method of claim 5, wherein applying a machine learning process to an objective function of number and poses of cameras, and subject to a set of constraints to obtain the improved camera coverage plan further includes:
   applying to the second aggregate coverage map, a third coverage threshold comprising at least 2 cameras with at least 60 degrees angle of incidence covering select portions of a plane at some height above a floor of the three-dimensional real space through which simulated subjects would move through.

9. The computer-implemented method of claim 1, wherein the initial camera coverage plan is one selected from (i) a random initialized coverage plan comprising an initial number of cameras randomly distributed in the three-dimensional real space and (ii) a proto-coverage plan comprising a received input of an initial number of cameras approximately positioned in the three-dimensional real space.

10. The computer-implemented method of claim 1, wherein a camera model for a camera includes a camera intrinsic matrix and distortion values of a lens used on the camera.

11. The computer-implemented method of claim 1, wherein the set of constraints includes physical constraints and coverage constraints; and wherein physical constraints are detected from images of the three-dimensional real space by a machine learning algorithm.

12. The computer-implemented method of claim 10, wherein physical constraints include a presence of a fixture, a presence of a speaker, a presence of a heating, ventilation, air conditioning (HVAC) vent.

13. The computer-implemented method of claim 10, wherein coverage constraints include a number of cameras having a voxel in a structure or display holding inventory within view, a number of cameras having a voxel in a tracking zone of volume in which subjects are tracked within view, a difference in angles of incidence between cameras having a voxel within view, and an overall coverage of the three-dimensional real space.

14. The computer-implemented method of claim 1, wherein the machine learning process includes a mixed integer programming algorithm.

15. The computer-implemented method of claim 1, wherein the machine learning process includes a gradient descent algorithm.

16. The computer-implemented method of claim 1, further including providing a plurality of improved coverage plans meeting or exceeding constraints and receiving a selection from the plurality as provided to use in tracking puts and takes.

17. A tool in an automated design environment for configuring an autonomous store, the tool comprising one or more processors coupled to a storage medium storing instructions for determining an improved camera coverage plan including a number, a placement, and a pose of cameras that are arranged to track puts and takes of items by subjects in a three-dimensional real space of the autonomous store, which when executed by the one or more processors implement a method of claim 1.

18. A computer-implemented method of claim 1 used in a physical store having a volume of real space encompassed by a building, the volume of real space including cameras placed using one or more processors implement the method of claim 1.

19. An automated check-out system, comprising:
a classification engine including one or more processors executing stored instructions that when executed by the one or more processors implement tracking of puts and takes by subjects; and
a plurality of cameras sending sequences of images to the classification engine, placed using one or more processors that implement a method including:
receiving an initial camera coverage plan including a three-dimensional map of a three-dimensional real space, an initial number and initial pose of a plurality of cameras and a camera model including characteristics of the cameras;
beginning with the initial camera coverage plan received, iteratively applying a machine learning process to an objective function of number and poses of cameras, and subject to a set of constraints, to obtain from the initial camera coverage plan as received, an improved camera coverage plan using one or more of: (i) a changed number of cameras, and (ii) a changed number of camera poses, and having an improved coverage score and concurrently using a same or reduced number of cameras; and
providing the improved camera coverage plan to an installer to arrange cameras to track puts and takes of items by subjects in a three-dimensional real space.

20. A non-transitory computer readable storage medium storing instructions for determining an improved camera coverage plan including a number, a placement, and a pose of cameras that are arranged to track puts and takes of items by subjects in a three-dimensional real space, which instructions when executed by one or more processors implement a method including:
receiving an initial camera coverage plan including a three-dimensional map of a three-dimensional real space, an initial number and initial pose of a plurality of cameras and a camera model including characteristics of the cameras;
beginning with the initial camera coverage plan received, iteratively applying a machine learning process to an objective function of number and poses of cameras, and subject to a set of constraints, to obtain from the initial camera coverage plan as received, an improved camera coverage plan using one or more of: (i) a changed number of cameras, and (ii) a changed number of camera poses, and having an improved coverage score and concurrently using a same or reduced number of cameras; and
providing the improved camera coverage plan to an installer to arrange cameras to track puts and takes of items by subjects in the three-dimensional real space.

21. A computer-implemented method for determining an improved camera coverage plan including a number, a placement, and a pose of cameras that are arranged to track puts and takes of items by subjects in a three-dimensional real space, the method including:
receiving an initial camera coverage plan including a three-dimensional map of the three-dimensional real space, an initial number and initial pose of a plurality of cameras and a camera model including characteristics of the cameras;
beginning with the initial camera coverage plan received, iteratively applying a machine learning process to an objective function of number and poses of cameras, and subject to a set of constraints, to obtain from the initial camera coverage plan as received, an improved camera coverage plan using one or more of: (i) a changed number of cameras, and (ii) a changed number of camera poses, and having an improved coverage score and concurrently using a same or reduced number of cameras by:
determining a set of camera coverage maps per camera including one of a first set of occupied voxels representing positions on a shelf in field of view;
aggregating camera coverage maps to obtain a first aggregate coverage map for the shelf based upon the first set of occupied voxels;
applying a first coverage threshold to the first aggregate coverage map covering a number of cameras having voxels representing positions on a shelf in field of view;
determining a set of camera coverage maps per camera including one of a second set of occupied voxels representing positions of simulated subjects on a plane at some height above a floor of the three-dimensional real space through which simulated subjects would move through;
aggregating camera coverage maps to obtain a second aggregate coverage map based upon the second set of occupied voxels;
applying a second coverage threshold comprising a coverage metric to the second aggregate coverage map covering a select portions of a plane at some height above a floor of the three-dimensional real space through which simulated subjects would move; and applying a third coverage threshold comprising at least one of number and angle of incidence of cameras to the second aggregate coverage map covering a select portions of a plane at some height above a floor of the three-dimensional real space through which simulated subjects would move; and providing the improved camera coverage plan to an installer to arrange cameras to track puts and takes of items by subjects in the three-dimensional real space.

* * * * *